US007694070B2

(12) United States Patent
Mogi et al.

(10) Patent No.: US 7,694,070 B2
(45) Date of Patent: *Apr. 6, 2010

(54) COMPUTER SYSTEM FOR MANAGING PERFORMANCES OF STORAGE APPARATUS AND PERFORMANCE MANAGEMENT METHOD OF THE COMPUTER SYSTEM

(75) Inventors: Kazuhiko Mogi, Yokohama (JP); Norifumi Nishikawa, Machida (JP); Hideomi Idei, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 532 days.

This patent is subject to a terminal disclaimer.

(21) Appl. No.: 11/454,935

(22) Filed: Jun. 19, 2006

(65) Prior Publication Data
US 2006/0242356 A1    Oct. 26, 2006

Related U.S. Application Data

(63) Continuation of application No. 10/633,637, filed on Aug. 5, 2003, now Pat. No. 7,089,347.

(30) Foreign Application Priority Data
Mar. 31, 2003 (JP) .............................. 2003-093544

(51) Int. Cl.
*G06F 12/00* (2006.01)
(52) U.S. Cl. ................ 711/112; 711/113; 711/E12.016
(58) Field of Classification Search ................... 711/100
See application file for complete search history.

(56) References Cited
U.S. PATENT DOCUMENTS

| 5,062,055 | A | 10/1991 | Chinnaswamy et al. |
| 5,325,505 | A | 6/1994 | Hoffecker et al. |
| 5,434,992 | A | 7/1995 | Mattson |
| 5,584,018 | A | 12/1996 | Kamiyama |
| 5,668,944 | A | 9/1997 | Berry |
| 5,835,756 | A | 11/1998 | Caccavale |
| 5,956,750 | A | 9/1999 | Yamamoto et al. |

(Continued)

FOREIGN PATENT DOCUMENTS

EP    1158395 A2    11/2001

(Continued)

OTHER PUBLICATIONS

"Hitachi Freedom Storage (TM) Lightning 9900 (TM) V Series" Hitachi Data Systems Corp., DISK-432-00b, Oct. 2002.

(Continued)

*Primary Examiner*—Reginald G Bragdon
*Assistant Examiner*—Aracelis Ruiz
(74) *Attorney, Agent, or Firm*—Brundidge & Stanger, P.C.

(57) ABSTRACT

In a computer system with a DBMS running thereon, management of the performance of a storage apparatus is executed by using a performance indicator provided by a user job so as to simplify the management of the performance. For this reason, a management server employed in the computer system monitors an operating state of each system element, a response time onto a job and other information. A method for estimating a processing time is given to the management server, which issues a setting modification command based on an estimated processing time.

28 Claims, 26 Drawing Sheets

U.S. PATENT DOCUMENTS

| | | | |
|---|---|---|---|
| 6,035,306 | A | 3/2000 | Lowenthal et al. |
| 6,260,114 | B1 | 7/2001 | Schug |
| 6,341,331 | B1 | 1/2002 | McNutt |
| 6,505,248 | B1 | 1/2003 | Casper et al. |
| 6,574,667 | B1 * | 6/2003 | Blumenau et al. ........... 709/229 |
| 6,760,828 | B1 | 7/2004 | Black |
| 6,988,110 | B2 * | 1/2006 | Boyd et al. ............. 707/103 R |
| 7,130,824 | B1 * | 10/2006 | Amanat et al. ................ 705/37 |
| 2002/0069322 | A1 * | 6/2002 | Galbraith et al. ............ 711/113 |
| 2003/0061331 | A1 | 3/2003 | Nakamura et al. |
| 2003/0084071 | A1 | 5/2003 | Lulo |
| 2003/0093442 | A1 | 5/2003 | Mogi et al. |
| 2003/0093619 | A1 | 5/2003 | Sugino et al. |
| 2003/0158920 | A1 | 8/2003 | Lynch et al. |
| 2003/0204583 | A1 | 10/2003 | Kaneda et al. .............. 709/223 |
| 2003/0221063 | A1 | 11/2003 | Eguchi et al. |
| 2003/0225830 | A1 | 12/2003 | Kataoka et al. |
| 2003/0229698 | A1 | 12/2003 | Furuhashi et al. |
| 2003/0236945 | A1 * | 12/2003 | Nahum ....................... 711/114 |
| 2004/0024796 | A1 | 2/2004 | Takeda et al. |
| 2004/0024870 | A1 | 2/2004 | Hirata et al. |
| 2004/0054850 | A1 | 3/2004 | Fisk .......................... 711/112 |
| 2004/0073677 | A1 | 4/2004 | Honma et al. ............... 709/226 |
| 2004/0117398 | A1 | 6/2004 | Idei et al. |
| 2004/0127999 | A1 | 7/2004 | Murase et al. |

FOREIGN PATENT DOCUMENTS

| | | |
|---|---|---|
| JP | 04359356 A | 12/1992 |
| JP | 9274544 | 10/1997 |
| JP | 2001 67187 | 3/2001 |
| JP | 2001 142648 | 5/2001 |
| JP | 2002 082775 | 3/2002 |
| JP | 2003 015931 | 1/2003 |
| WO | 0180013 | 10/2001 |

OTHER PUBLICATIONS

Decision of Refusal, dated Apr. 28, 2009, issued in corresponding Japanese Patent Application No. 2003-093544, including English language translation (of important part only).

* cited by examiner

FIG. 4

| PORT ID | VIRTUAL STRUCTURE ID |
|---|---|
| Port 0 | Upper 0 |
|  | Upper 1 |
| Port 1 | Upper 1 |
| ⋮ | ⋮ |

UPPER-LEVEL-PORT-MAPPING INFORMATION

FIG. 5

| DATA AREA NAME | DATA STRUCTURE NAME | DATA STORAGE LOCATION | |
|---|---|---|---|
| | | DATA FILE PATH NAME | BLOCK NUMBER |
| TS1 | T1 | /dev/rdsk/lvol0 | 0-499 |
| | | /dev/rdsk/lvol0 | 2000-2499 |
| | T2 | /dev/rdsk/lvol0 | 500-799 |
| | − | /dev/rdsk/lvol0 | 800-1999 |
| TS2 | T3 | /dev/rdsk/lvol1 | 500-799 |
| ⋮ | ⋮ | ⋮ | ⋮ |

DATA STORAGE AREA INFORMATION

FIG. 7

CACHE MONITORED INFORMATION (362)

| REAL PART GROUP COUNT (502) | | VIRTUAL PART GROUP COUNT: V (504) | | | |
|---|---|---|---|---|---|

| LU ID | LU 0 | | LU 1 | | ... |
|---|---|---|---|---|---|
| I/O TYPE | Read | Write | Read | Write | ... |
| EXECUTION CUMULATIVE COUNT | 489789 | 78978 | 168799 | 789 | ... |
| CACHE-HIT CUMULATIVE COUNT — REAL HIT TOTAL | 138978 | 78978 | 48958 | 789 | ... |
| CACHE-HIT CUMULATIVE COUNT — 1st GROUP | 0 | – | 342 | – | ... |
| CACHE-HIT CUMULATIVE COUNT — 2nd GROUP | 2870 | – | 6869 | – | ... |
| ⋮ | ⋮ | ⋮ | ⋮ | ⋮ | ⋮ |
| CACHE-HIT CUMULATIVE COUNT — (V+R)th GROUP | 7987 | – | 4789 | – | ... |

- 364 (LU ID), 366 (I/O TYPE), 368 (EXECUTION CUMULATIVE COUNT), 370 (CACHE-HIT CUMULATIVE COUNT)

STORAGE PORT MONITORED INFORMATION (382)

| PORT ID | Str0-Port0 | Str0-Port0 | Str0-Port1 | ... |
|---|---|---|---|---|
| LU ID | LU 0 | LU 1 | LU 2 | ... |
| EXECUTION CUMULATIVE COUNT | 2391739 | 3890282 | 80128 | ... |
| CUMULATIVE TRANSFERRED DATA AMOUNT | 19133812 | 6786890 | 1282048 | ... |

- 384 (PORT ID), 364 (LU ID), 368 (EXECUTION CUMULATIVE COUNT), 386 (CUMULATIVE TRANSFERRED DATA AMOUNT)

HDD MONITORED INFORMATION (392)

| HDD ID | HD D0 | HD D0 | HD D1 | ... |
|---|---|---|---|---|
| LU ID | LU 0 | LU 1 | LU 2 | ... |
| CUMULATIVE PROCESSING TIME | 246887 | 687587 | 747605 | ... |

- 394 (HDD ID), 364 (LU ID), 396 (CUMULATIVE PROCESSING TIME)

STORAGE MONITORED INFORMATION (360)

FIG. 8

| PORT ID | Str0-Port0 | Str0-Port2 | ... | 384 |
|---|---|---|---|---|
| INITIATOR PORT ID | Host0-Port1 | Host1-Port0 | ... | 442 |
| MAXIMUM TRANSFERRED-DATA AMOUNT | 1 (MB/s) | 10 (MB/s) | ... | 444 |
| MAXIMUM I/O PROCESSING AMOUNT | 300 | 500 | ... | 446 |

PORT-THROUGHPUT-SETTING INFORMATION ~440

FIG. 9

| PORT ID | Host0-Port0 | | Host0-Port1 | | ... | 384 |
|---|---|---|---|---|---|---|
| I/O TYPE | Read | Write | Read | Write | ... | 366 |
| EXECUTION CUMULATIVE COUNT | 48978 | 7897 | 16879 | 570 | ... | 368 |
| CUMULATIVE RESPONSE TIME | 138978 | 6318 | 38958 | 456 | ... | 402 |
| CUMULATIVE TRANSFERRED DATA AMOUNT | 391824 | 63176 | 113899 | 3756 | ... | 386 |

PORT MONITORED INFORMATION ~400

FIG. 10

| PROCESSING ID | 1 | 2 | ... | 432 |
|---|---|---|---|---|
| EXECUTION CUMULATIVE COUNT | 48978 | 7897 | ... | 368 |
| CUMULATIVE RESPONSE TIME | 138978 | 26318 | ... | 402 |
| CUMULATIVE PROCESSING TIME | 102956 | 24637 | ... | 396 |

ON-LINE JOB MONITORED INFORMATION 430

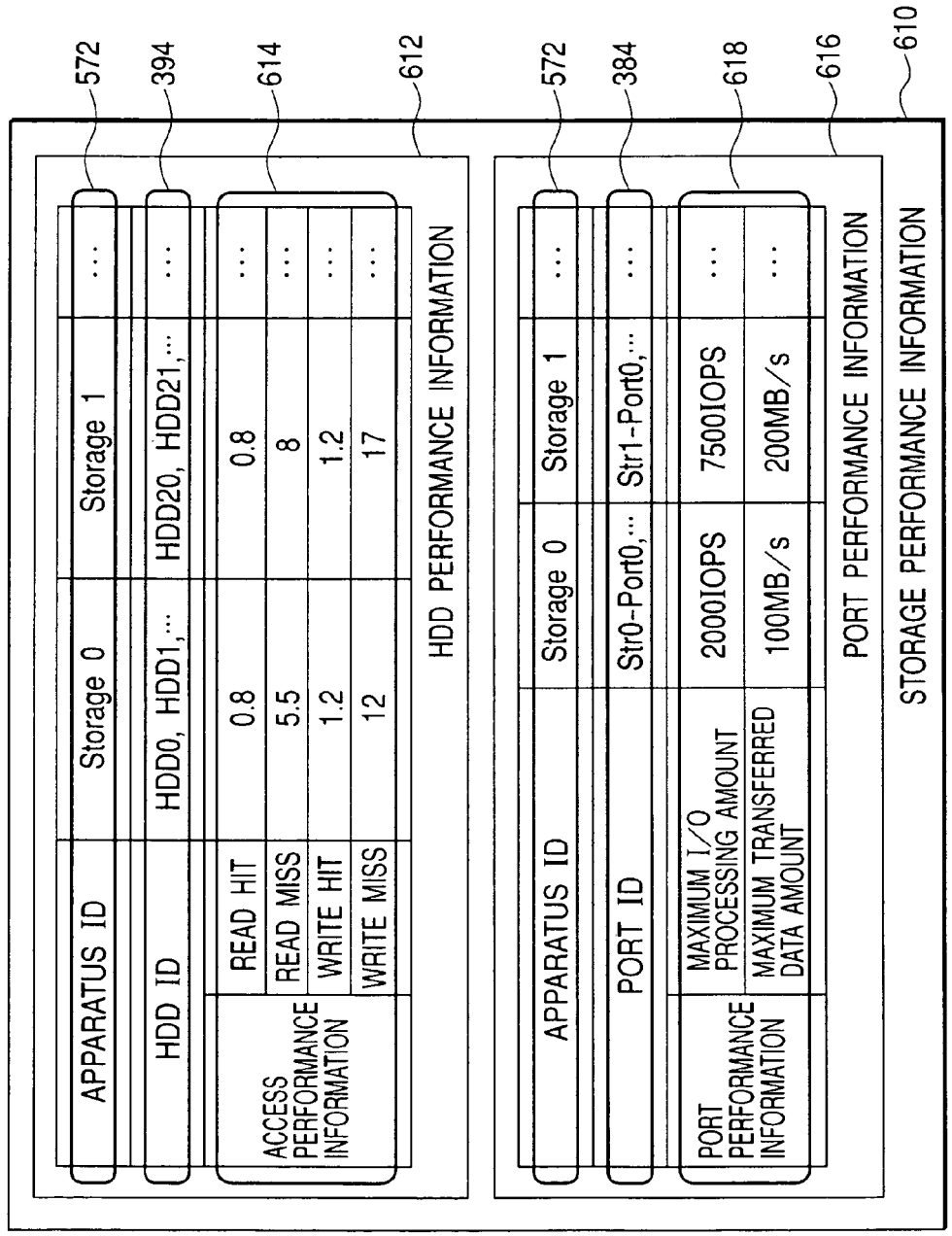

FIG. 12

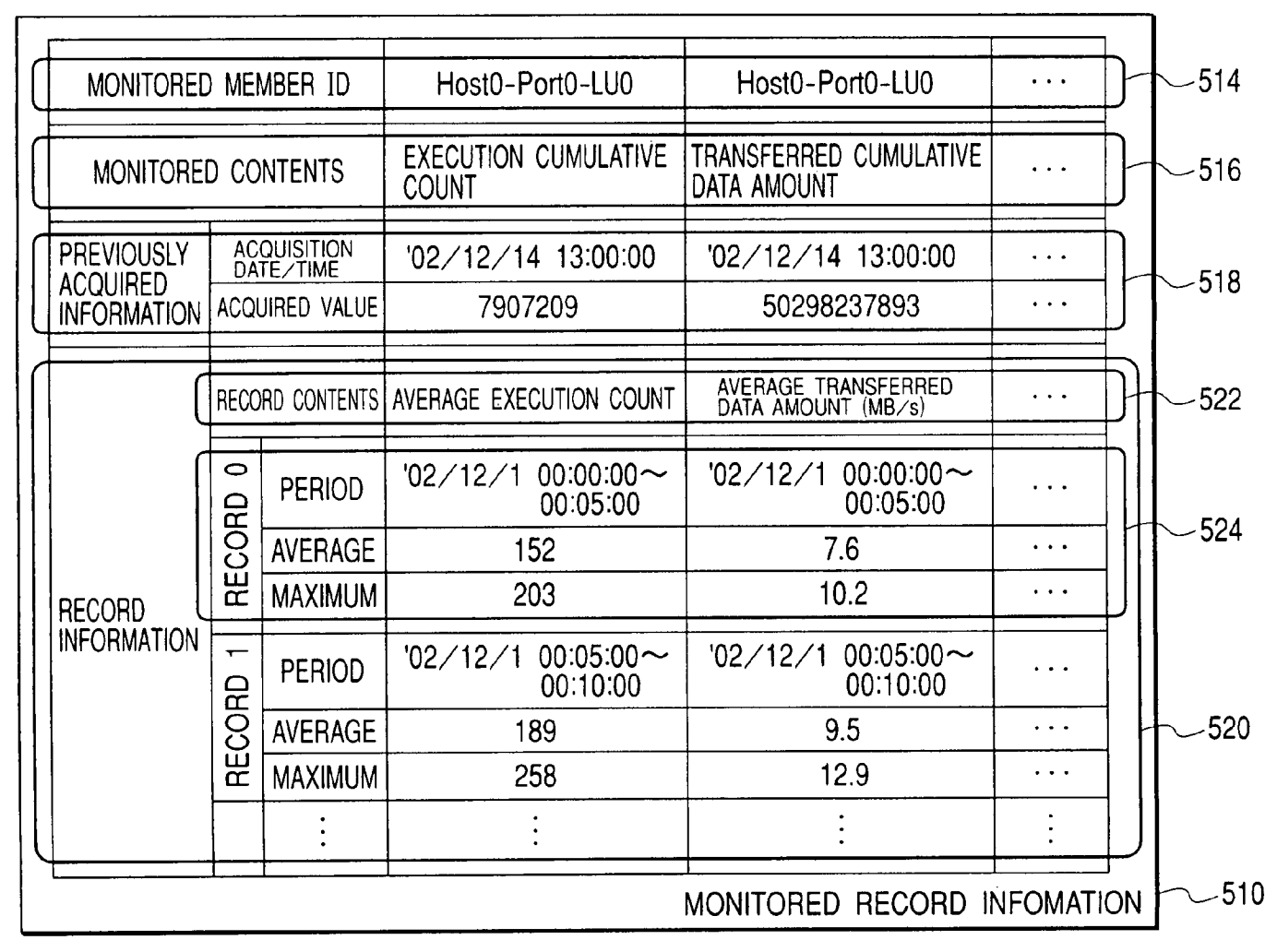

| MONITORED MEMBER ID | | Host0-Port0-LU0 | Host0-Port0-LU0 | ... | — 514 |
|---|---|---|---|---|---|
| MONITORED CONTENTS | | EXECUTION CUMULATIVE COUNT | TRANSFERRED CUMULATIVE DATA AMOUNT | ... | — 516 |
| PREVIOUSLY ACQUIRED INFORMATION | ACQUISITION DATE/TIME | '02/12/14 13:00:00 | '02/12/14 13:00:00 | ... | — 518 |
| | ACQUIRED VALUE | 7907209 | 50298237893 | ... | |
| RECORD INFORMATION | RECORD CONTENTS | AVERAGE EXECUTION COUNT | AVERAGE TRANSFERRED DATA AMOUNT (MB/s) | ... | — 522 |
| | RECORD 0 PERIOD | '02/12/1 00:00:00~ 00:05:00 | '02/12/1 00:00:00~ 00:05:00 | ... | — 524 |
| | AVERAGE | 152 | 7.6 | | |
| | MAXIMUM | 203 | 10.2 | | |
| | RECORD 1 PERIOD | '02/12/1 00:05:00~ 00:10:00 | '02/12/1 00:05:00~ 00:10:00 | ... | — 520 |
| | AVERAGE | 189 | 9.5 | | |
| | MAXIMUM | 258 | 12.9 | | |
| | ... | ... | ... | ... | |

MONITORED RECORD INFOMATION — 510

COMPUTER SYSTEM FOR MANAGING PERFORMANCES OF STORAGE APPARATUS AND PERFORMANCE MANAGEMENT METHOD OF THE COMPUTER SYSTEM

The present application is a continuation of application Ser. No. 10/633,637, filed Aug. 5, 2003, now U.S. Pat. No. 7,089,347, the contents of which are incorporated herein by reference.

BACKGROUND OF THE INVENTION

The present invention relates to a computer system with a function to manage the performance of storage apparatuses and a performance management method of the computer system and, more particularly, the present invention relates to a computer system.

More specifically, the present invention relates to the computer system and the performance management method which utilize the processing performance requirement settings specified by an administrator for adjustment of the performance of the storage apparatuses in the computer system to obtain the preferable performance of the computer system where a large-scale DBMS (Database Management System) operates.

DESCRIPTION OF THE RELATED ART

In recent years, a DBMS (Database Management System) has become a very important piece of software executed to carry out data processing and management operations related to a DB (Database). If software structures of application programs (AP programs) running on a server computer are examined, there will be found that many application programs use the data stored on a DB.

In general, it is strongly required that each job processed by the AP program should keep its required performance level determined by the importance of the job and the estimated load. So it is considered that the performance management is one of the most important job in the computer system management. In general, the performance of a DBMS is much affected by the performance of accesses to data stored in the database. In turn, the performance of data accesses is much affected by the operating state of a hardware resource included in a data access path through which the accesses are made. Thus, performance management considering the operating state of a storage apparatus is important.

U.S. Pat. No. 6,035,306 discloses a technology for presenting an operating state (an utilization ratio) of each layer and the operating state of other layers' management structure associated with management structure of data such as tables and files by acquisition of data mapping from the DBMS to storage apparatuses in order to simplify an analysis of the performance of the hardware resource included in the data access path. In a state where a member is bearing an excessive load, there is a high possibility that this over-loaded state causes degradation of the performance. In order to solve this problem, U.S. Pat. No. 6,035,306 describes a function which creates a proposal for optimization to change the storage location of data pertaining to certain management structure.

On the other hand, there is a storage apparatus having a function to optimize the performance by solving the problem of overloaded state of a hardware resource. Japanese Patent Laid-open No. 9-274544 (a second reference) discloses a technology for improving the access performance of a storage apparatus, in which logical storage devices recognized by a computer are mapped onto a plurality of physical disc apparatus existing inside the storage apparatus and data of the logical storages is stored in the physical disc apparatus, by dynamically changing the logical storage devices' mapping onto the physical storage devices. By the phrase 'dynamically changing the mapping', 'changing the mapping without halting other processes' is meant. In accordance with the technology disclosed in Japanese Patent Laid-open No. 9-274544 (the second reference), some of data stored in a physical storage device having a high utilization ratio, that is, a physical storage device bearing an excessive load in an over-loaded state, is moved to another physical storage device so as to prevent a specific physical storage device from entering an over-loaded state and, thus, to optimize the performance.

In addition, a storage apparatus connected to a plurality of computers through a common port by using a Fiber Channel or the like may have a function to give accesses from the specified computers higher priority than those from the other computers. An example of such a function is a priority access function described in a document issued by Hitachi Data Systems Corporation with a title of 'Hitachi Freedom Storage™ Lightning 9900™ V Series', pp. 8-9, DISK-432-00b, October 2002.

Moreover, most storage apparatus have a cache memory. Thus, by deliberately increasing the probability that data desired in a read operation exists in the cache memory, the access performance can be improved. The state in which data desired in a read operation exists in the cache memory is referred to as a cache hit. U.S. Pat. No. 5,434,992 discloses a technology for a cache memory divided into cache areas each allocated to a data type. In accordance with this technology, the allocation of the cache area among the data types is optimized in order to increase a cache hit ratio. To put it in detail, in accordance with U.S. Pat. No. 5,434,992, the allocation of the cache areas among the data types is optimized in a system executing cache-data replacement control based on an LRU (Least Recently Used) replacement algorithm as follows: In the case of a cache hit, the information indicating where the entry corresponding to the read-hit data is located on the LRU management list is acquired. This information is utilized in estimation of a cache hit ratio by changing the allocation of the cache areas among the data types.

By the way, in many cases, the performance indicator of a user job is a processing time for a batch job to process batched data with a large amount and a response time or a processing throughput for an on-line job. However, a performance indicator used in or provided by the conventional technology is directly related to a physical operation in a computer system such as the utilization ratio of a resource and the cache hit ratio. Thus, the performance indicator used in or provided by the conventional technology is not directly related to the performance indicator from the user's point of view. In addition, in many cases, the performance required by the user cannot be achieved unless a plurality of performance indicators provided by the conventional technology is examined and a performance bottleneck is identified from the examined performance indicators and then solved. In the present state of the art, system administrators make amends for them and this job is not easy one, but one requiring a special skill.

As described above, with regard to the current performance management, the number of portions in which the system administrators play a part is not small. However, it is desirable to automate the performance management as much as possible in order to eliminate human errors and reduce the management cost.

It is thus an object of the present invention addressing the aforementioned problems of the conventional technology to simplify management of performances of storage apparatus by performing the management process using a performance indicator for user jobs in a computer system where a DBMS operates.

In addition, it is another object of the present invention to reduce the cost of the performance management by automating a process of tuning the performance of a storage apparatus in a computer system where a DBMS operates.

SUMMARY OF THE INVENTION

In order to achieve the objects of the present invention, what are described below are implemented.

First of all, in order to identify the operating state of elements composing a computer system, information including their states of operation and a response time on a job are monitored and summarized in a management server. The management server then issues a setting modification command to a storage apparatus when processing is carried out or when it is judged based on monitored values that tuning is necessary. The setting modification command changes the amount of processing allocated to a port of the storage apparatus, the size of a cache storage area allocated to data, the configuration of storage areas of a disc for recording data and other kinds of setting, which are determined using monitored information summarized in the management server and/or pre-given information such as a demanded performance.

In the case of a batch job, a method of estimating a processing time is provided to the management server. A job is a management unit of a program for processing in the management server. The management server estimates a processing time by adoption of the method. By using the estimated processing time, the management server changes the setting of the storage apparatus to a new setting that allows the processing to be completed within the required processing time. The processing time is estimated by considering the amount of data being processed and the amount of I/O processing in the storage apparatuses presently available. A method to estimate a processing time can be determined by obtaining operations states of elements composing the computer system through actual execution of processing of a job and by associating the operating states with the detailed processing steps of the processing.

In the case of an on-line work, on the other hand, a response time to processing and throughput are examined. If the performance required is not achieved, a command is issued to change the setting of the storage apparatus. A member becoming a performance bottleneck is identified by referring to the utilization ratio of a resource in the storage apparatus. The setting modification command is issued to eliminate the performance bottleneck. In addition, if necessary, a command is issued to change the cache allocation in order to improve the access performance.

If a plurality of jobs is carried out concurrently in the computer system, a resource in the storage apparatus may be shared among different jobs so that there is some possibility that a performance bottleneck results. In order to solve this problem, a processing priority level is set for each job and, if a problem arises due to the sharing of the resource, control is executed to sustain the performance required of a job having a high processing priority level by reassigning a part of a time allocated to processing of processing time currently allocated to a job having a low processing priority level to the job having a high processing priority level.

BRIEF DESCRIPTION OF THE DRAWINGS

FIG. 4 shows the data structure of upper-level-port-mapping information 322;

FIG. 5 shows the data structure of data storage area information 342;

FIG. 7 shows the data structure of storage monitored information 360;

FIG. 8 shows the data structure of port-throughput-setting information 440;

FIG. 9 shows the data structure of port monitored information 400;

FIG. 10 shows the data structure of on-line job monitored information 430;

FIG. 11 shows the data structure of storage performance information 610;

FIG. 12 shows the data structure of monitored record information 510;

PREFERRED EMBODIMENTS OF THE INVENTION

Embodiments of the present invention will hereinafter be described by referring to FIGS. 1 to 28.

First Embodiment

A first embodiment of the present invention will below be described by referring to FIGS. 1 to 27.

(I): Configuration of a Computer System Applying the Present Invention

First of all, the description explains the configuration of a computer system for managing performances of storage apparatus in accordance with a first embodiment of the present invention.

Figure 1:
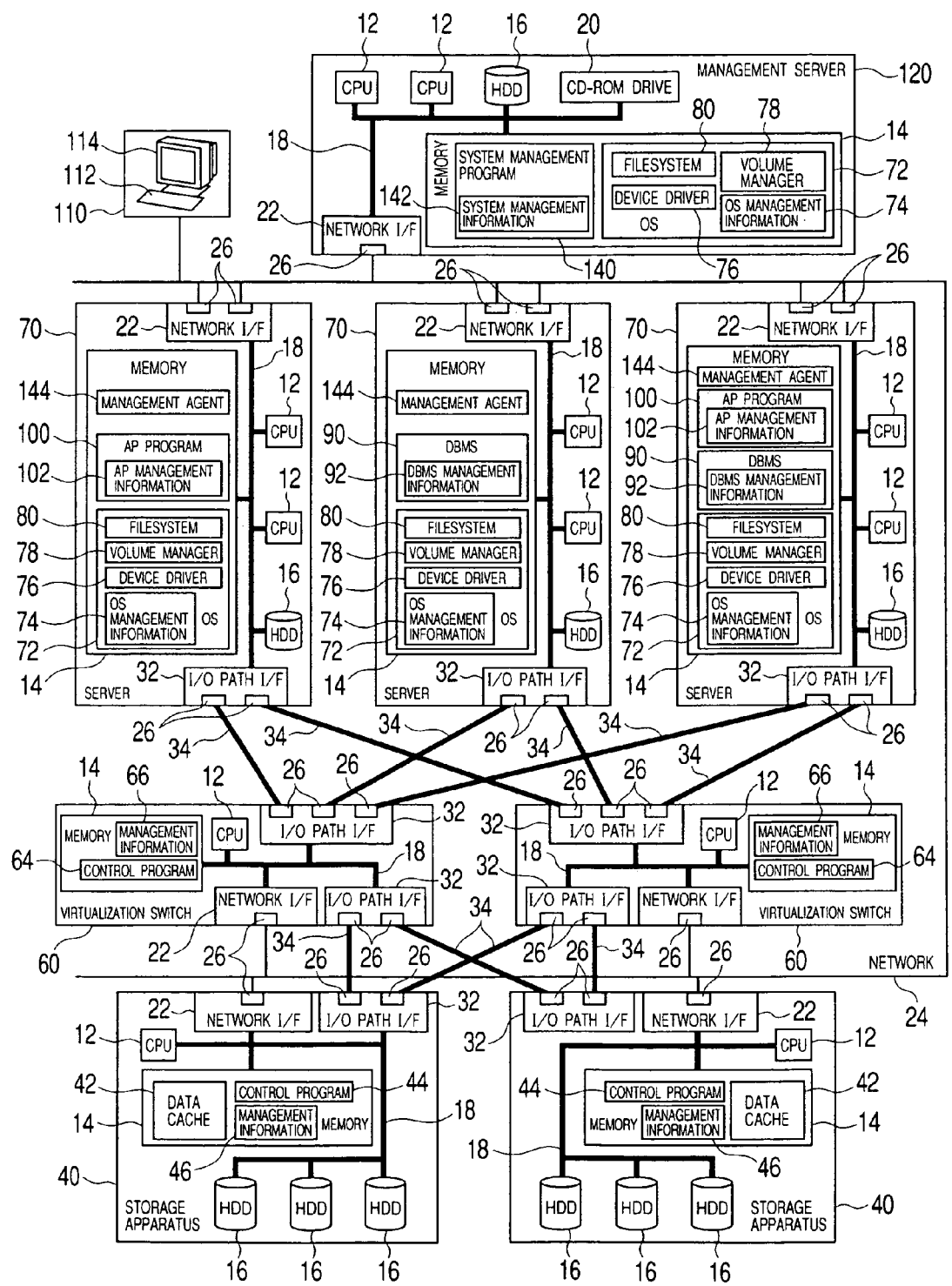
FIG. 1 shows the configuration of a computer system for managing performances of storage apparatus in accordance with a first embodiment of the present invention.

FIG. 1 shows the configuration of a computer system for managing performances of storage apparatus in accordance with the first embodiment of the present invention.

The computer system has storage apparatus 40, computers 70 using the storage apparatus 40, a computer 120 for managing the system performance and others and virtualization switches 60 which virtualize the storage regions provided from the storage apparatus 40. The computers 70 are each referred to hereafter as a server and the computer 120 is referred to hereafter as a management server. Each of the components comprising the computer system has a network I/F 22 for connecting the component to a network 24 so that the components are capable of communicating with each other.

Each of the servers 70, the virtualization switches 60 and the storage apparatus 40 has an I/O path I/F 32 and is connected each other with a communication line 34, which is referred to as an I/O path. I/O processing between the servers 70 and the storage apparatus 40 is carried out by using the I/O paths 34. It is to be noted that, as the I/O paths 34, it is possible to employ communication lines for transferring data between apparatus through different physical media and by adoption of different protocols. In addition, the network 24 and the I/O paths 34 can also be implemented by the same communication lines.

A storage apparatus 40 has a CPU 12, a memory 14, a disc apparatus 16, the network I/F 22 and I/O path I/Fs 32. The disc apparatus 16 is referred to hereafter as an HDD (Hard Disc Drive). The CPU 12, the memory 14, the HDD 16, the network I/F 22 and the I/O path I/Fs 32 are connected to each other by an internal bus 18. It is to be noted that a storage apparatus 40 can have only one HDD 16 or a plurality of HDDs 16. The memory 14 has a non-volatile storage area (or a ROM storage area) and a high-performance storage area (or a RAM storage area).

In this embodiment, a storage apparatus presents a logical disc apparatus to an external apparatus. The logical disc apparatus is referred to hereafter as an LU (Logical Unit). As a unit of an access to data, a block is used.

A control program 44 for controlling the storage apparatus 40 is stored in the non-volatile storage area of the memory 14. At an start-up time, the control program 44 is loaded into the high-performance storage area of the memory 14 to be executed by the CPU 12. All functions of the storage apparatus 40 are executed and controlled by the control program 44.

In addition, the memory 14 is also used for storing management information 46, which is utilized in controlling and managing the storage apparatus 40. A portion of the memory 14 is allocated as a data cache 42. The data cache 42 is a storage area used for temporarily storing data, to which a request for an access has been made by an external apparatus.

The storage apparatus 40 virtualizes a physical storage area of the HDD 16 and provides one or more LUs 208 to an external apparatus. An LU 208 can be associated with an HDD 16 on one-with-one basis or associated with a storage area composing a plurality of HDDs 16. Alternatively, an HDD 16 can be associated with a plurality of LUs 208. The association is included in the management information 46 as area-mapping information 300. The storage apparatus 40 has functions to dynamically allocate and remove an LU 208 as well as dynamically enlarge and shrink the storage area of an LU 208. For more information on the word 'dynamically', refer to the definition given in the section describing the conventional technology. In addition, the storage apparatus 40 is also provided with a function to dynamically change a relation associating an LU 208 with the storage area of a HDD 16 for storing data of the LU 208 in accordance with a data transfer.

In the storage apparatus 40, an LU 208 is associated with at least a port 26 to the I/O path 34 in any of the I/O path I/Fs 32 through which accesses can be made. The storage apparatus 40 also includes a port in the network I/F 22. This port is connected to the network 24.

A relation associating a port 26 with accessed data is included in the management information 46 as upper-level-port-mapping information 322, which will be described later by referring to FIG. 4. In addition, the storage apparatus 40 also has a function to dynamically allocate and remove a port 26, through which accesses to an LU 208 can be made.

In the storage apparatus 40, storage areas are grouped with a unit of an LU 208. An independent area of the data cache 42 is allocated to each of such groups. A group of LUs 208 is referred to as a cache group. It is possible to dynamically create and remove a cache group as well as dynamically create and remove an LU 208 pertaining to a cache group. In addition, the storage apparatus 40 is also provided with a function to dynamically change the size of an area of the data cache 42 allocated to a cache group. Replacement of cached data stored in a cache group is controlled independently from any other cache group on the basis of an LRU replacement algorithm.

The cache area, that is, the storage area of the data cache 42 is managed by the unit of cache area called cache segment. The management list provided for the LRU replacement algorithm consists of two parts. The part which holds the information about the data currently cached in a cache segment in a cache group is referred to as the real part of the management list. The other is referred to as the virtual part of the management list. After the data stored in a cache segment is replaced by the LRU replacement algorithm, the information about the replaced data held in the real part till then should be passed to the virtual part and kept for a while to be used in a measurement of an operating state.

The storage apparatus 40 also has a function to process accesses requests from a specific external apparatus with a higher priority than those from the other external for each port 26 of an I/O path I/F 32 so that the amount of processing per unit time satisfies a set value. This function is referred to hereafter as a priority-access control function. Set values provided to ports 26 are stored in the management information 46 as port-throughput-setting information 440, which will be described later by referring to FIG. 8. The storage apparatus 40 is also provided with a function to newly create, change and delete the priority-access control function's set values provided for each port 26.

The control program 44 measures an operating state of each member presently existing in the storage apparatus 40 and stores results of measurement in the management information 46 as storage monitored information 360. The real part of the management list is divided into several groups according to the position in the management list. The virtual part is also divided into groups in the same way as performed in the real part. Each group has the same size, which is measured d by the number of entries. In the real part, each entry in the management list corresponds to a cache segment. The statistics of the number of cache hits is measured separately on each group.

The storage apparatus 40 also has a function to transmit the information such as the area-mapping information 300, the storage monitored-information 360, the port-throughput-setting information 440 and the information on the configuration of the storage apparatus 40 to an external destination by way of the network 24 at a request made by the external destination. It is to be noted that the data structures of these pieces of information will be described later in detail.

In addition, the storage apparatus 40 is also provided with a function to execute the various functions described above in accordance with a command transmitted by an external apparatus by way of the network 24.

Each of the virtualization switches 60 has a CPU 12, a memory 14, a network I/F 22 and I/O path I/Fs 32, which are connected to each other by an internal bus 18. The memory 14 has a non-volatile storage area (or a ROM storage area) and a high-performance storage area (or a RAM storage area).

Executed as a program for controlling the virtualization switch 60, a control program 64 is stored in the non-volatile area of the memory 14. At an start-up time, the control program 64 is loaded into the high-performance storage area of the memory 14 to be executed by the CPU 12. All functions of the virtualization switch 60 are executed and controlled by the control program 64. In addition, the memory 14 is also used for storing management information 66, which is utilized for controlling and managing the virtualization switch 60.

The virtualization switch 60 recognizes an LU 208 presented by the storage apparatus 40 connected to the virtualization switch 60, and virtualizes the storage area of the LU 28 to create a virtual volume 206, which is then presented to an external apparatus. It is to be noted that the virtualization switches 60 may be connected to form a multi-stage connection. In this case, a virtual volume 206 presented by another virtualization switch 60 is treated as an equivalent to an LU 208 presented by the storage apparatus 40 and virtualized to create a new virtual volume 206, which is then presented to the external apparatus. The information on associations are stored in the management information 66 as area-mapping information 300. The virtualization switch 60 has functions to dynamically create and remove a virtual volume 206 as well as dynamically enlarge and shrink the storage area of a virtual volume 206. In addition, the virtualization switch 60 is also provided with a function to dynamically change association with LUs 208 or the likes used to form a virtual volume 206. Furthermore, the virtualization switch 60 has a function to remove information which is treated as a free entry 314 to be described later from the area-mapping information 300 held by the virtualization switch 60. The phrase stating 'release a storage area' means the operation which removes the information corresponding to the storage area from the area-mapping information 300 with integrity.

In the virtualization switch 60, a virtual volume 206 is associated with at least a port 26 in any of the I/O path I/Fs 32 through which accesses can be made. The port 26 allows an access to the virtual volume 206 to be made. A relation associating a port 26 with accessed data is stored in management information 66 as upper-level-port-mapping information 322, which will be described later by referring to FIG. 4. In addition, the storage apparatus 40 also has a function to dynamically allocate and remove a port 26, through which an access to a virtual volume 206 can be made.

When the date of the virtual volume 206 presented by the virtualization switch 60 is accessed, the number of accesses actually made so far, the type of each access and the amount of data transferred by an access are recorded. Such a record is provided for each port 26 of any I/O path I/F 32. The records are stored in the management information 66 as port monitored information 400, which will be described later by referring to FIG. 9.

The virtualization switch 60 also has a function to transmit the area-mapping information 300 and the storage monitored-information 360 to an external destination by way of the network 24 at a request made by the external destination. In addition, the virtualization switch 60 is also provided with a function to execute the various functions described above in accordance with a command transmitted by an external apparatus by way of the network 24. It is to be noted that the data structures of these pieces of information will be described later in detail.

Each of the servers 70 has a CPU 12, a memory 14, an HDD 16, the network I/F 22 and the I/O path I/F 32, which are connected to each other by an internal bus 18.

An OS (Operating System) 72 and a management agent 144 are loaded from the HDD 16 into the memory 14 to be executed by the CPU 12.

The OS 72 includes a device driver 76, a volume manager 78 and a filesystem 80. The OS 72 loaded into the memory 14 also has OS management information 74, which is management information to be used by programs composing the OS 72. The OS management information 74 includes information on the hardware configuration of the server 70 such as the number of CPUs 12. In addition, the OS 72 also has a software interface to be used by an external program in reading information included in the OS management information 74. In the embodiment shown in FIG. 1, the server 70 has only one filesystem 80. It is to be noted, however, that the server 70 may also have a plurality of filesystems 80. The OS 72 manages programs executed on the computer in which the OS 72 is running. At that time, the length of time during which all the programs in execution use the CPU 12 is measured and stored in the form of the utilization ratio of the CPU 12 in the OS management information 74.

The device driver 76 is a program for controlling hardware such as the network I/F 22 and the I/O path I/F 32. When data is transferred (in other words, accessed) by way of the network I/F 22 or the I/O path I/F 32, the number of data transfers or accesses actually made so far, the type of the data transfer or the access and the amount of data transferred are recorded. Such a record is provided for each port 26 of the network I/F 22 or the I/O path I/F 32. The records are stored in the OS management information 74 as port monitored information 400.

The volume manager 78 is a program for carrying out a virtualization process on the storage area of an LU 208 presented by the storage apparatus 40 or the storage area of a virtual volume 206 presented by the virtualization switch 60 in order to form a logical volume 204. The volume manager 78 presents the logical volume 204 to the filesystem 80. A relation associating logical volumes 204 with the storage areas is included in the OS management information 74 as the area-mapping information 300. In addition, the volume manager 78 has a function to dynamically change, create and remove the configuration of a logical volume 204. Through a software interface of the volume manager 78, a command to execute this function can be issued. The volume manager 78 is also provided with a function to release a storage area corresponding to a free entry 314 from the area-mapping information 300 held by the volume manager 78. Furthermore, the volume manager 78 may be provided with a function to distribute a load of an I/O process using a plurality of I/O paths 34.

The filesystem 80 is a program for virtualizing a storage area virtual to form a file 202 to be presented to another program. The storage areas virtualized by the filesystem 80 are the storage area of an LU 208 presented by the storage apparatus 40, the storage area of a virtual volume 206 presented by the virtualization switch 60 and the storage area of a logical volume 204 presented by the volume manager 78. A relation associating file 202 with the storage areas is included in the OS management information 74 as the area-mapping information 300. It is to be noted that the filesystem 80 also provides a raw device function, which is a function to make a direct access to the storage area of an LU 208, the storage area of a virtual volume 206 and the storage area of a logical volume 204 through the same software interface as the file 202.

The management agent 144 is a program executed by the server 70 to carry out a process at a request received through the network 24 from a system management program 140 running on the management server 120 and, if necessary, to transmit a result of the process to the system management program 140 by way of the network 24. Processes carried out by the management agent 144 include at least: (1) an operation to read out information included in the OS management information 74; (2) an operation to start or stop the DBMS 90 or an AP program 100; (3) an operation to read out information included in the DBMS management information 92; (4) an operation to acquire an SQL (Structured Query Language) execution plan from the DBMS 90 by issuing the SQL statement and; (5) an operation to read out information included in the AP-program management information 102; (6) an operation to issue a configuration-changing command to the volume manager 78; and (7) an operation to issue a variety of setting commands to the OS 72.

The DBMS 90 is a program executed by the server 70 to carry out a data processing and management operations related to a DB. The management agent 144 activates the DBMS 90 in accordance with a command issued by the system management program 140. The DBMS 90 is then loaded from the HDD 16 of the server 70 or from the storage apparatus 40 into the memory 14 to be executed by the CPU 12.

As a management unit of the storage area, the DBMS 90 uses a data area, which is a storage area consisting of at least one file 202. Data structures used and controlled by the DBMS 90, are each stored in a predetermined data area such as a table, an index and a log. A portion of a data area may not be allocated to a data structure.

The DBMS 90 loaded into the memory 14 includes DBMS management information 92, which is management information of the DBMS 90 including data storage area information 342. The DBMS 90 also includes a software interface used by an external program in reading the DBMS management information 92.

When an SQL statement is given, the DBMS 90 creates an execution plan of the given statement referred to hereafter as an SQL execution plan and then carries out a process in accordance with the SQL execution plan. Basically, if the same SQL statement except the search condition or the like is given, the same SQL execution plan is created. The DBMS 90 has a software interface for outputting the SQL execution plan of the given SQL statement. In addition, in an operation to output an SQL execution plan, it is also possible to output other information such as the amount of the data to be processed.

The AP program 100 is a program executed by the server 70 to carry out a job requested by the user. The AP program 100 issues a request for a process to the DBMS 90. The management agent 144 activates the AP program 100 in accordance with a command issued by the system management program 140. The AP program is then loaded from the HDD 16 of the server 70 or from the storage apparatus 40 into the memory 14 to be executed by the CPU 12. The AP program 100 includes program management information 102, which is management information of the AP program 100. It is to be noted that, in order to handle data stored in the storage apparatus 40, the AP program 100 may always issue a request for a process to the DBMS 90. In this case, the server 70 executing the AP program 100 does not have to be provided with the I/O path I/F 32.

The AP program 100 executed to carry out an on-line job in this embodiment is implemented as a set of one or more processes. A processing ID 432 is assigned to each of the processes and used as an identifier of the process. The user makes a request for execution of one of the processes and the AP program 100 is executed to carry out the requested process. The AP program 100 controls an operation to put a received request for a process on a queue. When the AP program 100 issues a request for a process to the DBMS 90, the DBMS 90 is capable of starting the process immediately. The AP program 100 acquires statistics of process executions and stores the statistics in the AP-program management information 102 as on-line job monitored information 430, which will be described later by referring to FIG. 10. For this reason, the AP program 100 is provided with a software interface to be used by an external program in reading the AP-program management information 102.

A server 70 may be capable of executing a plurality of DBMSes 90 and/or a plurality of AP programs 100 at the same time. In addition, a DBMS 90 and an AP program 100 can also be executed on different servers 70. In this case, the AP program 100 issues a request for a process to the DBMS 90 by way of the network 24.

For the installation of the OS 72, the DBMS 90, the AP program 100 or the management agent 144, these programs are read from the CD-ROM media by the CD-ROM drive 20 in the management server 120, transferred to the server 70 via the network 24, and installed into a HDD 16 in the server 70 or a storage apparatus 40.

The management server 120 has a CPU 12, a memory 14, an HDD 16, a CD-ROM drive 20 and a network I/F 22, which are connected by each other by an internal bus 18.

An OS 72 and a system management program 142 are loaded from the HDD 16 into the memory 14 to be executed by the CPU 12. The CD-ROM drive 20 is used for installing a variety of programs.

In addition, the management server 120 is connected to a management terminal 110 by the network 24. The management terminal 110 has a display screen 114 and an input unit 112 such as a keyboard and/or a mouse. The management server 120 can also be connected to the management terminal 110 by a communication line different from the network 24. As an alternative, the management server 120 is integrated with the management terminal 110. Basically, a system administrator enters and receives information via the management terminal 110 and, if necessary, uses the CD-ROM drive 20 as well.

The system management program 140 is a program for the system management functions realized by the management server 120. The system management program 140 is loaded from the HDD 16 into the memory 14 to be executed by the CPU 12. The system management program 140 has system management information 42, which is management information necessary for realizing functions of the system management program 140. The system management program 140 is read out by the CD-ROM drive 20 of the management server 120 from a CD-ROM for recording the system management program 140 and installed in the HDD 16. Detailed operations of this program will be described later.

In this embodiment, the management server 120 executes the system management program 140 as described above. It is to be noted, however, that any server 70, any virtualization switch 60 or any storage apparatus 40 is also capable of executing the system management program 140. In the case of a system management program 140 executed by a server 70, the system management program 140 is loaded from the HDD 16 into the memory 14 to be executed by the CPU 12. In the case of a system management program 140 executed by a virtualization switch 60 or a storage apparatus 40, on the other hand, the system management program 140 is stored in the non-volatile storage area of the memory 14 and moved to the high-performance of the memory 14 to be executed by the CPU 12.

(II) Hierarchical Structure of Data Mapping

Figure 2:
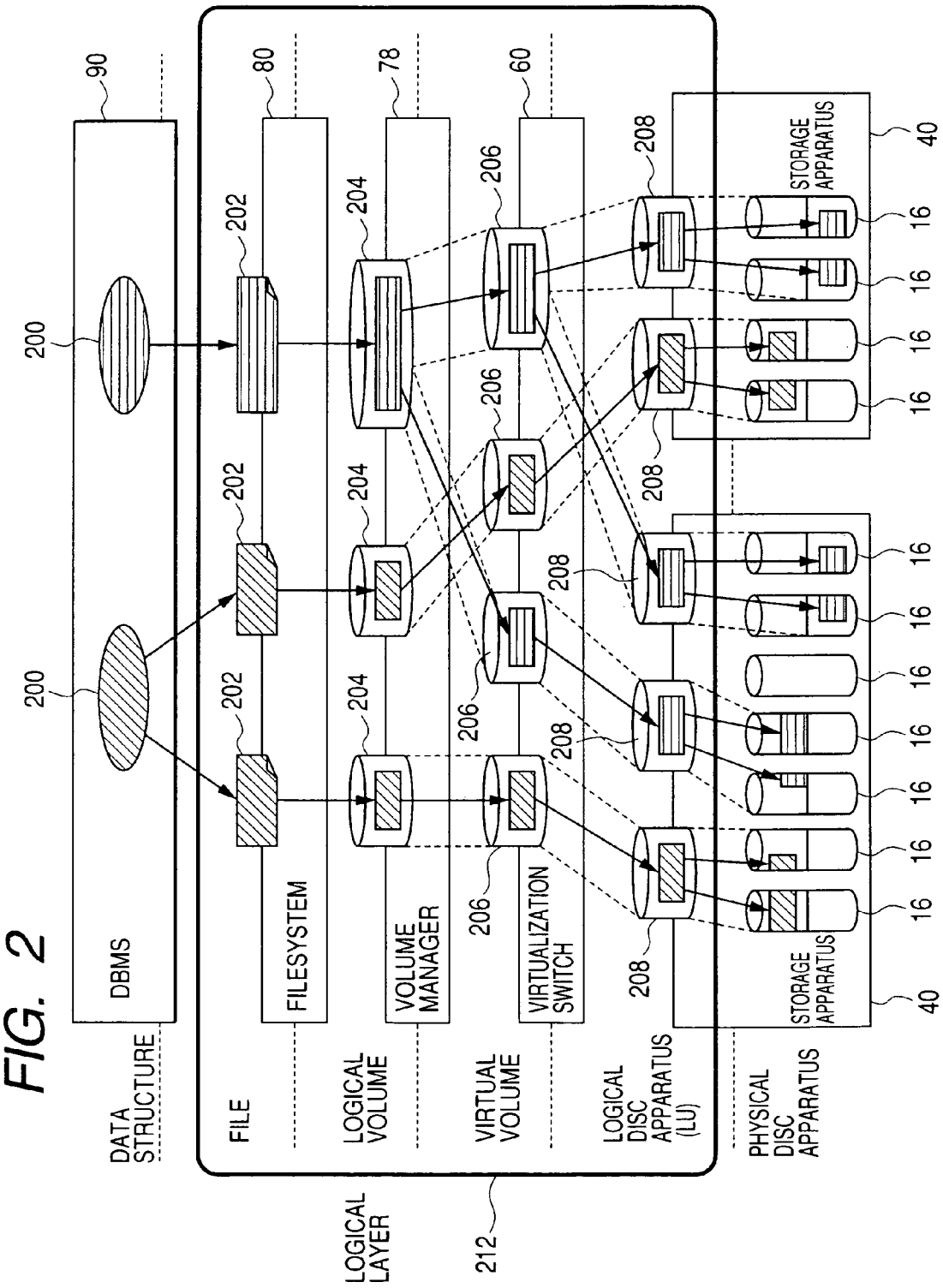
FIG. 2 shows the hierarchical configuration of mapping of data managed by a DBMS 90 in accordance with the first embodiment of the present invention.

By referring to FIG. 2, the following explains a hierarchical configuration of mapping of data managed by the DBMS 90 in accordance with the embodiment.

FIG. 2 shows the hierarchical configuration of mapping of data managed by the DBMS 90 in accordance with the first embodiment of the present invention.

In the configuration illustrated by this figure, only a virtualization switch 60 is provided between servers 70 and storage apparatus 40 for the purpose of simplifying the explanation. It is to be noted that, in the following description, one of two hierarchical layers, which is close to the DMBS 90 (that is, the hierarchical layer on the application side) is referred to as an upper-level hierarchical layer. On the other hand, one of two hierarchical layers, which is close to the HDDs 16 (that is, the hierarchical layer on the physical-storage-device side) is referred to as a lower-level hierarchical layer. The storage apparatus 40, the virtualization switch 60, the volume manager 78 and the file system 80 are collectively called a virtualization mechanism. A file 202, a logical volume 204, a virtual volume 206 and an LU 208 are collectively called a virtual structure whereas a virtual structure and an HDD 16 added thereto are collectively referred to as a management structure.

In the configuration shown in FIG. 2, the DBMS 90 makes an access to a file 202 presented by the filesystem 80 used for storing data structures 200 managed by the DBMS 90. The filesystem 80 converts the access to the file 202 into accesses to the storage area of a logical volume 204 corresponding to the accessed file 202. In turn, the volume manager 78 converts the access to the logical volume 204 into accesses to the storage area of a virtual volume 206 corresponding to the accessed logical volume 204. Then, the virtualization switch 60 converts the access to the virtual volume 206 into accesses to the storage area of an LU 208 corresponding to the accessed virtual volume 206. Finally, a storage apparatus 40 converts the access to the LU 208 into accesses to one HDDs 16 corresponding to the accessed LU 208. In this way, the virtualization mechanism maps the virtual structure's data presented by the virtualization mechanism to an upper-level hierarchical layer onto the management structure's one or more storage areas existing on a lower-level hierarchical layer.

In addition, a portion of data in a virtual structure can be mapped onto a plurality of storage areas of management structures existing on a lower-level hierarchical layer. However, this scheme is not explicitly shown in this figure. As an alternative, there may be a plurality of routes through which data of a virtual structure is mapped onto an HDD 16. In these cases, the virtualization mechanism should hold the information of such mappings in the area-mapping information 300. Moreover, there may also be a mapping scheme in which a management structure is shared by a plurality of servers 70.

In this embodiment, a relation associating data of a management structure with data of another management structure in a logical layer 212 needs to be clarified. So it is not necessary to use the volume manager 78 in the server 70. A plurality of virtualization switches 60 may be employed or the server 70 can be directly connected to the storage apparatus 40 by I/O paths 34 without using a virtualization switch 60. In place of the virtualization switch 60, it is also possible to employ a switch that does not have a function to virtualize a storage area. In this case, it is considered that a switch provides a virtual structure to the upper-level hierarchical layer which consists of the virtual structure provided from lower-level hierarchical layer directly.

It is to be noted that, in the model of the hierarchical structure provided by this embodiment, if mapping is created so that an LU 208 holds only one data structure 208, there will be resulted in a merit of being useful for improvement of the precision of an effect estimation in a process of changing the configuration of the storage apparatus 40 as will be described later.

(III) Data Structures

By referring to FIGS. 3 to 17, the following explains data structures used in a performance management method provided by this embodiment.

Figure 3:
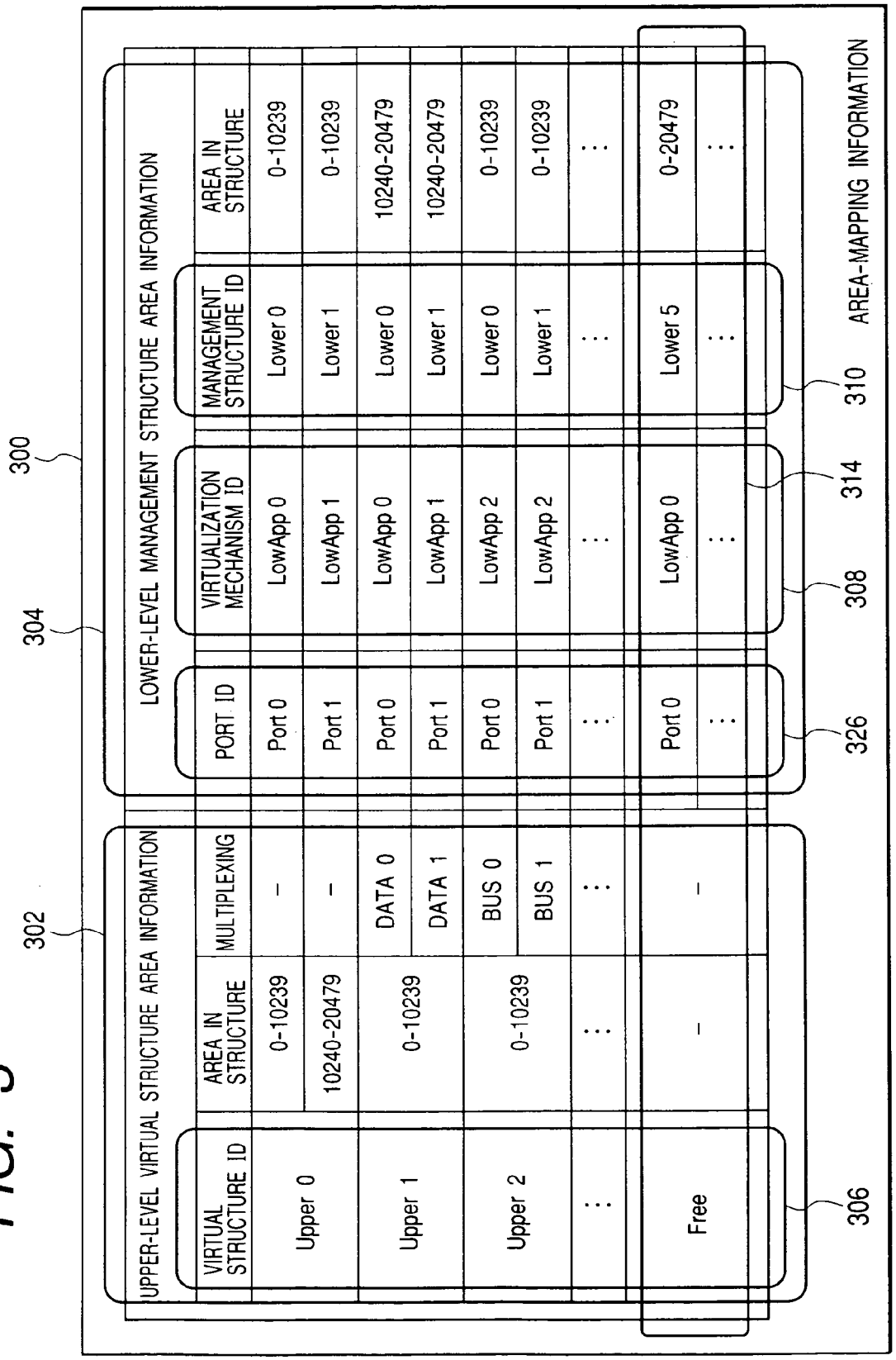
FIG. 3 shows the data structure of area-mapping information 300.

First of all, the area-mapping information 300 is explained by referring to FIG. 3. FIG. 3 shows the data structure of the area-mapping information 300. The area-mapping information 300 is included in the management information of each virtualization mechanism and contains a relation associating the storage areas of virtual structures presented by the virtualization mechanism with storage areas of management structures mapped to the virtual structures. The area-mapping information 300 has entries 302 and 304.

It is to be noted that, while the following description explains a model associating an upper-level virtual structure with a lower-level management structure, in actuality, a file is associated with a logical volume, a logical volume is associated with a virtual volume, a virtual volume is associated with an LU and an LU is associated with an HDD in dependence on the virtualization mechanism corresponding to the upper-level virtual structure and the lower-level management structure.

The entry 302 is information on the storage area of a virtual structure presented by the virtualization mechanism to the upper-level hierarchical layer. The entry 302 has a set of sub-entries described as follows: One of the sub-entries is used for holding virtual-structure IDs 306, which are each the identifier of a virtual structure. Another sub-entry shows the storage area in each structure. A further sub-entry indicates a multiplexing method of the virtual structure. To put it in detail, if the storage area in the structure is associated with a plurality of management structures on the lower-level hierarchical layer, or associated with HDDs 16 through different routes, the multiplexing method identifies the management structures or the HDDs 16.

The entry 304 is information on the storage area of a management structure on the lower-level hierarchical layer corresponding to the entry 302. The entry 304 has a set of sub-entries described as follows: One of the sub-entries is used for holding port IDs 326, which are each the identifier of a port 26 in the I/O path I/F 32 and through which the corresponding management structure is associated. Another sub-entry is used for holding virtualization-mechanism IDs 308, which are each the identifier of a virtualization mechanism presenting a management structure. A further sub-entry is used for holding management-structure IDs 310, which are each the identifier of a management structure. A still further sub-entry shows the storage area in the structure. It is to be noted that, when the file system 80 uses a logical volume 204 presented by the volume manager 78, the sub-entry for holding port IDs 326 is not included. In addition, in a storage apparatus 40, the sub-entry for holding port IDs 326 and the sub-entry for holding virtualization-mechanism IDs 308 are not included.

The storage areas corresponding to the free entries 314 are ones that can be used to form a new virtual structure by the virtualization mechanism having the area-mapping information 300 but are not utilized yet. The free entry 514 is identified by its virtual-structure ID 306 being set a value of 'Free'. The virtualization mechanism having a function to dynamically change the association relation due to a data migration can use the management structure's storage area corresponding to the free entry 314 as the destination of the data migration.

It is assumed that this embodiment allows different virtual structures to utilize the storage area of the same management structure. In addition, the virtualization mechanism ID 308, the virtual structure ID 306, the management structure ID 310 and the port ID 326 are each assumed to be an identifier uniquely determined in the system. If not, by adding the identifier of an apparatus, the virtualization mechanism ID 308, the virtual structure ID 306, the management structure ID 310 and the port ID 326 each become an identifier uniquely determined in the system.

Next, upper-level-port-mapping information 322 is explained by referring to FIG. 4.

FIG. 4 shows the data structure of the upper-level-port-mapping information 322. Included in the management information 66 of a virtualization switch 60 and the management information 46 of a storage apparatus 40, the upper-level-port-mapping information 322 is information for managing what ports can be used to access a virtual structure presented to an external apparatus. The upper-level-port-mapping information 322 has a pair of entries. One of the entries holds port IDs 326 and the other holds virtual-structure IDs 306.

Next, data storage area information 342 is explained by referring to FIG. 5. FIG. 5 shows the data structure of the data storage area information 342. Included in the DBMS management information 92 of a server 70, the data storage area information 342 is information used in management of storage areas of data managed by the DBMS 90. The data storage area information 342 has a set of entries described as follows: One of the entries is used for holding data area names 344, which are each the name of a data area. Another entry is used for holding data structure names 346, which are each the name of a data structure. A further entry is used for holding data storage locations 348, which are each information indicating which location in a file 202 the data has been stored.

Figure 6:
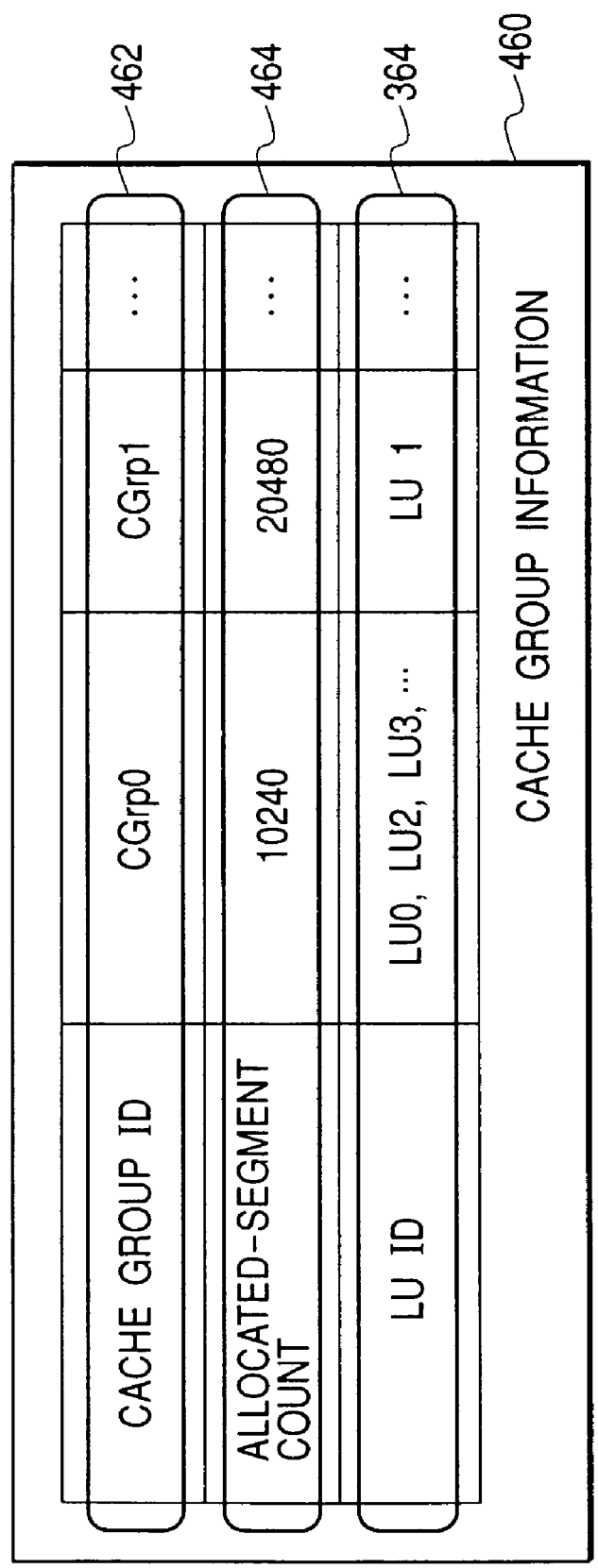
FIG. 6 shows the data structure of cache group information 460.

Next, the cache group information 460 is explained by referring to FIG. 6. FIG. 6 shows the data structure of the cache group information 460. Included in the management information 46 of a storage apparatus 40, the cache group information 460 is information used by the storage apparatus 40 in managing cache groups. The cache group information 460 has a set of entries described as follows: One of the entries is used for holding cache-group IDs 462, which are each the identifier of a cache group. Another entry is used for holding allocated-segment counts 464, which are each the number of cache segments allocated to a cache group. A further entry is used for holding LU IDs 364, which are each the identifier of an LU 208 pertaining to a cache group.

Next, storage monitored information 360 is explained by referring to FIG. 7. FIG. 7 shows the data structure of the storage monitored information 360. Included in the management information 46 of a storage apparatus 40, the storage monitored information 360 holds data concerning the operating state of the storage apparatus 40. The data includes cache monitored information 362, storage port monitored information 382 and HDD monitored information 392.

The cache monitored information 362 is operating state statistics of cache hits when accesses are made by external apparatus to an LU 208. The cache monitored information 362 includes a real part group count 502 and a virtual part group count 504. The groups introduced by the division of the management list for the LRU replacement algorithm are explained above. The real part group count 502 is the number of groups of the real part of the management list. The virtual part group count 504 is number of groups of the virtual part of management list. Statistics of a cache-hit count for each LU 208 include a set of entries, that is, an entry for holding LU IDs 364, an entry for holding I/O types 366 each indicating a read or write operation carried out on the LU 208, an entry for holding a execution cumulative count 368 for each I/O operation indicated by the I/O type 366 and an entry for holding a cache-hit cumulative count 370 for each read operation. The cache-hit cumulative count 370 is the cumulative number of cache hits. It is to be noted that the cache-hit cumulative count 370 for an I/O operation comprises a total cache-hit cumulative count for the real part of the management list and a cache-hit cumulative count for each group of the management list. The cache hit on a group means that the entry corresponding to the accessed data exists in the group of the management list. In this embodiment, sequence numbers are assigned to the groups of both the real and virtual parts according to the recentness of the data which are managed by the entries in the group. That is, the smaller sequence number assigned to a group, the more recently used data is managed by the entry in the group. For instance, the group to which the entries corresponding to the most recently used data belong is referred to as first group and so on.

The storage port monitored information 382 is statistics of how much data transfer processing has been carried out by using a port 26 of an I/O path I/F 32 for each LU 208. The storage port monitored information 382 has a set of entries, that is, an entry for holding port IDs 384, an entry for holding LU IDs 364, an entry for holding executed I/O processing cumulative counts 368 and an entry for holding cumulative transferred data amounts 386.

The HDD monitored information 392 is statistics of how many times an HDD 16 has been used for each LU 208. The HDD monitored information 392 has a set of entries, that is, an entry for holding HDD IDs 394, which are each the identifier of an HDD 16, an entry for holding LU IDs 364 and an entry for holding cumulative processing times 396, which are each a cumulative time of processing actually carried out on an LU 208. A cumulative time of processing does not include a wait time.

Next, port-throughput-setting information 440 is explained by referring to FIG. 8. FIG. 8 shows the data structure of the port-throughput-setting information 440. Included in the management information 46 of a storage apparatus 40, the port-throughput-setting information 440 is set information provided for a priority-access control function to limit the amount of access processing carried out on a specific port 26 from a particular port 26 of an external apparatus. The port-throughput-setting information 440 has a set of entries, that is, an entry for holding port IDs 384, an entry for holding indicator port IDs 442, an entry for holding maximum transferred-data amounts 444 and an entry for holding maximum I/O processing amounts 446.

An initiator port ID 442 is the ID of the port 26 of an external apparatus from which access requests are issued to the port 26. A maximum transferred-data amount 444 is a value of a maximum transfer quantity per unit time set for the port 26. A maximum transferred-data amount 446 is a setting value of a maximum I/O processing amount per unit time.

Next, port monitored-information 400 is explained by referring to FIG. 9. FIG. 9 shows the data structure of the port monitored information 400. Included in the management information 66 of a virtualization switch 60 and the OS management information 74 of a server 70, the port monitored information 400 is statistics of a data transfer process carried out by using a port 26. The port monitored information 400 has a set of entries, namely, an entry for holding port IDs 384, an entry for holding I/O types 366 each provided for the port ID 384, an entry for holding executed I/O processing cumulative counts 368, an entry for holding cumulative response times 402 and an entry for holding cumulative transferred data amounts 386. A cumulative response time 402 is a cumulative value of a response time, which is a period of time between the issuance of a request for a process or the acceptance of such a request and the completion of the process. A cumulative response time 402 includes wait times.

Next, on-line-job monitored information 430 is explained by referring to FIG. 10. FIG. 10 shows the data structure of the on-line-job monitored information 430. Included in the AP management information 102 of a server 70, the on-line-job monitored information 430 is statistics of execution of on-line jobs for an AP program 100. The on-line-job monitored information 430 has a set of entries, namely, an entry for holding processing IDs 432, an entry for holding executed processing cumulative counts 368 each provided for the processing, an entry for holding cumulative response times 402 each provided for the processing and an entry for holding cumulative processing times 396 each provided for the processing, a request for which has been issued to the DBMS 90.

Next, storage performance information 610 is explained by referring to FIG. 11. FIG. 11 shows the data structure of the storage performance information 610. Included in the system management information 142 of the management apparatus 120, the storage performance information 610 has HDD performance information 612 and port performance information 616. The storage performance information 610 is created by acquiring the information on models of a storage apparatus 40 and a member corresponding to the storage apparatus 40 and combining the acquired information on models with performance information of each model provided in advance.

The HDD performance information 612 is information on the access performance of an HDD 16. The HDD performance information 612 has a set of entries, that is, an entry for holding apparatus IDs 572, which are each the identifier of a storage apparatus 40, an entry for holding HDD IDs 394 and an entry for holding access performance information 614, which is information on the access performances of an HDD 16 indicated by an HDD ID 394.

The access performance information 612 includes average response times for read and write operations. The read operation can be a cache-hit read operation or a cache-miss read operation. By the same token, the write operation can be a cache-hit write operation or a cache-miss write operation.

The port performance information 616 is information on a maximum performance of a port 26 of an I/O path I/F 32 employed in the storage apparatus 40. The port performance information 616 has a set of entries, that is, an entry for holding apparatus IDs 572, an entry for holding port IDs 384 and an entry for holding port performance information 618 for each port 26 indicated by a port ID 384. The port performance information 618 comprises a maximum I/O processing amount (IOPS) and a maximum data transfer quantity (MB/s), which represent the maximum performances of the port 26.

Next, monitored record information 510 is explained by referring to FIG. 12. FIG. 12 shows the data structure of the monitored record information 510. Included in the system management information 142 of the management server 120, the monitored record information 510 is monitored information collected by apparatus and programs. To put it in detail, the monitored record information 510 is created by collecting the cache monitored information 370, the storage port monitored information 382, the HDD monitored information 392, the port monitored information 400, the on-line job monitored information 430 and the utilization ratio of the CPU 12 of the servers 70, which have been described earlier. The utilization ratio of the CPU 12 is computed by the OS 72. The collected pieces of information are then edited to the proper form to be stored in the monitored record information 510. A monitored member ID 514 is assigned to a member for which an operating state is monitored. The monitored member ID 514 is an ID determined uniquely in the system. Further, the monitored member ID 514 corresponding to the cache monitored information 370, the storage port monitored information 382, and the HDD monitored information 392 is generated with taking account of the LU io8 of the access target.

The monitored record information 510 has a set of entries, that is, an entry for holding monitored member IDs 514, an entry for holding monitored contents 516 for each monitored member ID 514, an entry for holding previously acquired information 518 for each monitored member ID 514 and an entry for holding record information 520. Concrete contents corresponding to the monitored contents 516 are as explained in the description of the data structures of pieces of monitored information.

For each monitored member ID 514, the previously acquired information 518 has a set of entries, that is, an entry for holding the date and time at which the previously monitored information was acquired and an entry for holding the previously monitored information itself.

The record information 520 has a set of entries, that is, an entry for holding record contents 522, which indicate the type of the data collected and stored as a record, and a plurality of other entries for holding the same plurality of records 524, which are each a value monitored during a certain period of time. In this embodiment, many of the record contents 522 are determined from the contents of the storage port monitored information 382, the cache monitored information 370, the HDD monitored information, the port monitored information 400 and/or the on-line job monitored information 430. The record contents 522 corresponding to the storage port monitored information 382 are the average number of process executions and an average amount of transferred data in a port 26 of an I/O path I/F 32 in a storage apparatus 40. The average number of process executions and the average amount of transferred data are obtained for each LU 208. The record contents 522 corresponding to the cache monitored information 370 are the average number of executions for each read and write operations in an LU 208, an average hit rate on the read port for the LU 208 and an average hit rate of read operations carried out on each group. The average hit rate of read operations carried out on a group is defined as a ratio of the number of read hits on the group occurring in a period of time to the number of read operations executed on the LU 208 in the same period of time. The record contents 522 corresponding to the HDD monitored information are an utilization ratio factor of an HDD 16. This average utilization ratio is obtained for each LU 208. The record contents 522 corresponding to the port monitored information 400 are the average number of executions for each read and write operations, an average amount of transferred data and an average response time in a port 26 of an I/O path I/F 32 in a virtualization switch 60, a port 26 of an I/O path I/F 32 in a server 70 or a port 26 of the network I/F 22 in a server 70. The record contents 522 corresponding to the on-line job monitored information 430 are the average number of executions for each process of an AP program 100, an average response time for the processes and an average processing time of the processes. The record contents 522 also include a CPU utilization ratio, which is the utilization ratio of the CPU 12 of the servers 70 computed by the OS 72.

The records 524 comprise an entry showing a period of time, during which values of data stored in this entry were monitored, and an entry for holding the data. The values of the data are an average value and a maximum value, which were monitored during the period of time.

Figure 13:
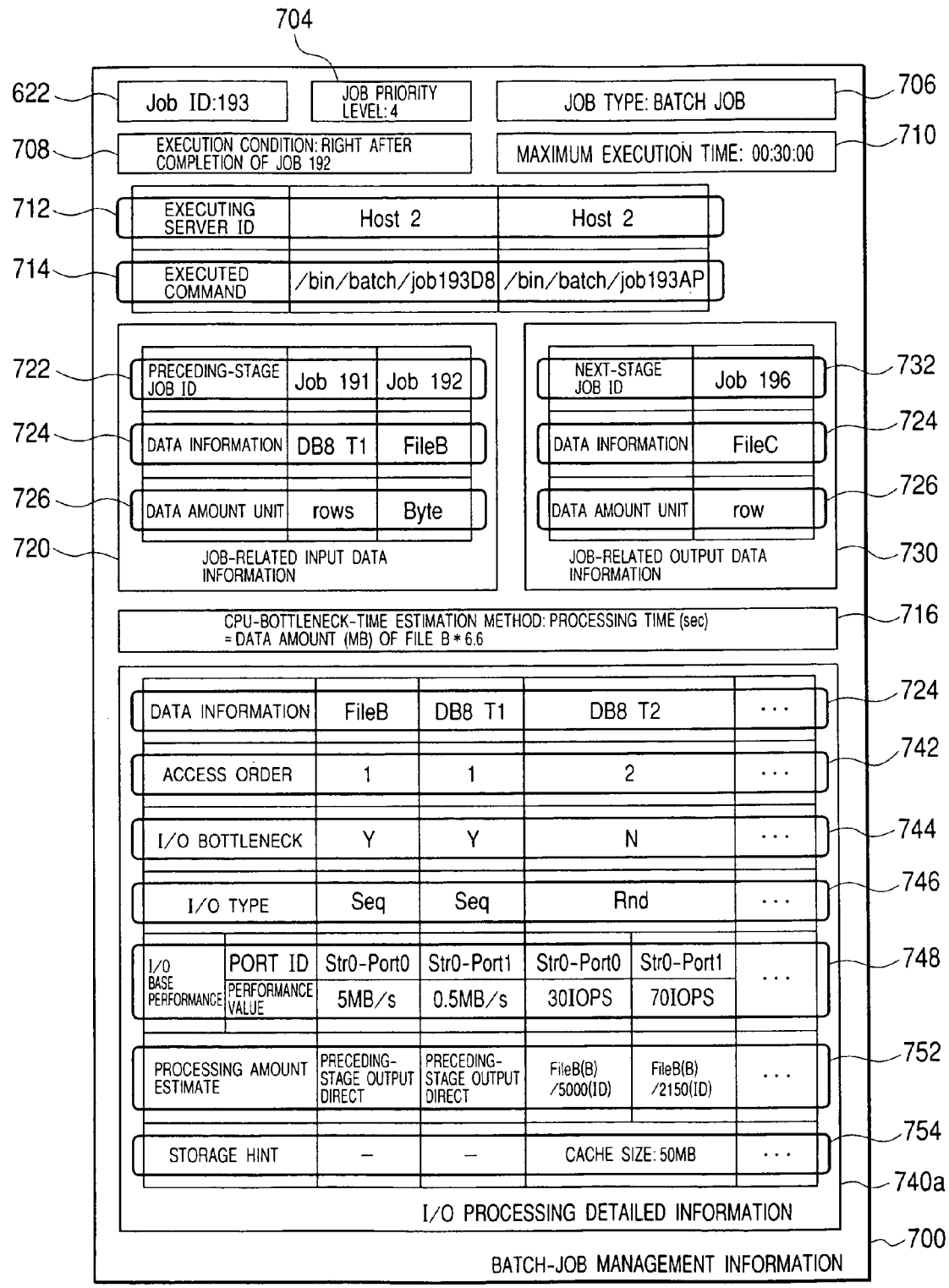
FIG. 13 shows the data structure of batch job management information 700.

Next, batch-job management information 700 is explained by referring to FIG. 13. FIG. 13 shows the data structure of the batch-job management information 700. Included in the system management information 142 of the management server 120, the batch-job management information 700 is information provided for the management of a batch job. The batch-job management information 700 has a set of entries, that is, an entry for holding a job ID 622, which is the identifier of a job, an entry for holding a job priority level 704, which is the execution priority level of the job, an entry for holding a job type 706, an entry for holding an execution condition 708 indicating a condition for starting the execution of the job, an entry for holding a maximum execution time 710, which is a set value of a permissible maximum execution time of the job, an entry for holding an executing-server ID 712, which is the identifier of a server 70 executing the job and an entry for holding executed commands 714 each executed by the server 70. In addition, the batch-job management information 700 also includes job related input-data information 720, job-related output-data information 730, a CPU-bottleneck-time estimation method 716 and I/O processing detailed information 740a, which is deleted information on data used by the job. There may be a plurality of ID pairs each consisting of an executing-server ID 712 and an executed command ID 714.

A job type 706 included in the batch-job management information 700 is information indicating that the job is a batch job. A typical execution condition 708 included in the batch-job management information 700 is an execution start time including a date and/or a day of the week, on which the execution of the job is to be started, or a condition stating that the execution of the job be started upon completion of one or more other jobs.

As a conceivable execution image of jobs in this embodiment, batch jobs are executed continuously one job after another and, data output by a job executed at the preceding stage is passed to a job executed at the later stage as input data.

The job related input-data information 720 is information on data used in the execution of the job, especially one generated by the job executed at the processing stage. The job-related input-data information 720 has a set of entries, that is, an entry for holding preceding-stage-job IDs 722, which are each the ID of a job outputting data to be used as input data by the job, an entry for holding data information 724, which is information on the input data, and an entry for holding data amount units 726, which are each a unit to measure the amount of the data corresponding to the entry. Examples of the data amount unit 726 are the number of lines in data and a file size.

The data information 724 is basically the identifier of data stored in a storage apparatus 40. The identifier of data stored in a storage apparatus 40 is typically the identifier of a file 202 or an information set comprising the identifier of the DBMS 90 and the identifier of a data structure 200 managed by the DBMS 90. The data information 724 can also be an identifier used for passing control information. It is to be noted that, if no process of the job strongly depends on any input data, the job-independent input-data information 720 does not exist.

The job-related output-data information 730 is information on data output by this job, especially one passed to a job executed at the later stage as input data. The job-related output-data information 730 has a set of entries, that is, an entry for holding a next-step-job ID 732, which is the job ID 622 of the other job, an entry for holding data information 724, which is information on the output data, and an entry for holding a data amount unit 726. The amount of output data, which is returned at the end of the execution of the job as process-end information is measured by the data amount unit 726 included in the job-realted output-data information 730. It is to be noted that, if no other job will use the output data, the job-related output-data information 730 might not exist.

The CPU-bottleneck-time estimation method 716 is the information how to estimate the length of the CPU-bottle neck-time of the job. In this embodiment, the CPU-bottle-neck-time is defined as the period of time when there is in a CPU bottleneck state. The CPU bottleneck state is the one when the CPU 12 in a server 70 becomes the performance bottleneck part.

The I/O processing detailed information 740a is information on data used by the job. The I/O processing detailed information 740a has a set of entries, that is, an entry for holding data information 724, which is information on pieces of data used by this job, an entry for holding an access order 742 of accesses made to the pieces of data, an entry for holding I/O bottlenecks 744, an entry for holding I/O types 746, an entry for holding I/O base performances 748, an entry for holding processing amount estimates 752, which are each information on a method of estimating a processing amount from an input data amount, and an entry for holding a storage hint 754, which is information requested to storage apparatuses 40 at an execution time. It is to be noted that the storage hint 754 can be system tuning parameters or the like. In this embodiment, however, the storage hint 754 is the amount of the cache required explicitly for caching the data in the storage apparatuses.

The access order 742 is information on an order of accesses. The lower the number specified in the access order 742, the earlier the corresponding data may be accessed. The data which have the same value of the access order 742 may accessed at the same time. An I/O bottleneck 744 is information indicating that the system executing the process may fall into a I/O bottleneck state when the corresponding data is accessed. The I/O bottleneck state is defined as the one when a element associated with the I/O processing becomes the performance bottleneck part. The value of an I/O bottleneck 744 is "Y" or "N". An I/O type 746 is the type of the I/O processing. The value of an I/O type 746 is "Sequential" or "Random". An I/O base performance 748 is an I/O performance used in estimating an execution time or the like. In consideration of the cases where the data are distributed among a plurality of storage apparatus 40 or the like, each I/O base performance 748 forms a pair of a performance value and a port ID 384 of each port 26 in each storage apparatus 40, through which the data is accessed. The port ID 384 is used in making an access to the data. In the case where I/O type 746 is "sequential", the I/O base performance 748 is set at a sequential performance indicating a data transfer speed. In the case where I/O type 746 is "random", the I/O base performance 748 is set at a random access performance (IOPS). A processing amount estimate 752 is provided for each port ID 384 included in I/O base performance 748.

Figure 14:
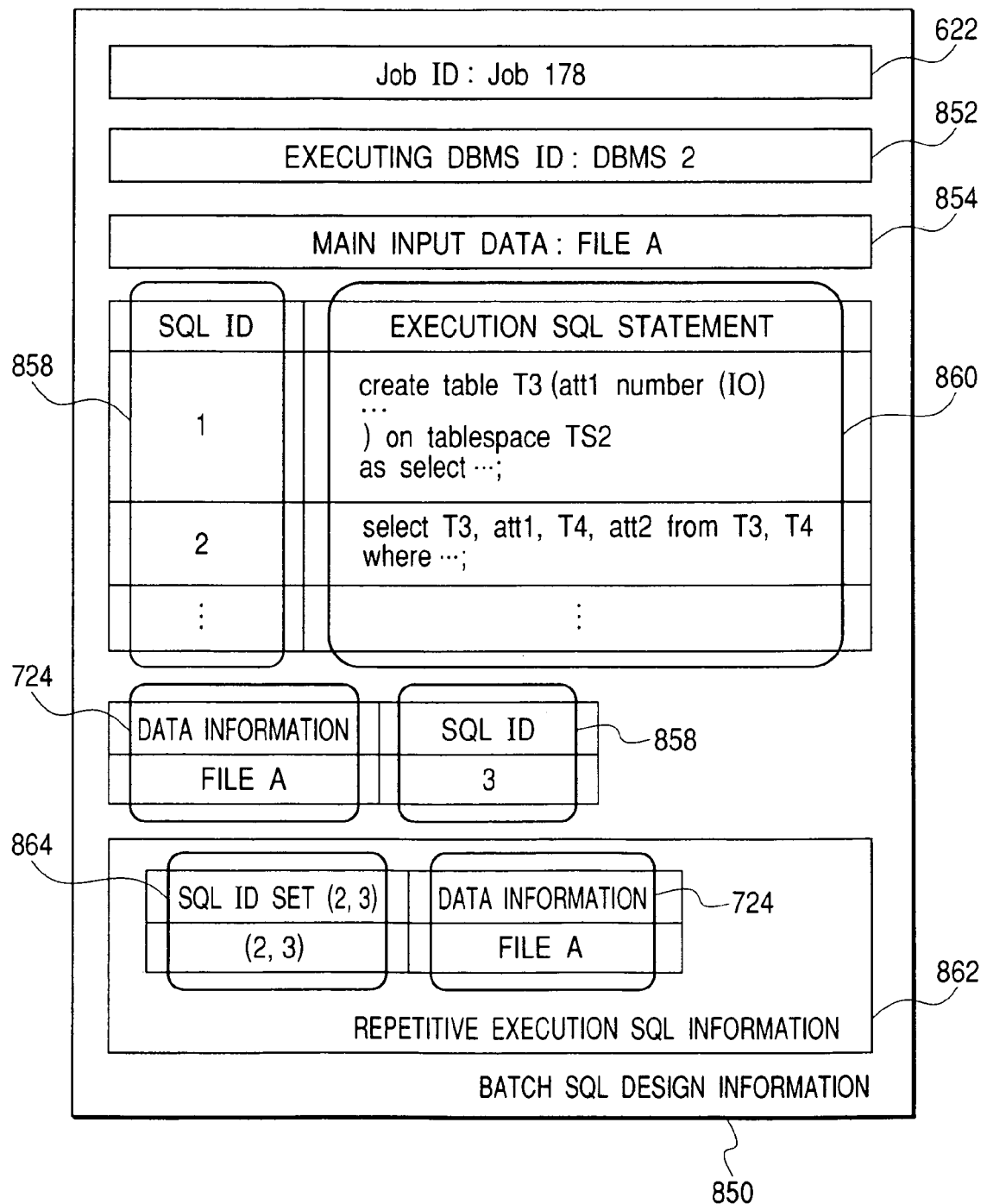
FIG. 14 shows the data structure of batch SQL design information 850.

Next, batch SQL design information 850 is explained by referring to FIG. 14. FIG. 14 shows the data structure of the batch SQL design information 850. The batch SQL design information 850 is information on processes that an AP program 100 requests a DBMS 90 to carry out. The batch SQL design information 850 is supplied to the management server 120 to set up the values of the entries in the batch-job management information 700. The batch SQL design information 850 has a set of entries, that is, an entry for holding a job ID 622, which is the identifier of a job for carrying out the setting work, an entry for holding an executing DBMS ID 852, which is the identifier of a DBMS 90 for carrying out the process, an entry for holding main input data 854, an entry for holding SQL IDs 858a and an entry for holding execution SQL statements 860 for the SQL IDs. In addition, the batch SQL design information 850 also has a set of entries, that is, an entry for holding data information 724 and an entry for holding an SQL ID 858b for the data information 724. Furthermore, the batch SQL design information 850 also includes repetitive execution SQL information 862.

The main input data 854 is defined as data, the amount of which most affects the CPU processing time of the AP program 100.

Each of the SQL IDs 858a is associated with an execution SQL statement 860. An execution SQL statement 860 is information on an SQL statement issued by the AP program 100 to the DBMS 90. The SQL IDs 858a are ascending numbers assigned sequentially in the older of the execution of the corresponding execution SQL statement 860 by the AP program 100.

A pair of the SQL ID 858b and data information 724 indicates that the execution SQL statement 860 corresponding to the SQL ID 858b uses the data of the file 202 identified by the data information 724 as the input/output data. That is, the execution SQL statement 860 corresponding to the SQL ID 858b reads data from or writes results to the file 202 identified by the data information 724.

The repetitive execution SQL information 862 is information on an execution SQL statement 860 to be executed repeatedly. The repetitive execution SQL information 862 has a set of entries, that is, an entry for holding an SQL ID set 864 and an entry for holding data information 724 on input data used in the repetitive executions. The SQL ID set 864 is a set of SQL IDs 858 identifying one or more execution SQL statements 860 to be executed repetitively at the same time.

Figure 15:
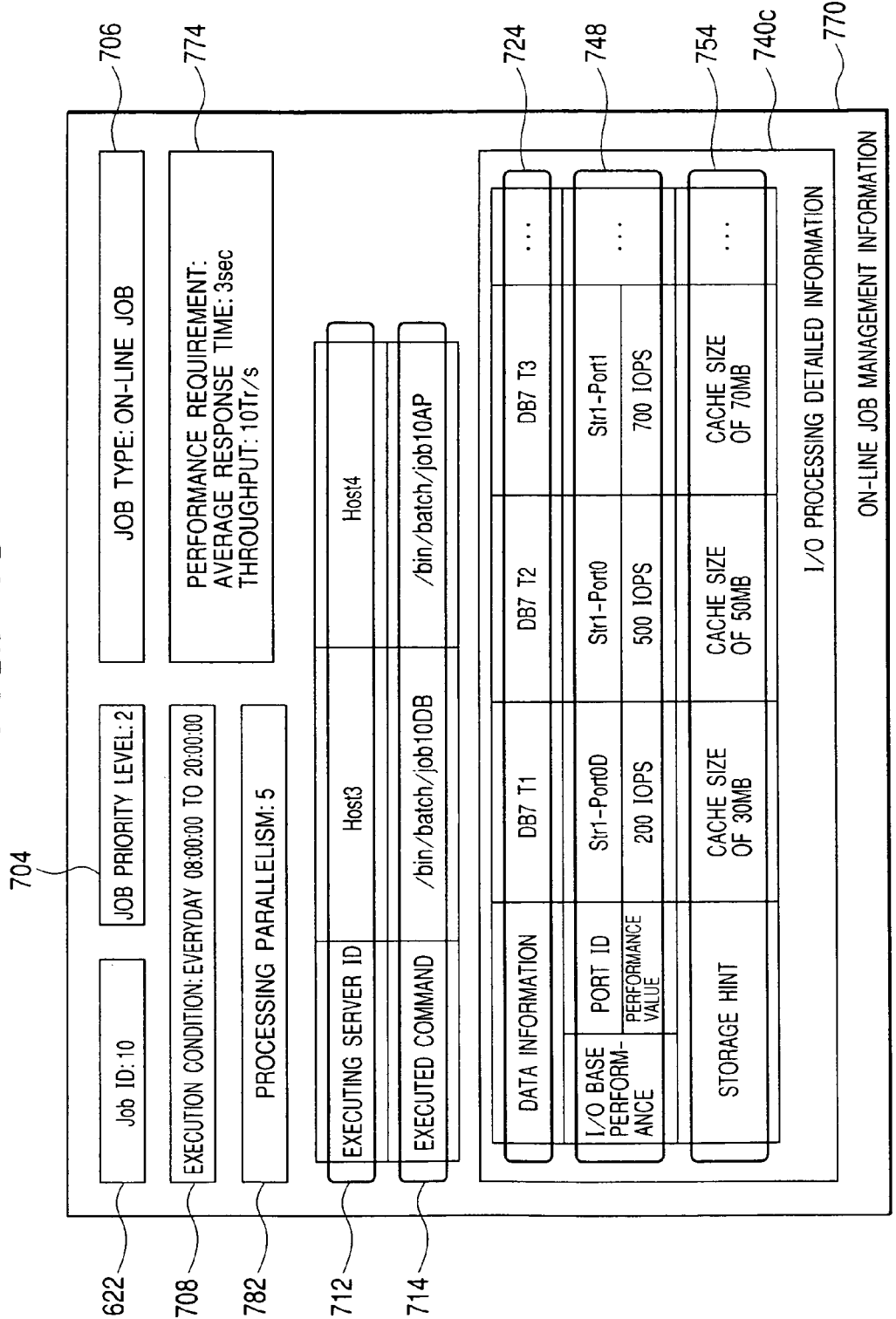
FIG. 15 shows the data structure of on-line job management information 770.

Next, on-line-job management information 770 is explained by referring to FIG. 15. FIG. 15 is a model diagram showing the data structure of the on-line-job management information 770. Included in the system management information 142 of the system management program 140, the on-line-job management information 770 is information used for managing on-line jobs. The on-line-job management information 770 has a set of entries, that is, an entry for holding a job ID 622, an entry for holding a job priority level 704, an entry for holding a job type 706, an entry for holding an execution condition 708, an entry for holding a performance requirement 774, an entry for holding executing server IDs 712 and an entry for holding executed commands 714. In addition, the on-line-job management information 770 also includes an entry for holding processing parallelism 782 and an entry for holding I/O process substance information 740c.

In this embodiment, the on-line-job management information 770 is separated from the batch-job management information 700 shown in FIG. 13 in consideration of the fact that there are differences in required performance characteristics and required for management between the two kinds of job.

In the case of the on-line-job management information 770, the job type 706 is information indicating that the job is an on-line job. It is also possible to provide a plurality of information sets each comprising an executing server ID 712 and an executed command 714. Typically, the execution condition 708 of the on-line-job management information 770 comprises an execution start time and an execution end time. Sometimes, the execution condition 708 may include the information which indicates that the job should always be running. The execution start time and the execution end time may each include a date or a day of the week on which the execution of the job is to be started and ended respectively. The performance requirement 774 is information about the performance that the job should keep. The performance requirement 774 includes an average response time of the entire process and a processing throughput on a heavy load which is represented by the average number of processed requests in a unit time.

The I/O process detailed information 740c is the same as the I/O process detailed information 740a included in the batch-job management information 700 shown in FIG. 13 except that some entries in the I/O process detailed information 740a is excluded. The I/O process detailed information 740c has a set of entries, that is, an entry for holding data information 724, an entry for holding I/O base performances 748 for the data information 724 and an entry for holding a storage hint 754. For setting the data information 724, data to be accessed by a process can be identified from design information of the job. A port ID 386 of a based performance 748 is identified by referring to mapping summarized information, which will be described later. The storage hint 754 is information on the requests to storage apparatuses. In this embodiment, if necessary, the amount of the cache required for coding the data in the storage apparatuses is set to the storage hint 754.

The value of an I/O base performance 748 in the I/O process detailed information 740c is a random access performance (IOPS). In accordance with a typical method to determine this value, the process is actually carried out and, at that time, the processing throughput and an I/O performance of the port 26 in the I/O path I/F 32 in a storage apparatus 40 are identified from monitored information. Then, an I/O performance necessary for achieving the processing throughput given to the performance requirement 774 is estimated by assuming that the I/O performance is proportional to the processing throughput. Finally, this estimated I/O performance is set as a value of the I/O base performance 748. It is to be noted that a plurality of data may have been stored in the same LU 208 by way of the same port 26. In such a case, the required performance is properly distributed among these data.

Figure 16:
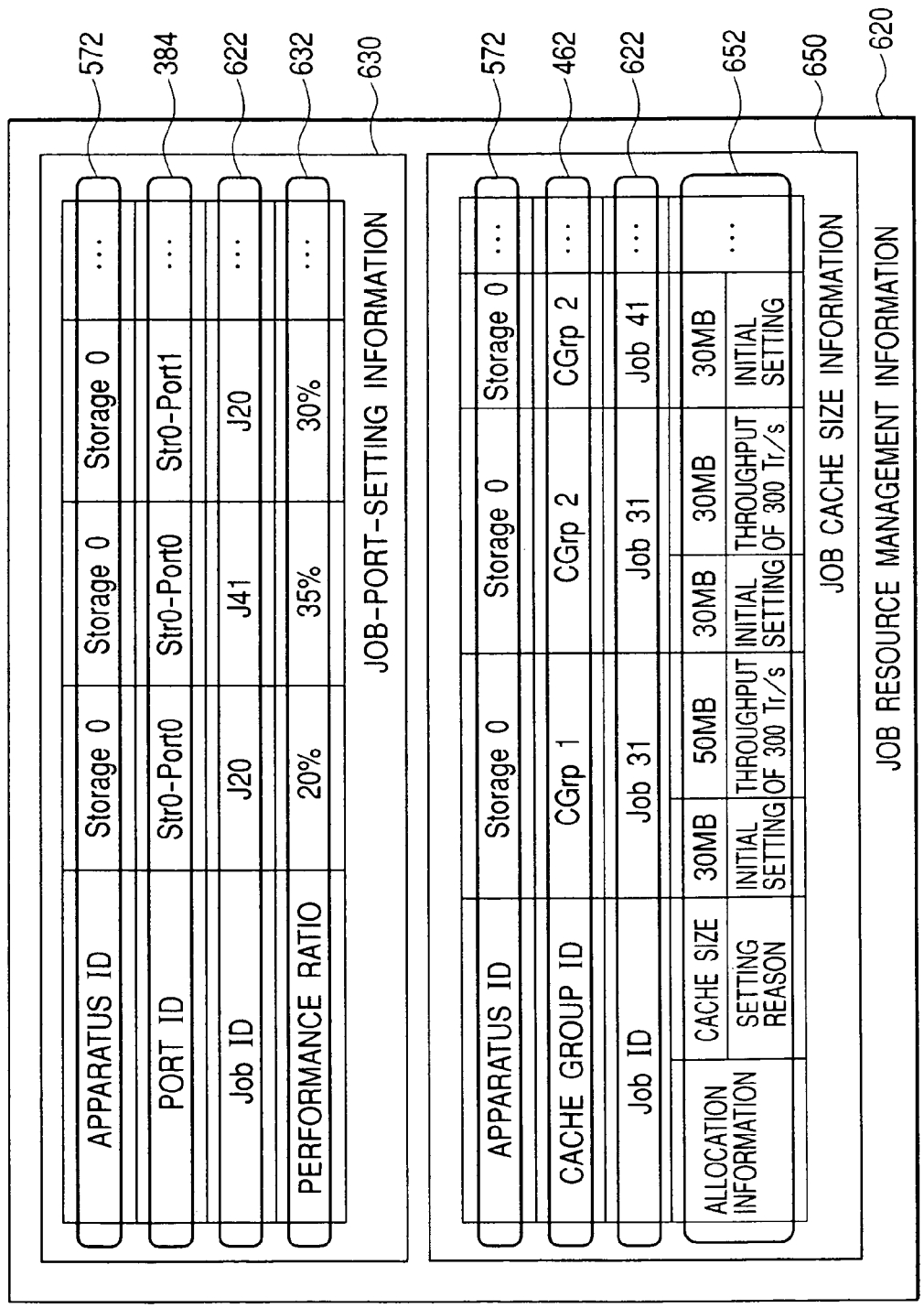
FIG. 16 shows the data structure of job resource management information 620.

Next, job-resource management information 620 is explained by referring to FIG. 16. FIG. 16 shows the data structure of the job-resource management information 620. The job-resource management information 620 is information used by the system management program 140 of the management server 120 as work information. The job-resource management information 620 comprises job-port-setting information 630 and job cache size information 650.

The job-port-setting information 630 is information on the jobs to use the port 26 and setting of the priority-access control function allocated to the job. The identifier of the job to use the port 26 and the settings of the priority-access control function allocated to the job are set for each port 26 of an I/O path I/F 32 in a storage apparatus 40. More specially, the job-port-setting information 630 has a set of entries, that is, an entry for holding apparatus IDs 572, an entry for holding port IDs 384, an entry for holding job IDs 622 each identifying the job accessing data by way of a port 26 and an entry for holding performance ratios 632 each allocated to the port 26 used by the job. It is to be noted that a performance ratio 632 of a port 26 is a performance indicator computed as a ratio of the performance allocated to the job on the port 26 to a maximum performance of the port 26 included in port performance information 616. In detail, an I/O processing amount and a transferred-data amount of a port 26 are computed as products of the performance ratio 632 of the port 26 and a maximum I/O processing amount and a maximum transferred-data amount respectively, which are included in port performance information 618.

The job cache size information 650 is information on the job using the LU 28 pertaining to a cache group and the size of a cache area allocated to the job. This information is provided for each cache group of a storage apparatus 40. More specially, the job cache size information 650 has a set of entries, that is, an entry for holding apparatus IDs 572, an entry for holding cache group IDs 462, an entry for holding job IDs 622 each identifying the job using data stored in the LU 208 pertaining to the cache group identified by a cache group ID 462 and an entry for holding allocation information 652, which is the size of a cache area allocated to a job.

In the allocation information 652, a plurality of generations of the information on the cache size are stored in a stack style. The information stored in the allocation information 652 consists of the information on the size of the cache area allocated to the job and the reason why the corresponding size was allocated for the cache area so as to return the old setting when the cause of resizing will be solved. It is to be noted that, if the size of the cache in the cache group allocated to the job is resized, the information about the size of the cache of the other cache groups associated to the job has to be updated synchronously even if they are not be resized.

Figure 17:
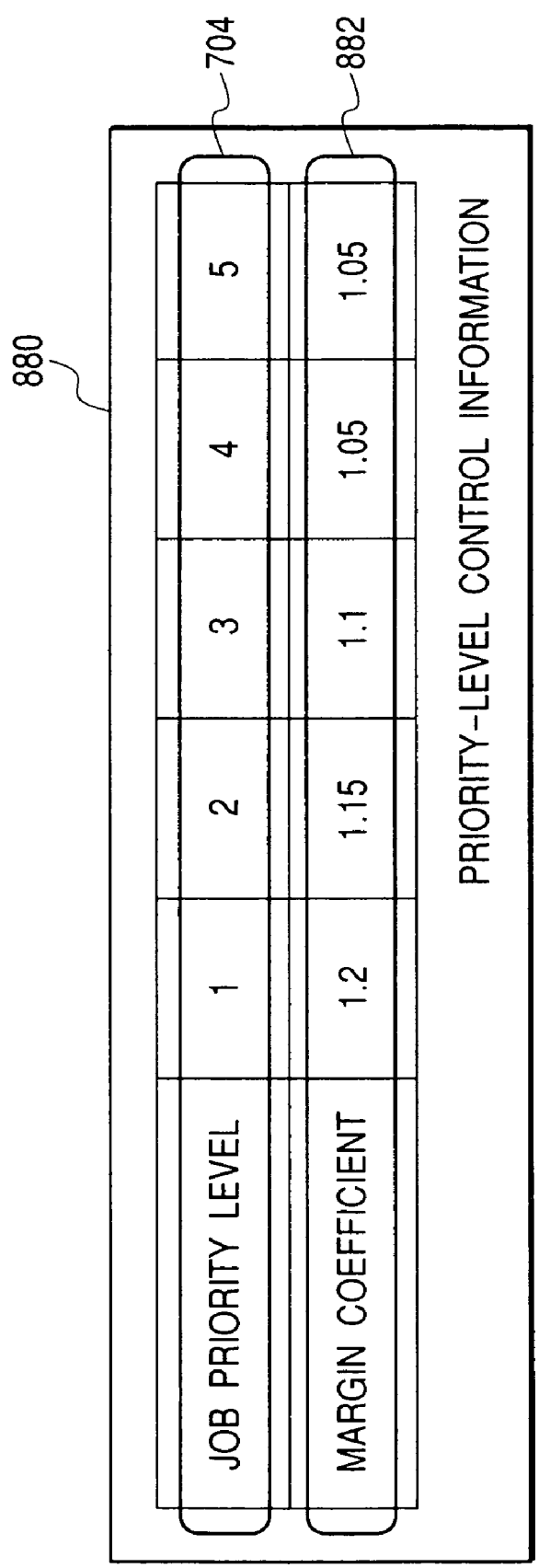
FIG. 17 shows the data structure of priority-level control information 880.

Next, priority-level control information 880 is explained by referring to FIG. 17. FIG. 17 shows the data structure of the priority-level control information 880. The priority-level control information 880 is set information used when the system management program 140 of the management server 120 executes control taking the priority level of a job into consideration. The priority-level control information 880 has a set of entries, that is, an entry for holding job priority levels 704 and an entry for holding margin coefficients 882 each associated with a job priority level 704.

In this embodiment, the job priority levels 704 are classified into P levels. A job priority at the highest level has a value of 1 to be followed sequentially by values of 2, . . . , and P assigned to job priority levels at the subsequent lower levels respectively. A margin coefficient 882 is a coefficient for estimating a margin for estimated data in a process of determining a setting modification method of a storage apparatus 40. The higher the priority level 704 is, the higher the margin coefficient 882 provided for the priority level 704 is. In this embodiment, a margin coefficient 882 has a value of 1 or greater.

(IV): Processes of Performance Management Method

By referring to flowcharts shown in FIGS. 18 to 27, the following description explains processes of a performance management method provided by this embodiment.

(IV-1) Outline of Process of System Management Program

First of all, an outline of a process of the system management program 140 is explained. The system management program 140 is maintains the information about the system configuration. The system configuration is managed by assigning an identifier to each of system elements including the storage apparatus 40, the virtualization switches 60, the servers 70, the volume managers 78, the file systems 80, the DBMSes 90 and the AP programs 100. Information on topology about the network 24 and the I/O paths 34 is also stored in the system management information 142.

The system management program 140 collects various kinds of information from other apparatus. The system management program 140 acquires information held by the storage apparatus 40 and the virtualization switches 60 by issuing a request for transmission of the information directly to the storage apparatus 40 and the virtualization switches 60 by way of the network 24. The system management program 140 acquires information held by a program executed in a server 70 by issuing a request to read the information to the management agent 144 by way of the network 24.

The system management program 140 acquires the area-mapping information 300 from the each of virtualization mechanism, the data storage area information 342 from the DBMS 90, the upper-level-port-mapping information 322 from the storage apparatus 40 and the virtualization switches 60 and the cache group information 460 from the storage apparatus 40. These pieces of information are stored in the system management information 142 along with the identifiers of the sources providing the information as mapping summarized information.

In management of cache groups in storage apparatus 40, the system management program 140 handles a specific cache group as a 'free cache group', which is an object to be deleted by taking precedence of other cache groups through adjustment of the size of each allocated cache area. An LU 208 with no request for allocation of a cache area is controlled as an area pertaining to a free cache group.

The port-throughput-setting information 440 as well as the real part group count 502 and the virtual part group 504 which are included in the cache monitored information 362 are acquired from the storage apparatus 40, and stored in the system management information 142 along with the identifiers of the sources providing the information. For these pieces of information, after setting modification or after the lapse of a predetermined time, information is reacquired to verify the consistency of the stored data.

To explain the aforementioned mapping summarized information included in the system management information 142 in more detail, the system management program 140 also maintains information on mapping related to hardware resources of a job in execution in the system management information 142. For a server 70, the identifier of the server 70 executing a job, information indicating which data is accessed by a job, and information indicating which port 26 is passed through in making the access to the data are stored. As for a virtualization switch 60, information indicating which virtualization switch 60 is passed through in making an access to data by a job, information indicating which I/O path I/F 32 of the virtualization switch 60 is passed through in making the access to the data, and information indicating which port 26 of the I/O path I/F 32 is passed through in making the access to the data are stored. As for a storage apparatus 40, information indicating which storage apparatus 40 holds the data accessed by a job, information indicating which LU 208 of the storage apparatus 40 is utilized for the storing the data, information indicating which I/O path I/F 32 of the storage apparatus 40 is passed through in making an access to the LU 208, information indicating which port 26 of the I/O path I/F 32 is passed through in making the access to the LU 208, information indicating which HDD 16 is used for storing data of the LU 208, and information indicating which cache group the LU 208 pertains to are stored. The stored pieces of information are referred to hereafter as job-resource-mapping information.

(IV-2) Job Management Method of System Management Program and Setting Up the Values in Job Management Information The following description explains a job management method of the system management program and a process of setting up the values in the job management information.

The system management program 140 includes batch-job management information 700 as management information of a job for carrying out a batch work and on-line-job management information 770 as management information of a job for carrying out an on-line work in the system management information 142. Strictly speaking, these pieces of information are first stored in an HDD 16. When the system management program 140 is invoked, the system management program 140 loads the pieces of information into the system management information 142 stored in the memory 14.

As described earlier, the on-line-job management information 770 is separated from the batch-job management information 700 in consideration of the fact that there are differences in performance requirements and information for management of the two kinds of job. These differences are caused by difference in properties between them.

In the following description, job management information is used in referring to either the on-line-job management information 770 or the batch-job management information 700 or used as a generic name for both. Basically, the job management information is given by a system administrator. However, a part of the job management information is set by adoption of a method to be described later.

By the same token, the I/O process detailed information 740a included in the batch-job management information 700 and the I/O process detailed information 740c included in the on-line-job management information 770 are referred to as I/O process detailed information 740, which is a generic name given to both.

As described before, as a conceivable execution of jobs in this embodiment, batch jobs are executed continuously one job after another and, data output by a job executed at the preceding stage is inherited as input data by a job executed at the next stage. In jobs managed by using the batch-job management information 700, with regard to data specified in the job-related output-data information 730 thereof, the amount of data output by each of the jobs is returned as process-end information at the end of the job. Then, the execution time of the jobs carried out continuously is estimated on the basis of the process-end information and information included in the job management information 700.

In this embodiment, an AP program 100 executed for a job of a batch work outputs the amount of output data as the process-end information.

The following description explains a process to set up values of the batch-job management information 700. The batch-job management information 700 is given to each job of a batch work. Some entries of the batch-job management information 700, that is, the job ID 622, the job priority level 704, the job type 706, the execution condition 708, the maximum execution time 710, the executing server ID 712, the executed command 714, the job-related input information 720 and the job-related output information 730 are each information provided by a system administrator in advance prior to the execution of the job.

It is to be noted that a method to estimate a maximum execution time of a job will be described later in detail.

The CPU processing time estimation method 716 and the I/O processing detailed information 740a are set by actually measuring monitored information.

Figure 18:
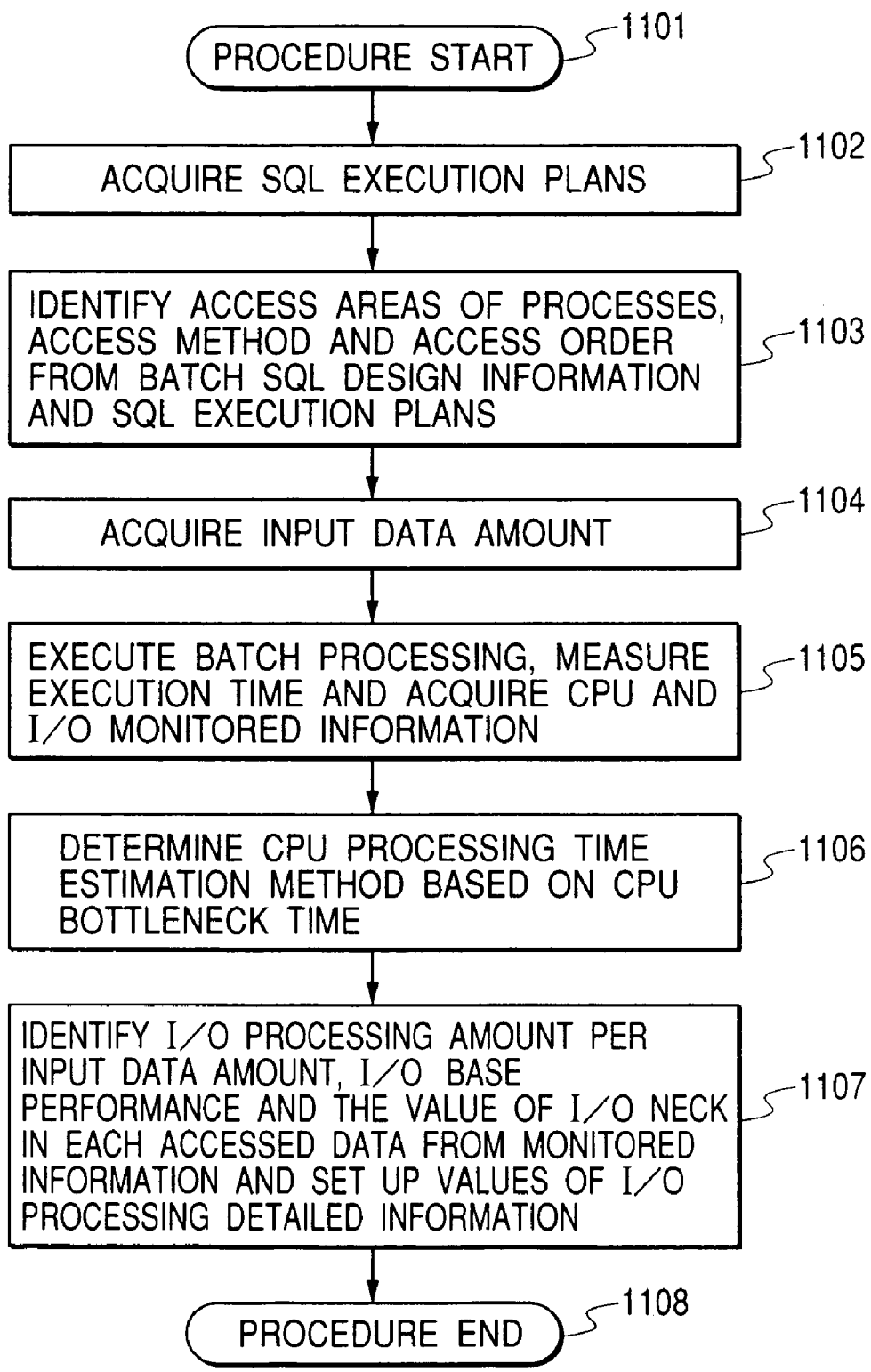
FIG. 18 shows a flowchart representing a process carried out to set a CPU processing time estimation method 716 and I/O processing detailed information 740a, which are included in the batch job management information 700, by actually measuring monitored information.

By referring to a flowchart shown in FIG. 18, the following description explains a process to set up the CPU-bottleneck-time estimation method 716 and the I/O processing detailed information 740a. FIG. 18 shows a flowchart representing the process carried out to set up the CPU-bottleneck-time estimation method 716 and the I/O processing substance information 740a, which are included in the batch-job management information 700, by actually measuring monitored information.

The procedure begins with a step 1101 at which other information included in the batch-job management information 700 and the batch SQL design information 850 shown in FIG. 14 are given by the system administrator. It is to be noted that, when this procedure is started, various kinds of data must exist in the system as is the case with an actual operation. First of all, at the next step 1102, a DBMS 90 carrying out the process is found from the executing DBMS ID 852 included in the batch SQL design information 850. Then, all SQL execution plans of SQL statements in the execution SQL statements 862 are acquired from the DBMS 90.

An SQL execution plan is information for executing the SQL statement and composed of detailed processing steps. In general, the relation among the steps which determines the execution order is described in a tree form. Each step is detailed by the information such as the data accessed and the operation performed (which corresponds to the access method to the data). It is to be noted that a table may be created explicitly but used temporarily but explicitly in the course of a process. In this case, an SQL execution plan of an SQL statement using this table is acquired after the table is created. If possible, a series of SQL statements of which a process of a job consists are executed by one and the SQL execution plan should be acquired just before the execution of the SQL statement. After all the SQL execution plans are acquired, the table to be used temporarily should be deleted.

Then, at the next step 1103, data to be accessed by SQL statements, the access method and the access order are found from information included in the acquired SQL execution plans and the batch SQL design information 850.

As described before, the information about accessed data, access methods to the data, and access orders to the data in an SQL statement can be obtained from the SQL execution plan.

As regards a temporary table created implicitly by the DBMS 90 in execution of a process, a data area name 344 given to a data area in which the temporary table is created is identified. An execution order including repetitions is known from the SQL ID 858 and the repetitive execution SQL information 862, which are included in the batch SQL design information 850. If one or more SQL statements are executed repeatedly, data accessed by the SQL statements is assumed to be all accessed at the same time in the repetitive process.

Then, data found as an access target and an access order are set in the data information 724, the access order 742 and the port ID 384 of the I/O base performance 748. As described before, the data information 724, the access order 742 and the I/O base performance 748 are included in the I/O processing detailed information 740a. If the same data is accessed at a plurality of different detailed processing steps, the data is treated as if the data were pieces of information independent of each other. The port ID 384 can be found along with a storage apparatus 40 including the port 26 identified by the port ID 384 by referring to the mapping summarized information included in the system management program 140. There is some possibility that a plurality of port correspond to a data. If the operation of the detailed processing step is a full scan of a table, the I/O type 746 is set at a value of "Sequential" or 'Seq' shown in FIG. 13. If the operation of the step is a select process using a B-Tree index, on the other hand, the I/O type 746 corresponding to both the index and the table data by the step are set at a value of "Random" or 'Rnd' shown in FIG. 13. Inputs to and outputs from a file 202 are all treated as "Sequential".

Then, at the next step 1104, the amount of data, which is input from an external source when the process is carried out from now on, is determined.

In regard to data set in the job-related input information 720, the amount of the data is determined in accordance with the data amount unit 726. In this embodiment, basically, a plurality of jobs forms a sequence of processes.

As mentioned above, each job-outputs the amount of output data as the process-end information to be stored in the system management information 142 so that the amount of output data generated by preceding jobs in the process sequence can be found in the system management information 142.

Subsequently, at the next step 1105, the process of the job actually carried out and the execution time is measured. In addition, the CPU utilization ratio of a server 70 executing the DBMS 90 and the I/O processing execution state of the storage apparatus 40 are monitored. The I/O processing execution state includes the number of I/O processing executed and the amount of transferred data.

The system management program 140 collects the data of, the operating state monitored by each apparatus. The interval at which the monitor function calculates the operating state (namely monitor sampling interval) should be short sufficiently compared with the execution time of the job. In order to reduce the system's load, if possible, the monitor sampling intervals should be shortened only at the servers 70 related to the execution of the process and the components in the storage apparatus 40 corresponding to the data obtained at the step 1103.

Then, at the next step 1106, from the acquired monitored information, the length of a period of time during which the CPU utilization ratio of the server 70 executing the DBMS 90 exceeds a predetermined threshold value, e.g., 80%, is calculated and a CPU-bottleneck-time estimation method 716 is determined by assuming that the length of CPU-bottleneck-time is proportional to the amount of data specified in the main input data 854 included in the batch SQL design information 850.

The quantity obtained at the step 1104 is used as the amount of input data.

Subsequently, at the next step 1107, the values of the I/O neck, the I/O base performance and the I/O processing amount per amount of input data are calculated for each accessed data from the monitored information and set into the I/O processing detailed information.

First, the samples of the monitor information associated to the accesses to the data by the process are identified using the information about the data to be accessed and their access order obtained at the step 1103. The monitored information was originally stored in the storage apparatus 40 as the storage port monitored information 382 and gathered at the step 1105.

Then, on each data accessed by the process, the monitored samples of the CPU utilization ratio of the server 70 executing the DBMS 90 which corresponds to the period when the data is considered to be accessed are compared with the CPU utilization threshold value introduced at the step 1106. If the monitored value of CPU utilization ratio exceeds the threshold value, it is not considered that the system falls into the I/O bottleneck state. In this case, the value of the corresponding I/O bottleneck 744 is set at "N". Otherwise, the value of the corresponding I/O neck 744 is set at "Y".

Next, on each data accessed by the process, the values which indicate the amount of I/O processing at the port 26 corresponding to the data included in the monitor samples identified in this step is grasped for each LU 208 and the value calculated as their average performance for each port 26 is stored into the I/O base performance 748. At that time, if the value of the I/O type 744 is "Sequential", the amount of transferred data is selected as the processing amount. If the value of the I/O type 744 is "Random", on the other hand, the number of I/O processing executions is selected as the processing amount. Then, the corresponding processing amount estimate 752 is set from the amount of input data obtained at the step 1104 and the amount of I/O processing for each port 26. It is to be noted that a plurality of different pieces of data may be stored in the same LU 208, and these pieces of data may be accessed through the same port 26. In this case, the amount of I/O processing may be appropriately apportioned among the different pieces of data.

Then, at the next step 1108, the execution of procedure is ended.

In this procedure, the storage hint 754 of the I/O processing detailed information 740a is not set. Instead, the system administrator sets the storage hint 754 after the execution of this procedure finishes. Setting the storage hint 754 may change the I/O processing performance so that, from the step 1105, the step 1107 is re-executed to reset the I/O neck 744 and the I/O base performance 748.

In this embodiment, the processing time of a job managed by the batch-job management information 710 is estimated to be equal to the sum of a CPU bottleneck time, the I/O bottleneck time, and the time affected by I/O delays in a CPU bottleneck state. The I/O bottleneck time is defined as the length of the period when there is in a I/O bottleneck state.

The CPU bottleneck time is computed from the CPU-bottleneck-time estimation method 716 and the amount of input data which can be found in the system management information 142 as the process-end information, as explained before.

The I/O bottleneck time is computed from the processing amount and then I/O processing performance available to the access of the data identified by the data information 724 for which the value of the corresponding I/O bottleneck 744 in the I/O processing detailed information 740a is "Y". This processing amount is determined by the information of the amount of input data provided as explained before and the processing amount estimate 752. To put it in detail, the I/O bottleneck time is calculated as a sum of them.

The processing performance available in each data access is computed as follows: First of all, for each piece of data accessed by a job, the ports 26 of the I/O path I/F 32 in the storage apparatus 40 are identified from the I/O base performance 748. The data are accessed through the identified port 26. Then, pieces of data are put in groups on the basis of the ports 26 identified for the pieces of data and the access order 742 for the pieces of data in order to find a set of pieces of data, which are accessed at the same time. A performance ratio 632 at the port 26, which can be utilized by a job in each of the groups, is either included in the job-port-setting information 630 or specified as a estimation condition. For each group, the identified performance ratio 632 is divided into a plurality of performance ratios each available for processing of the data belonging to the group at the port 26 in the way that the available performance ratio is proportional to a performance ratio computed from a performance value in the I/O base performance 748 of the corresponding port 26 associated with the data. Finally, the I/O processing performance at the port 26 available to access the data from now on is determined by the result of the calculation of the available performance ratio at the port 26.

The time affected by I/O delay in a CPU bottleneck state is computed as follows: For the data identified by the data information 724 for which the value of the corresponding I/O bottleneck 744 in the I/O processing detailed information 740a is "N", a I/O processing time with the current settings for the amount of the I/O processing is determined in the same way as the one used in the calculation of the I/O bottleneck time. Then, by the same token, an I/O processing time is calculated by assuming that system has the same I/O processing performance as specified in the I/O base performance 748. For each port 26 of the data, the latter is subtracted from the former to compute the value of the affected time. It is to be noted that, if the result of the subtraction become a negative number, the affected time is considered to be 0.

In this embodiment, the process-end information of the jobs at the preceding stages is utilized as one on the amount of the input data basically. If no job of the preceding stage exists as is the case with a job extracting data generated during a certain period of time by an on-line AP program 100 in an continuous execution, a job used for acquiring the amount of input data is created and carried out in advance so that the intended amount of input data can be output as a completion report. In this way, the amount of input data required in the estimation of a processing time can be included in the system management information 142. In the example described above, as the amount of input data, the number of processing executions in a processing period of a process carried out by execution of the AP program 100 is acquired from the monitored record information 510 and used as an execution count. It is to be noted that, instead of creating a data amount estimation job, a method of acquiring the amount of input data can be stored in the job-related input information 720 in advance and the amount of input data can be calculated then found by adoption of the method.

Figure 19:
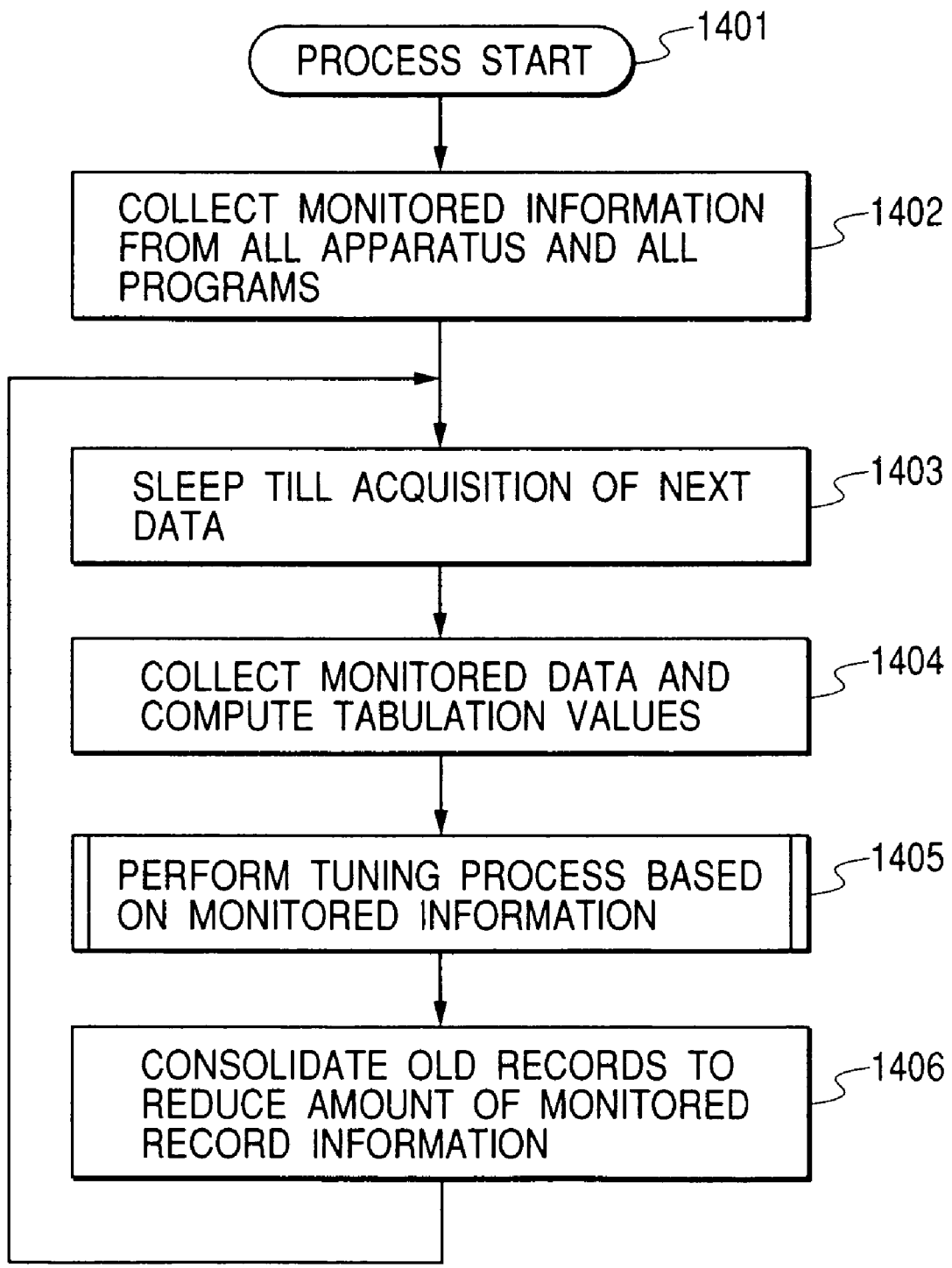
FIG. 19 shows a general flowchart representing a process carried out by a system management program to collect monitored information and a job-tuning process using the monitored information.
Figure 20:
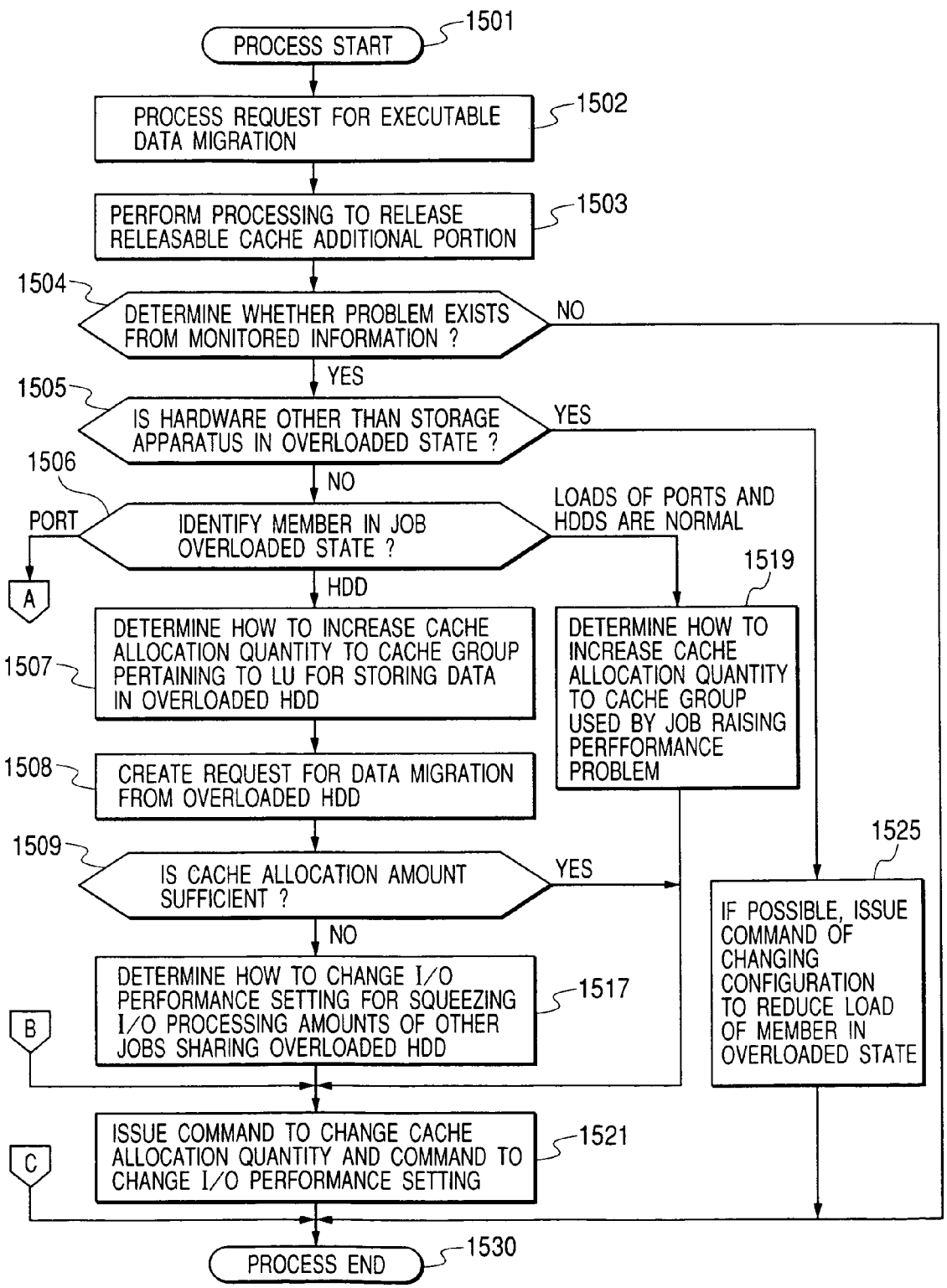
FIG. 20 shows part I of a general flowchart representing a job-tuning process using the monitored information.
Figure 21:
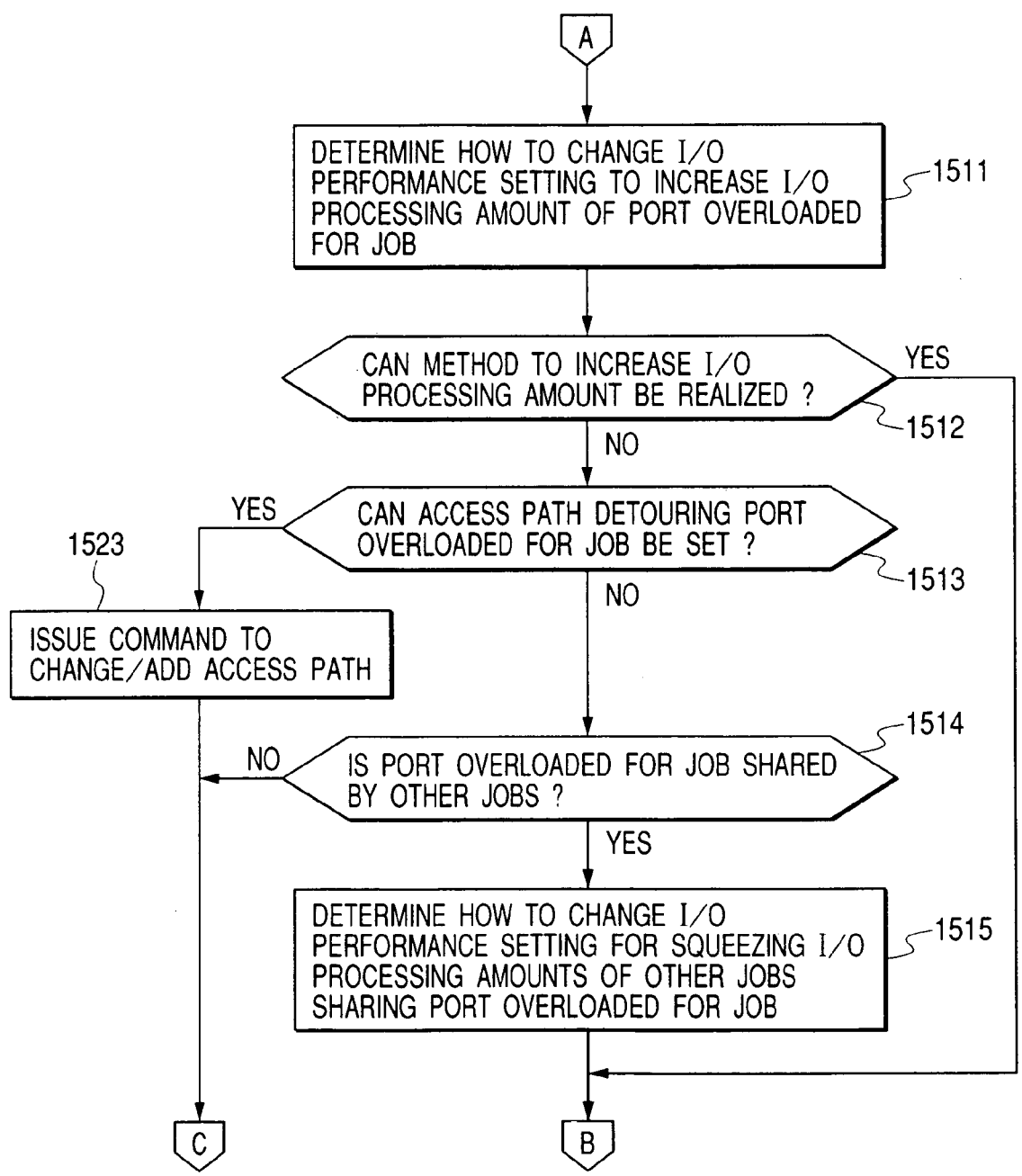
FIG. 21 shows part II of the general flowchart representing a job-tuning process using the monitored information.

(IV-3) Collection of Monitored Information by System Management Program and Job-Tuning Process Based on Monitored Information By referring to flowcharts shown in FIGS. 19 to 21, the following description explains a process to collect monitored information by the system management program and a job-tuning process based on the monitored information. The system management program collects monitored information, and the job-tuning process based on the monitored information is carried out during a period of time in which the system management program is running on the management server 120 to monitor the system endlessly.

FIG. 19 shows a general flowchart representing the process carried out by a system management program to collect monitored information and a job-tuning process using the monitored information. FIG. 20 shows part I of a general flowchart representing a job-tuning process using the monitored information and FIG. 21 shows part II of the general flowchart representing the job-tuning process using the monitored information.

The following describes how to store the monitored information into the monitored-record information 510: This process is started at a step 1401 upon completion of an initialization at an start-up time of the system management program 140 in the course of a start-up process of the management server 120. First of all, at the next step 1402, current values of the monitored information are collected as initial monitored values from all apparatus and all programs. The values are used for updating the corresponding entries for holding the acquisition date and time as well as the acquired values in the previously acquired information 518.

Then, at the next step 1403, the process sleeps till a next data acquisition time. It is to be noted that the data is acquired after the lapse of a predetermined period of time since the preceding acquisition of monitored values or at specific times determined in advance. For each monitoring target, the interval of data acquisition can be managed individually. That is to say, the interval for a monitoring target may vary from one for the others.

When the time to acquire data arrives, at the next step 1404, current values of the monitored information as well as the present date and time are acquired. Then, after these pieces of information have been acquired, the preceding acquisition date and time as well as the preceding monitored values, which have been stored in the corresponding preceding acquired information 518, are obtained. Subsequently, a method for computing values to be recorded into the record content 522 is selected on the basis of the monitored data 516. Finally, the inserted values are computed using the selected method.

Then, a period of time between the current date/time and the preceding date/time is computed. Subsequently, each calculated value is stored into the corresponding entry for holding the record 524 as both the average value and the maximum value during this period of time. Later on, the present date and time as well as the values of the currently acquired monitored information are stored in the preceding acquired information 518 as the preceding acquisition date and time as well as the acquired values respectively.

Then, at the next step 1405, a tuning process based on the monitored information collected, which begins with the step 1501, is carried out. This tuning process is represented by the flowcharts shown in FIGS. 20 and 21.

Subsequently, at the next step 1406, the records 524 for holding data aged enough are consolidated to reduce the amount of data in the monitored record information 510. In this context, the qualifier 'aged enough' means that a predetermined period of time has elapsed since it was acquired.

The records 524 are consolidated by a method based on the age of the data whereby:

1) a plurality of records 524 collected during a certain period of time is gathered to form a single record 524; and 2) data of particularly old records 524 is expired.

Then, after the process is completed, the flow of the procedure goes back to the step 1403 to repeat the process.

By changing the configuration of each apparatus, the number of members each serving as a target of monitoring can be dynamically increased or decreased. If the number of members each serving as a target of monitoring increases, the number of entries in the monitored record information 510 is also increased at the step 1404 and members corresponding to the additional entries are each made a target of monitoring. If a member serving as a target of monitoring is removed, on the other hand, data for the removed member is not collected in the processing carried out at the step 1404. If the records 524 corresponding to removed members are all expired at the step 1406, their entries are also all removed from the monitored record information 510.

By referring to the flowchart shown in FIGS. 20 and 21, the following description explains a job-tuning process based on monitored information. The job-tuning process based on monitored information is carried out at the step 1405 of the flowchart shown in FIG. 19.

Each step in this process is executed at the same time for all jobs in execution. The processing of the step is carried out sequentially from a job to another, beginning with a job having a highest job priority level 704. At a step 1515 and/or step 1517, if a plurality of jobs request that the data belong to the same HDD 16 should be migrated or the amount of I/O processing at the same port should be increased or decreased, the processing should be carried out on only a job with a highest job priority level 704. If a plurality of problems is determined to have been raised in a single job, each of the problems should be handled through its own processing path split as a path independent of other paths provided for the other problems.

The job-tuning process is started at a step 1501 when this process is called at the step 1405 of the flowchart shown in FIG. 19. First of all, at the next step 1502, each data migration request stored is checked whether it can be carried out or not. The data migration request is defined as the one to re-map a part of data in an LU 208 to a proper HDD 16 by migration of them in order to solve an overloaded state of an HDD 16. It is to be noted that the data migration request handled here was generated at a step 1508 to be described later in a job-tuning process carried out previously.

The largest values of the utilization ratio of an HDD 16 serving as a migration source and an HDD 16 serving as a migration destination are identified from the monitored record information 510. In this embodiment, only the utilization ratios which fulfill one of the as following conditions are used for this check:

1) be acquired most recently 2) correspond to the period of time during a predetermined time of typically 30 minutes from now at the day within a predetermined period of typically 1 week before now.

If both the largest values of the source and destination become smaller than a predetermined threshold value of typically 40%, the migration of data is judged to be executable. In the same way, if there is also a request for a migration of data in another virtualization mechanism, utilization ratio of members involved in the migration of data are examined and the migration of data is judged to be executable if the values of utilization ratio of all members are smaller than corresponding threshold values specified in advance. For a data migration request judged to be executable, the command to perform a migration of data is issued to the relevant virtualization mechanism. At this time, a plurality of commands for altering the setting of the apparatus and migrating the data may be issued corresponding to a data migration request, especially when the migration operation is performed in the virtualization mechanism other than the storage apparatus 40.

Then, the flow of the job-tuning process goes on to a step 1503 to check whether a storage area of the data cache 42 in the storage apparatus 40 can be released in a case where the job is currently using a cache area larger than an initial value.

A target cache area for releasing is confirmed by searching the allocation information 652 included in the job cache size information 650 shown in FIG. 16 for an entry having a quantity greater than that of the initial value (i.e. the data of the least recent generation). This search starts with the most recent generation and finds the most recent one on such condition. Then the reason why the cache area is enlarged is identified from the setting reason and the most recent data of the monitored record information 510 corresponding to the identified reason is checked whether or not the load has become smaller than predetermined fractions of a load included in the setting reason. An example of the predetermined proportions is 75%. If the load has become found smaller than the predetermined proportions, it is decided to restore the setting to a value of the immediately preceding generation currently checked. If a decision is made to restore the setting to a value of the immediately preceding generation, the data of even less recent generations in the allocation information 652 is checked in a repeated operation in the same way.

By carrying out this checking process, the generation to which the setting is to be restored is identified among the generations in the allocation information 652. If such a generation is identified, data of generations more recent than the restored setting in the allocation information 652 included in the job cache size information 650 is discarded. Then, a command is issued to the storage apparatus 40 to change the cache allocation quantity in conformity with the data of the specified generation to which the setting is restored.

Then, at the next step 1504, the most recent data of the monitored record information 510 is looked up to in order to check whether or not a problem has occurred.

For the job managed by using the on-line-job management information 770, that is, for an on-line job, the average response time, the most average processing time and the average number of executions for the processes of which the AP program 100 has consists are identified from the monitored record information 510 shown in FIG. 12. From these pieces of data, an average response time, an average utilization ratio and an average number of executions for the AP program 100 as a whole are computed. Then, the computed average response time is compared with the average response time included in the performance requirement 774 in the relevant on-line-job-management information 770 in order to determine whether the former satisfies the latter. In addition, if the average utilization ratio exceeds the product of the processing parallelism 782 and a threshold value determined in advance, e.g., 95%, the job has fallen into a heavy loaded state. In such a case, the average number of executions is examined to judge whether or not a processing throughput in the performance requirement 774 is satisfied. If either condition specified in the performance requirement 774 is not satisfied, it is considered that a problem has been raised.

For the job managed by using the batch-job management information 700, that is, for a batch job, on the other hand, the job-resource-mapping information is searched for HDDs 16 for storing the data utilized by the job. If the utilization ratio of the whole of the HDD 16 exceeds a predetermined threshold, e.g., 70%, it is considered that the HDD has fallen in an overloaded state.

If a problem has occurred, the flow of the job-tuning process goes on to a step 1505. If no problem exists, on the other hand, the flow of the job-tuning process goes on to a step 1530 at which the execution of the job-tuning process is ended.

At the step 1505, the most recent data of the monitored record information 510 shown in FIG. 12 is examined to judge whether or not an overloaded member other than the storage apparatus 40 exists in hardware relevant to the job.

The hardware relevant to the job includes the CPU 12 in a server 70, a port 26 of an I/O path I/F 32 in a virtualization switch 60 and in a server 70. These pieces of hardware can be identified by referring to the job-resource-mapping information. An overloaded state is recognized as a state in which the utilization ratio of a piece of hardware exceeds a value determined in advance for it. If such an overloaded member exists, the flow of the job-tuning process goes on to a step 1525. If such an overloaded member does not exist, on the other hand, the flow of the job-tuning process goes on to a step 1506.

If it is possible to provide a configuration for reducing a load of the member determined at the step 1505 to be an overloaded member, at the step 1525, a command is issued to the OS 72 running on a server 70 and/or a virtualization switch 60 to alter the configuration for reducing the load of the overloaded member. It is to be noted that, since the present invention puts emphasis on adjustment of the performance of a storage apparatus, a concrete method adopted at the step 1525 is not explained in detail.

If it was not judged at the step 1505 indicates that an overloaded member other than the storage apparatus 40 exists, as described above, the flow of the job-tuning process goes on to the step 1506 to judge as to whether or not a relevant member in the storage apparatus 40 for storing data used by the job is in an overloaded state. A member subjected to the judgment can be a port 26 of an I/O path I/F 32 or an HDD 16. As a relevant member in a storage apparatus 40, the way how to judge whether the HDD 16 has fallen into the overloaded state has been explained in the description of the step 1504.

As regards a port 26, the judgment is performed only if the job is managed by using the on-line-job management information 770. First of all, the job-resource-mapping information included in the system management information 142 is searched for each port 26 used by the job and every LU 208 accessed through each of the ports 26. The performance ratio 632 of each LU 208 at each port 26 is computed with the most recent data of the monitored record information 510 shown in FIG. 12. A sum of the computed performance ratios 632 is then calculated for each port 26. If the sum is greater than the predetermined proportion (e.g., 90%) of the performance ratio 632 of the port 26 allocated to the job, the port 26 is judged to be in an overloaded state for the job. Here, the performance ratios of the ports 26 allocated to the job are included in the job-port-setting information 630. If it was judged at the step 1506 that the relevant member in an overloaded state for the job is a port 26, the flow of the job-tuning process goes on to a step 1511 of the flowchart shown in FIG. 21. In this figure, the path to the step 1511 is indicated by symbol A. If the relevant member in an overloaded state for the job is an HDD 16, the flow of the job-tuning process goes on to a step 1507. If all relevant ports 26 and all relevant HDDs 16 are judged to be normal in the state, on the other hand, the flow of the job-tuning process goes on to a step 1519. If a plurality of overloaded members exists, at the following steps, each of the overloaded members is processed through its own processing flow. That is to say, the processing flow for the job may fork at this step.

As described above, if it was judged at the step 1506 that all relevant ports 26 and all relevant HDDs 16 are in the normal state, the flow of the job-tuning process goes on to the step 1519 to determine how to change the cache allocation quantity of a cache group used by the job in which a performance problem has arisen.

In this process, processing to tune the size of a cache area allocated to the on-line job is carried out for jobs arriving at this step sequentially from one job to another according to the job priority level 704, starting with a job having a highest job priority level 704. It is to be noted that the processing to tune the size of a cache area allocated to an on-line job will be described later in section IV-5 by referring to a flowchart shown in FIG. 25.

At that time, the cache group used by the job already processed by this step is identified from the job-resource-mapping information included in the system management information 142. When the process to tune the size of a cache area allocated to the on-line job is carried out for the subsequent jobs, the tuning process should prevent the cache allocation quantity of the cache groups utilized by the jobs already processed by this step from being reduced. This requirement is realized by calling the process to tone the size of a cache area with the argument of identifiers of the cache groups whose size should not be reduced. It is to be noted that the processing to tune the size of a cache area allocated to the on-line job may also be carried out after the size of each cache group utilized by the job currently processed by this step has been enlarged from its current size by a predetermined proportion (e.g., 5%) by reassigning the cache area of the free cache group.

Then, at the next step 1521, a command to change the cache allocation quantity in accordance with the policy determined at the step 1519 is issued to the corresponding storage apparatus 40 and, in accordance with this setting, the value of the job cache size information 650 included in the job-resource management information 620 shown in FIG. 16 is updated. Subsequently, at the next step 1530, the execution of the job-tuning process is ended.

As described above, if it was judged at the step 1506 that the relevant member in an overloaded state for the job is an HDD 16, the flow of the job-tuning process goes on to the step 1507 to judge as to whether or not it is possible to carry out a tuning process of enlarging a cache area of the cache group including the LU 208 which stores its data in the HDD 16 in the job overloaded state.

Before enlarging the size of cache group from the current value by a predetermined fraction, e.g., 5%, the job cache size information 650 is referred to in order to judge whether or not the cache area used for enlargement of the cache group can be secured from a free cache group. If the additional cache area can be allocated, a process to change the cache allocation quantity is carried out. If the additional cache area cannot be allocated, on the other hand, a securable quantity is all used in the tuning process. Different pieces of data used by the job may be stored in the HDD 16 raising the problem through different LUs 208. In such case, an average of LU processing time changes should be taken into consideration and the allocation process should be carried out so as to maximize their sum in the relevant LUs 208. It is to be noted that a process to determine a method of changing the cache allocation quantity by considering an average of LU processing time changes will be described later in section IV-5 by referring to a flowchart shown in FIG. 25. And this process should be carried out on the condition that the size of the cache group to which no relevant LUs 208 belongs should not be changed after the secured cache area was distributed to the relevant cache groups. When the allocation information 652 included in the job cache size information 650 is updated to a value determined at this step, the value is stored as data of a new generation. In the setting reason, the HDD ID 394 of the overloaded HDD 16 and the current utilization ratio of the HDD 16 are also stored.

Then, at the next step 1508, a request for a migration of data is created. The request is one for moving data of the LU 208 used by the job from the HDD 16 in an overloaded state to an HDD 16 with a normal load. This request is created as follows: First of all, the HDD 16 in an overloaded state is treated like as one of the migration source. Then, by referring to the job-resource-mapping information, an LU 208 used by the job utilizing the data at the highest priority level is identified as an LU 208 for a migration of the data among LUs 208 associated with the HDD 16 of the migration source. Subsequently, the storage apparatus 40 including the HDD 16 of the a migration source and the LU 208 for a migration of the data are identified. Then, a process to determine the method for getting rid of the overloaded state of the HDD 16 is then carried out based on the obtained information. Subsequently, a request for a migration of data is created from the result of the process and stored in the system management information 142. The process to determine the method for eliminating the overloaded state of the HDD 16 will be described later in section IV-5 by referring to a flowchart shown in FIG. 27.

After the creation of the request for a migration of data, the utilization ratio after the data migrations by the created requests is estimated by subtracting the utilization ratio of the LUs 208 used for moving the data from the one of the whole HDD 16. If the estimated value does not become smaller than the threshold value specified in advance (e.g., 60%), the LU 208 utilized by the job having the second highest priority level is selected as the LU 208 for a migration of data. Then, a process for determining a method to get rid of the overloaded state is carried out. This sequence of operations is executed repeatedly till either the estimated value of the HDD 16 of the migration source becomes smaller than the threshold value or the verification has been completed for all jobs.

It is to be noted that a virtualization switch 60 and/or a volume manager 78 may be capable of dynamically changing a relation associating virtual structures of upper layer with management structures of lower layer. In this case, if the creation of a request for a migration of data in the storage apparatus 40 ends in failure, the request for a migration of data in the virtualization switch 60 and/or the volume manager 78 can be created by correspondingly applying a process from the processing to determine a method to get rid of the overloaded state of the HDD 16. At that time, the following points should be taken into consideration.

(1) A new virtual structure may be created from a free area and data is moved to the newly created virtual structure.

(2) In determining a destination of data migration, not only is the utilization ratio of the HDD 16 examined, but the operating state of a port 26 on an access path toward the destination of a data migration should be also checked to assure that the estimated utilization ratio at port 26 after the migration of data does not exceed 100%. The utilization ratio is estimated in the same way as the one of an HDD 16 is estimated. The access path means a route of the I/O path 34 starting from a server 70 and ending at a storage apparatus 40.

(3) In a storage apparatus 40 serving as the destination of the data migration, a cache area of the same size as the present should be allocated to the cache group to which the LU 208 holding the migrated data pertains.

Then, the flow of the job-tuning process goes on to the next step 1509 to judge as to whether the cache area allocated at the step 1507 is sufficient or not.

Using an average of LU processing time changes computed for tuning the size of cache area, the cache area allocated at the step 1507 is judged to be sufficient if a sum of values in the relevant LU 208 is greater than a threshold value determined in advance. An example of the threshold value is 5% of the unit time. If the cache area allocated at the step 1507 was judged to be sufficient, the flow of the job-tuning process goes on to a step 1521. Otherwise, the flow of the job-tuning process goes on to a step 1517.

As described above, if the cache area allocated at the step 1507 is judged to be sufficient, the flow of the job-tuning process goes on to the step 1521 at which a command to change a cache allocation quantity determined so far and the setting of the I/O performance is issued to the corresponding storage apparatus 40 and the values of the job-port-setting information 630 and the cache size information 650, which are included in the job-resource management information 620 shown in FIG. 16 are updated in accordance with these settings.

The cache area allocated at the step 1507 was judged to be insufficient, on the other hand, the flow of the job-tuning process goes on to the step 1517 to judge as to whether or not it is possible to carry out a tuning operation to reduce the amount of I/O processing of the LU 208 used by the job to store data in the HDD 16 in the overloaded state. If a tuning operation can be carried out, the setting of the I/O processing is changed. It is to be noted that, this step, the step 1517 needs to be executed after the step 1515, which is executed asynchronously with this processing through a separate path, if a port has a problem.

In this processing, first of all, the job priority level 704 is obtained from the job management information of the job currently being tuned. The jobs the LU 208 to store data in the HDD 16 in the overloaded state are identified by referring to the job-resource-mapping information included in the system management information 124 and the job priority levels 704 of these identified jobs are gathered in the same way as that described above in order to find the job having the job priority level 704 lower than the job priority level 704 of the one currently being tuned obtained just before. Then, the ports 26 through which the LU 208 utilized by the jobs to store data in the HDD 16 in an overloaded state are obtained from the job-resource-mapping information. The value of the performance ratio 632 apportioned to the job at the port 26 included in the job-port-setting information 630 is reduced by a proportion determined in advance. It is to be noted that, if the number of direct accesses to the HDD 16 can be limited, the limit can be set directly.

Then, the step 1521 is executed before ending the execution of the job-tuning process at the next step 1530.

As described above, if it was judged at the step 1506 indicates that the relevant member in an overloaded state for the job is a port 26, the flow of the job-tuning process goes on to the step 1511 at which a method to get rid of the overloaded state is determined. First of all, the value the performance ratio 632 apportioned to the job at the port 26 in an overloaded state for the job is obtained by referring to the job-port-setting information 630 included in the job resource management information 620 shown in FIG. 16. Then, a method of changing the I/O performance to increase the value by a predetermined fraction, e.g., 5%, is determined.

Subsequently, the flow of the job-tuning process goes on to the next step 1512 to judge whether or not the I/O-performance-setting-changing method determined at the step 1511 can be realized. The realizability of the I/O-performance-setting-changing method determined at the step 1511 is verified by obtaining performance ratios 632 of jobs at the port 26 in an overloaded state for the job targeted for this tuning from the job-port-setting information 630 and computing the sum of the obtained performance ratios 632. If the sum does not exceed 100%, the I/O-performance-setting-changing method determined at the step 1511 is judged to be realizable. In this case, the flow of the job-tuning process goes back to the step 1521. If the sum exceeds 100%, on the other hand, the I/O-performance-setting-changing method determined at the step 1511 is judged to be impossible to be realized. In this case, the flow of the job-tuning process goes on to a step 1513.

As described above, if it was judged at the step 1512 that the I/O-performance-setting-changing method cannot be realized, the flow of the job-tuning process goes on to the step 1513 to judge whether or not the overloaded state can be eliminated by adding or changing the access path from a server 70 to the LU 208 in such a way of the port 26 raising the problem of an overloaded state for the job can be detoured.

The method to eliminate the overloaded state described above can be realized by making volume managers 78, virtualization switches 60, and storage apparatus 40 create and/or alter a plurality of access paths dynamically and determined by using the job resource management information 620 and/or other information included in the system management information 142. If the method can be realized, the flow of the job-tuning process goes on to a step 1523. If the method cannot be realized, on the other hand, the flow of the job-tuning process goes on to a step 1514.

As described above, if it was judged at the step 1513 that the access path can be changed or added, the flow of the job-tuning process goes on to the step 1523 at which commands are issued to the volume managers 78, the virtualization switches 60 and the storage apparatus 40 to realized the access path from a server 70 to the LU 208 in such a way that the port 26 raising the problem can be detoured. The access path is the one determined at the step 1513 to be newly created or obtained as a result of changing an existing path. Finally, the execution of the job-tuning process is ended at the next step 1530 at which the flow arrives through the path indicated by symbol C in the flowchart shown in FIG. 20.

As described above, if it was judged at the step 1513 indicates that an access path can be neither changed nor added, on the other hand, the flow of the job-tuning process goes on to the step 1514 at which the job-resource-mapping information is referred to in order to judge whether or not the port 26 raising the problem of an overloaded state is shared by a plurality of jobs. If the port 26 is shared by a plurality of jobs, the flow of the job-tuning process goes on to a step 1515. If only the job uses the port 26, on the other hand, it is judged that the job-tuning process cannot be carried out anymore. In this case, the flow of the job-tuning process goes on to the step 1530 at which the execution of the process is ended.

As described above, if it was judged at the step 1514 that the port 26 raising the problem of an overloaded state is shared by a plurality of jobs, the flow of the job-tuning process goes on to the step 1515 to determine a method of changing the setting of the I/O processing performance to squeeze the amount of I/O processing carried out by each other job sharing the port 26 raising the problem of an overloaded state with the problem-caused job. The process at this step (step 1515) is carried but for only one job having the highest job priority level 704 among the problem-caused jobs.

Figure 26:
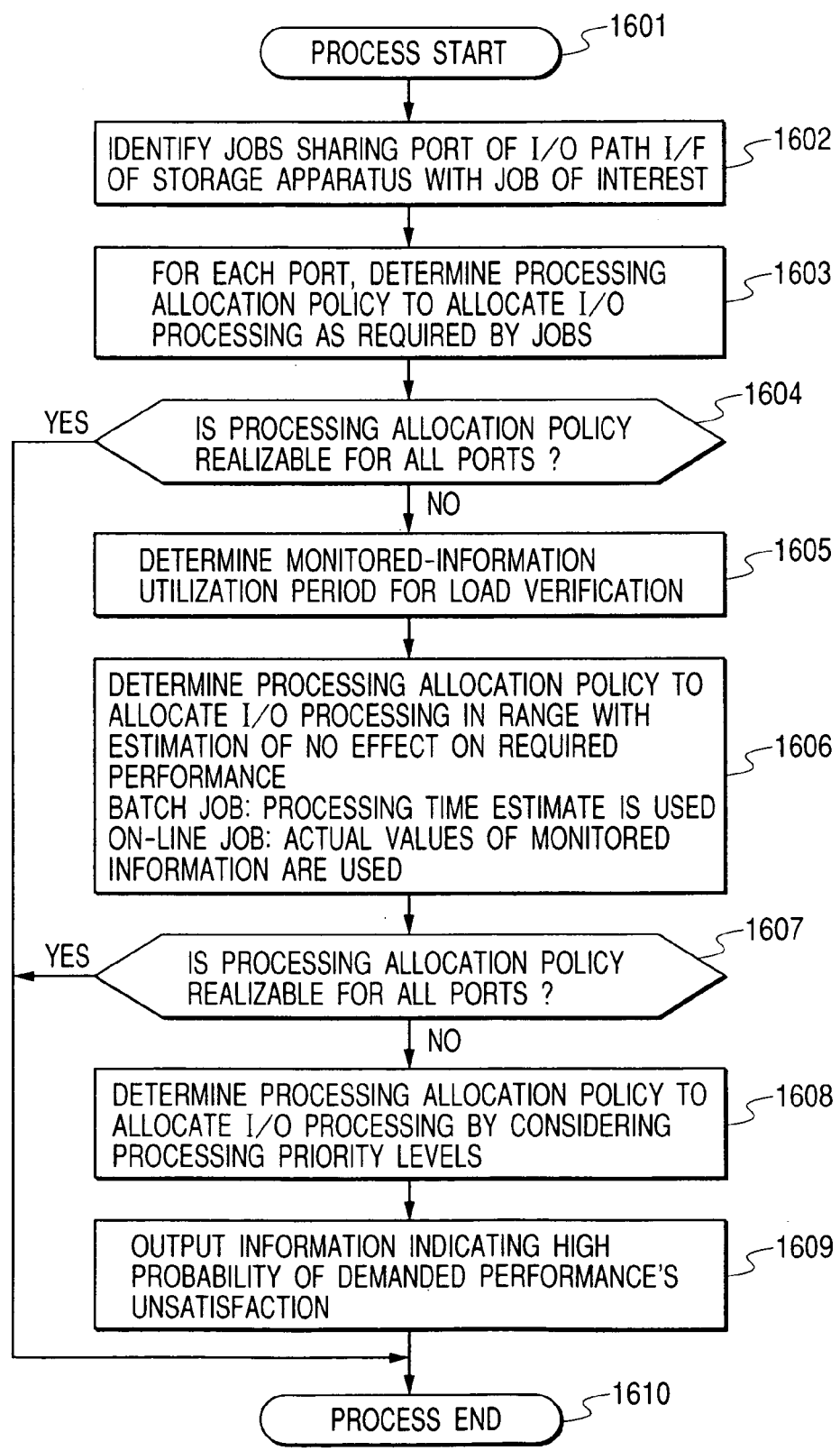
FIG. 26 shows a flowchart representing a process to determine a method of changing an I/O processing performance.

That is to say, the value of the performance ratio 632 of the port 26 raising the problem apportioned to the job selected for the tuning target is increased by a predetermined proportion of typically 5%. Then the process which begins with a step 1601 of a flowchart shown in FIG. 26 is carried out with the arguments of the job ID 622 of the job selected for the tuning target, the port ID 384 of the port 26 raising the problem, and the newly apportioned performance ratio 632 in order to determine a new allocation of the I/O processing performance to the port 26.

Then, the flow of the job-tuning process goes on to the step 1521 through the path indicated by symbol B in the flowchart shown in FIG. 20.

(IV-4) Job Execution Process by System Management Program

Figure 22:
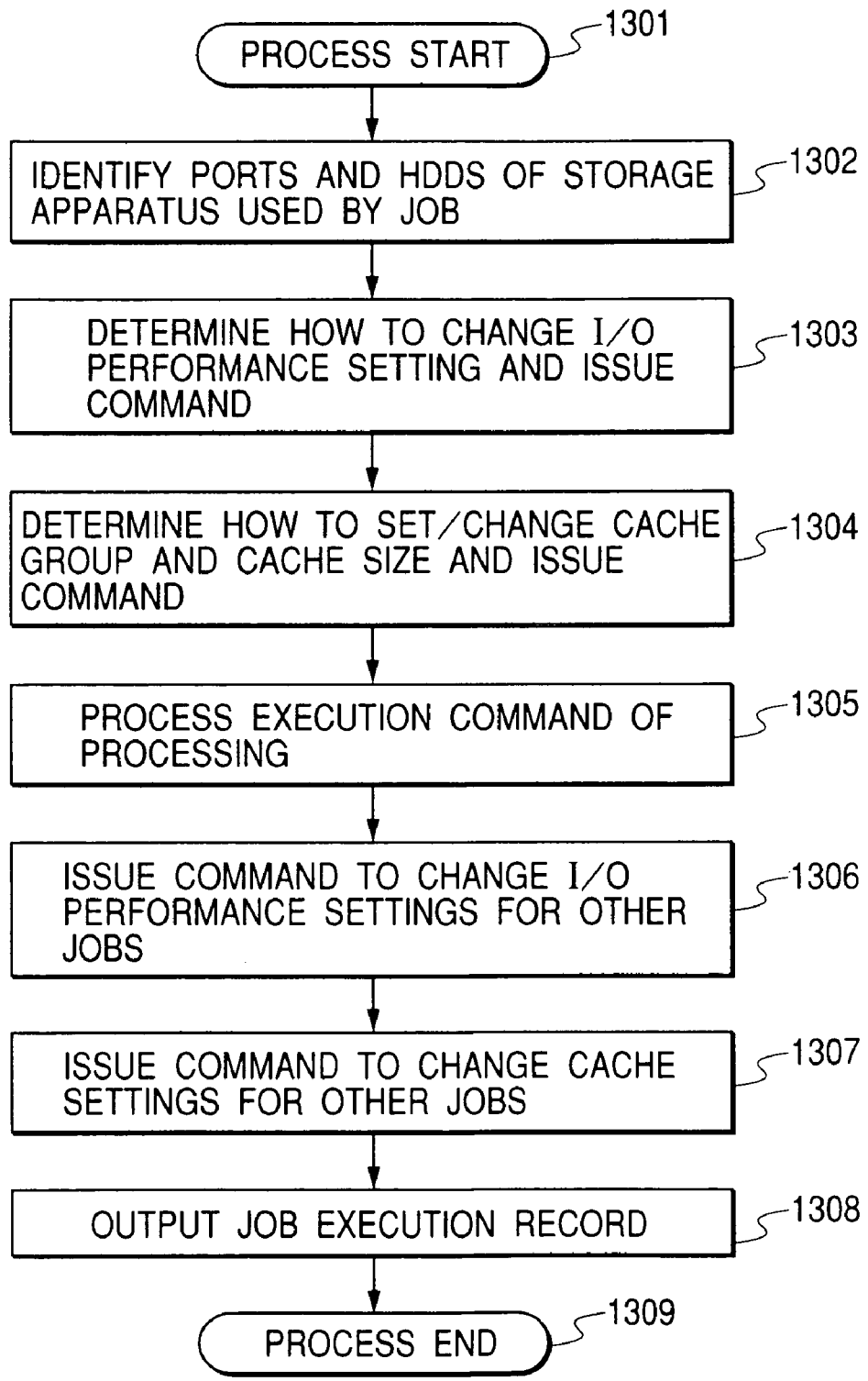
FIG. 22 shows a flowchart representing a job execution process carried out by the system management program.

Next, a job execution process by the system management program 140 is explained by referring to a flowchart shown in FIG. 22. FIG. 22 shows the flowchart representing the job execution process carried out by the system management program 140. The flowchart begins with a step 1301 at which the system management program 140 examines a given execution condition 708 included in the job management information and executes a job if the given condition for execution of the job is satisfied.

At that time, the execution start time and the job ID 622 of the job are stored in the system management information 142. It is to be noted that, if a plurality of batch jobs is carried out continuously one job after another, the value of the maximum execution time 710 included in the batch-job management information 700 may be changed by the processing time of the preceding stage. In this case, the original value is saved separately.

Then, as the job is started, first of all, a hardware resource used by the job is identified and set in the job-resource-mapping information at the next step 1302. The hardware resources are identified with reference to the mapping summarized information included in the system management information 142 by using information on a server 70 for carrying out the process of the job and information on data used in the process. These information are a server ID 712 included in the job management information and the data information 724 included in the I/O processing detailed information 740 respectively.

Then, the flow of the job execution process goes on to the next step 1303 to determine a method of changing the I/O processing performance at a port 26 of an I/O path I/F 32 in a storage apparatus 40 which is managed by a priority access control function and issue a command to the storage apparatus 40 to alter the setting on the basis of the method. A process to determine a method of changing the I/O processing performance will be described later in section IV-4.

In this case, on the condition of allocating the I/O processing performance to the job being started, the process to determine a method of changing the I/O processing performance is carried out and a value obtained as a result of the process is reflected in the job-port-setting information 630. A change plan determined in this case comprises an allocation quantity for each job. By using the job-resource-mapping information included in the system management information 142, the port 26 of the I/O path I/Fs 32 in the server 70 or the virtualization switch 60 from which accesses to the port 26 are issued are identified. Then the setting values for the port 26 are calculated by summing up the values which correspond to the same source port 26 but different jobs and the command to alter the I/O processing performance at the port 26 is issued to the storage apparatus 40.

Then, the flow of the job execution process goes on to the next step 1304 to determine a method of setting a cache group and setting/changing a cache size for the cache group and issue a command to the storage apparatus 40 on the basis of the method. A process to determine a cache-size assignment at the start of a job will be described later in section IV-5 by referring to a flowchart shown in FIG. 23.

In this step, first of all, a storage hint 754 included in the I/O processing detailed information 740 of the job management information is examined to determine whether a requirement for the cache amount exists. Then, for data with such a requirement (for the cache amount) existing, the job-resource-mapping information is referred to and an LU 208 for storing data with such a requirement is examined to determine whether the LU 208 pertains to a free cache group. If some of the LUs 208 above described pertain to the free cache group, the alteration plan of configuration of the storage apparatus 40 in which the LUs 208 corresponds to the same data belongs to the same cache group other than the free cache group is created. In this plan, a new cache group may be created if necessary. Then the job-resource-mapping information is updated according to the created alteration plan. At that time, if possible, the LU 208 for storing different data is set to pertain to a different cache group.

Figure 23:
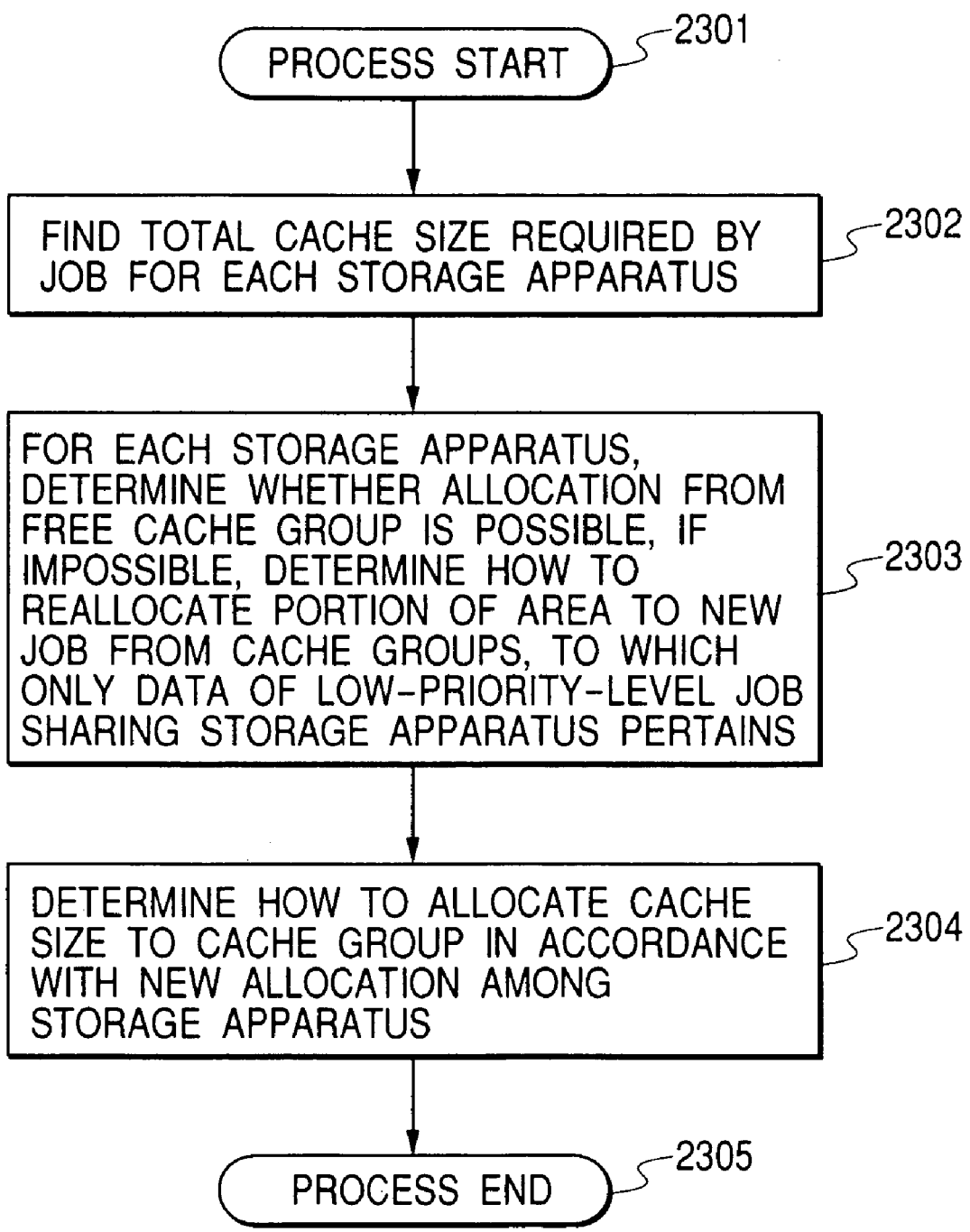
FIG. 23 shows a flowchart representing a process to determine allocation of the cache size when the system management program 140 starts a job.

Then, when the job management information of the job being started and the information about the changes of the cache-group setting if it exists, its information is given and a process starting with a step 2301 of a flowchart shown in FIG. 23 is carried out. A cache allocation quantity for each job is obtained as the result of the process. The size of a cache used in a cache group is a total of allocation quantities given to the job using the cache group. The calculated values are set into the job cache size information 650. Then, a command is issued to the storage apparatus 40 in accordance with these changes.

After these processes are carried out, at the next step 1305, a command is issued to a server 70 identified by an executing server ID 712 included in the job management information in order to instruct the server 70 to execute an executed command 714 associated with the executing server ID 712. In this way, the processing of the executed command 714 is carried out.

After the processing is completed, in the case of a job managed by the batch-job management information 700, the amount of the output data specified by job-related output data information 730 which is measured by the data amount unit 726 is acquired as process-end information, and stored in the system management information 142 along with the job ID 622 and the data information 724 for identifying the output data.

Then, as the execution of the job is finished, at the next step 1306, the I/O processing performance at the port 26 allocated to the job at the step 1303 is released for use by other jobs. To put it in detail, the same processing as the step 1303 is carried out on the condition that the portion allocated to the job, the execution of which has been completed, is released.

Then, at the next step 1307, the settings of the cache group and the cache allocation, which were set up at the step 1304, are released.

Figure 24:
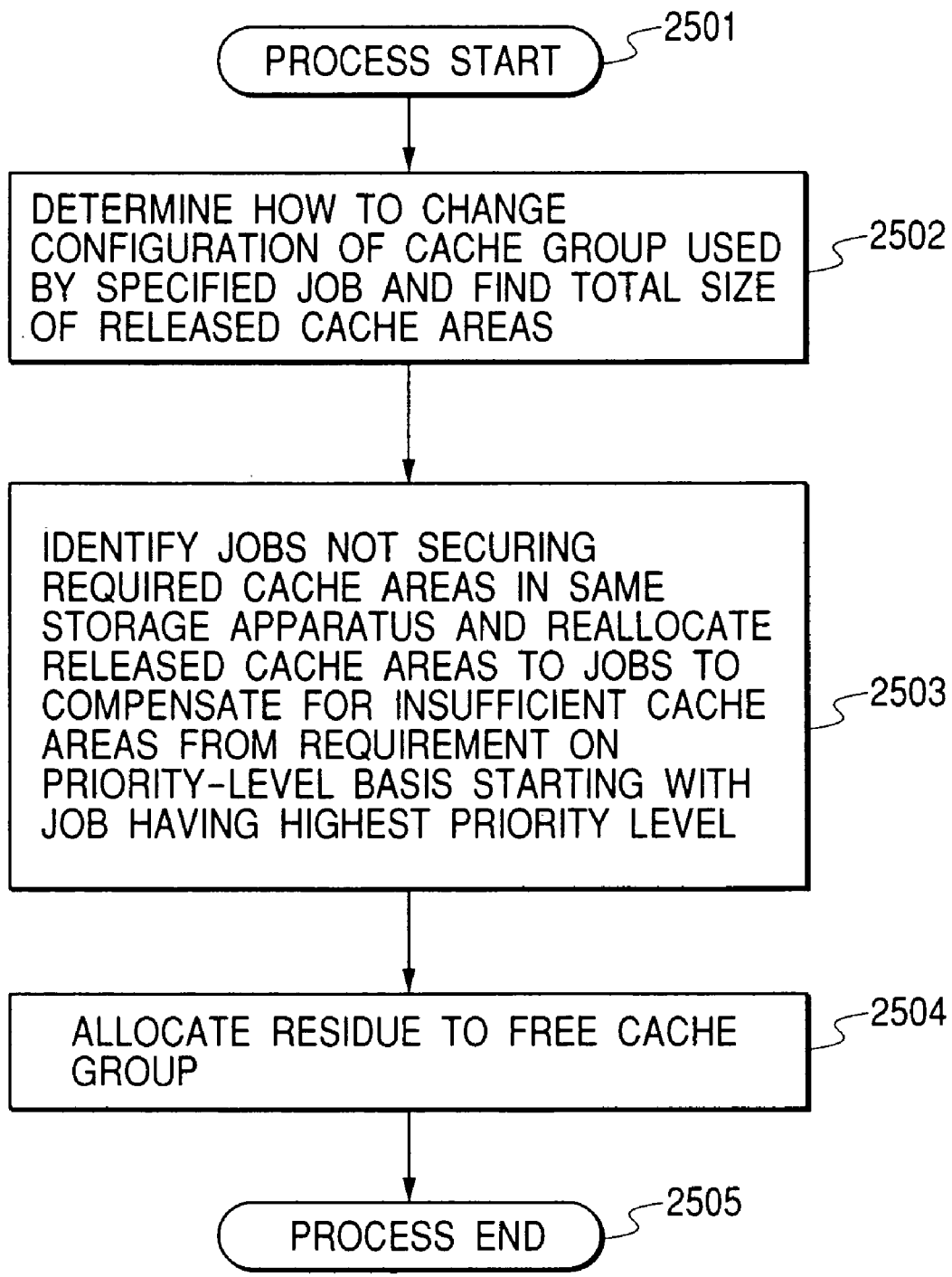
FIG. 24 shows a flowchart representing a process carried out by the system management program 140 to reallocate a cache area after a processing of a job completes.

Here, a process beginning with a step 2501 of a flowchart shown in FIG. 24 is carried out with the argument of the job ID 622 of the completed job. This process is carried out to determine a method to change the configuration of a cache group. Its results are reflected in the job cache size information 650 and the job-resource-mapping information, and a command is issued to a storage apparatus 40 to alter the setting in accordance with the determined method.

Then, at the next step 1308, information on the execution of the job is output as an execution record. The information on the execution of the job includes an execution time of the job and the number of processing executions. The execution time of the job normally includes start and end times. Finally, at the next step 1309, the job execution process is ended.

It is to be noted that, if the execution maximum time 710 included in the batch-job management information 700 is changed at the beginning of the process, the original value saved separately somewhere should be restored. If the execution condition 708 indicates that there is another job that remains to be carried out after this completed job, this procedure is re-executed in order to carry out such job. This may happen in the case where the job completed was managed by the batch-job management information 700.

(IV-5): Process to Determine How to Change Settings of Storage Apparatus

By referring to flowcharts shown in FIGS. 23 to 27, the following description explains a process to determine how to change/set settings of a storage apparatus 40.

The description begins with an explanation of the process to determine the cache size which is allocated when the system management program 140 starts a job with reference to FIG. 23.

FIG. 23 is a flowchart representing a process to determine a cache size which is allocated when the system management program 140 starts a job.

The process to determine an allocated cache size is called at the step 1304 of the flowchart shown in FIG. 22 when the system management program 140 starts a job.

The process begins with a step 2301 at which an upper-level routine gives job management information of the job to be started from now on and the cache-group configuration plan to be configured at the start of the execution of the job. Hereafter, the job to which the a cache area is being allocated is referred to as the target job.

First of all, at the next step 2302, data to be used by the target job and the storage apparatus 40 for storing the data are obtained from the job-resource-mapping information. Then, from the storage hint 754 included in the I/O processing detailed information 740 of the job management information, required cache sizes are obtained and, by referring to the job-resource-mapping information included in the system management information 142, the required cache size for each LU 208 is obtained. If a piece of data is scatted on a plurality of LUs 208 for storing data, from the mapping summarized information, the size of an area used for storing a portion of the data in each of the LUs 208 is identified, and the required cache size to the data is divided into the for each of the LUs 208 proportionally to the size of the area in the LU 208 for storing the data.

If several different data are stored in the same LU 208, on the other hand, the total size of these data is used as the requested cache size for the LU 208. The values each required for an LU 208 are summed up for every cache group in accordance with a configuration given at the start of the process, and the sum is set up in the job cache size information 650 as an initial setting of the target job along with the related information. Furthermore, these values are summed up for each storage apparatus 40 and the sum is used as the required cache size.

Then, at the next step 2303, the required cache size computed at the step 2302 is verified in order to determine whether the cache are of the required cache size can be allocated from free cache group for each storage apparatus 40. If a residual cache size obtained as a result of subtracting the required cache size from the cache size of the free cache group is not smaller than a threshold value determined in advance, the cache area of the required cache size is judged to be allocatable from the free cache group. If the cache area of the requested cache size is judged not to be allocatable from the free cache group, on the other hand, the following process is carried out for each of such storage apparatus 40.

First of all, the job priority level 704 of the target job is identified from the job management information. Then the jobs which use the cache group other than the free cache group in the storage apparatus 40 and have lower job priority level 704 than that of the target job are identified. If such a job does not exist, the current allocation quantity is not changed. If such jobs exist, on the other hand, it is necessary to determine a method to reallocate a portion of the cache area which has been allocated to each of the jobs to the target job.

For example, a predetermined proportion of a cache area already allocated to the job having a lower priority level is reallocated to the target job. At that time, the entries of the allocation information 652 included in the job cache size information 650 corresponds to the job selected for the victim of the cache area reduction should be updated. The new value is stored as the data of a new generation, which consists of the information on the cache size obtained as a result of reducing the set quantity and the reason of "Insufficient cache".

Then, at the next step 2304, a method to allocate a cache area in accordance with the allocation quantity obtained at the step 2303 is determined.

If the cache area of the required size can be obtained, the required cache size can be used as the allocation quantity as it is. If the cache area of the required size cannot be obtained, on the other hand, the cache area allocated to the target job so far is distributed among the cache groups so that the size of the cache area of each cache group is proportional to the required size of the cache group. At that time, the data which consists of the information on the obtained cache size and the reason of "Insufficient cache" is stored into the allocation information 652 included in the job cache size information 650 corresponds to the target job as the one of a new generation.

Finally, at the next step 2305, the execution of the process to determine allocation of the cache size is ended. It is to be noted that, for the job with a reduced allocated cache size, a cache-tuning process to be explained later by referring to a flowchart shown in FIG. 25 may be carried out.

By referring to a flowchart shown in FIG. 24, the following description explains a cache-area reallocation process carried out by the system management program 140 after a processing of a job completes. FIG. 24 shows a flowchart representing the process carried out by the system management program 140 to reallocate a cache area after a processing of a job completes.

The cache-area reallocation process is called at the step 1307 of the flowchart shown in FIG. 22 after a process of a job completes. The flowchart representing the cache-area reallocation process begins a step 2501 at which the job ID 622 of a completed job is received from an upper-level routine.

First of all, at the next step 2502, the job cache size information 650 is referred to in order to identify the size of a cache area allocated to the completed job as the size of a cache area to be released. For each storage apparatus 40 a total sum of the sizes is then computed.

Subsequently, the entries associated with the job are removed from the job cache size information 650. Then, the job-resource-mapping information is searched for the cache group, to which only the LUs 208 used for merely storing the data of the completed job pertains. The cache groups are also removed.

Subsequently, at the next step 2503, the job cache size information 650 is searched for the jobs with an insufficient amount of cache in the storage apparatus 40 used for storing the data of the completed job. An entry with a setting reason of "Insufficient cache" in the allocation information 652 corresponds to the job. Then, the job priority levels 704 of such jobs are obtained from the job management information and the released cache areas are reallocated to the jobs to compensate for a shortage of cache area from the requirement on the job sequentially on a priority basis, that is, starting from the job with the highest job priority level 704.

A part of released cache area may be unallocated to cache groups even after the reallocation process described just before have completed. In this case, the remaining cache areas are allocated to the free cache group at the next step 2504.

Finally, at the next step 2505, the execution of the cache-area reallocation process is ended. It is to be noted that, for a cache group of a job compensated for its insufficient cache area, the corresponding entry in the job cache size information 650 should be restored to a generation prior to the state of an insufficient cache area or updated to the current values.

Figure 25:
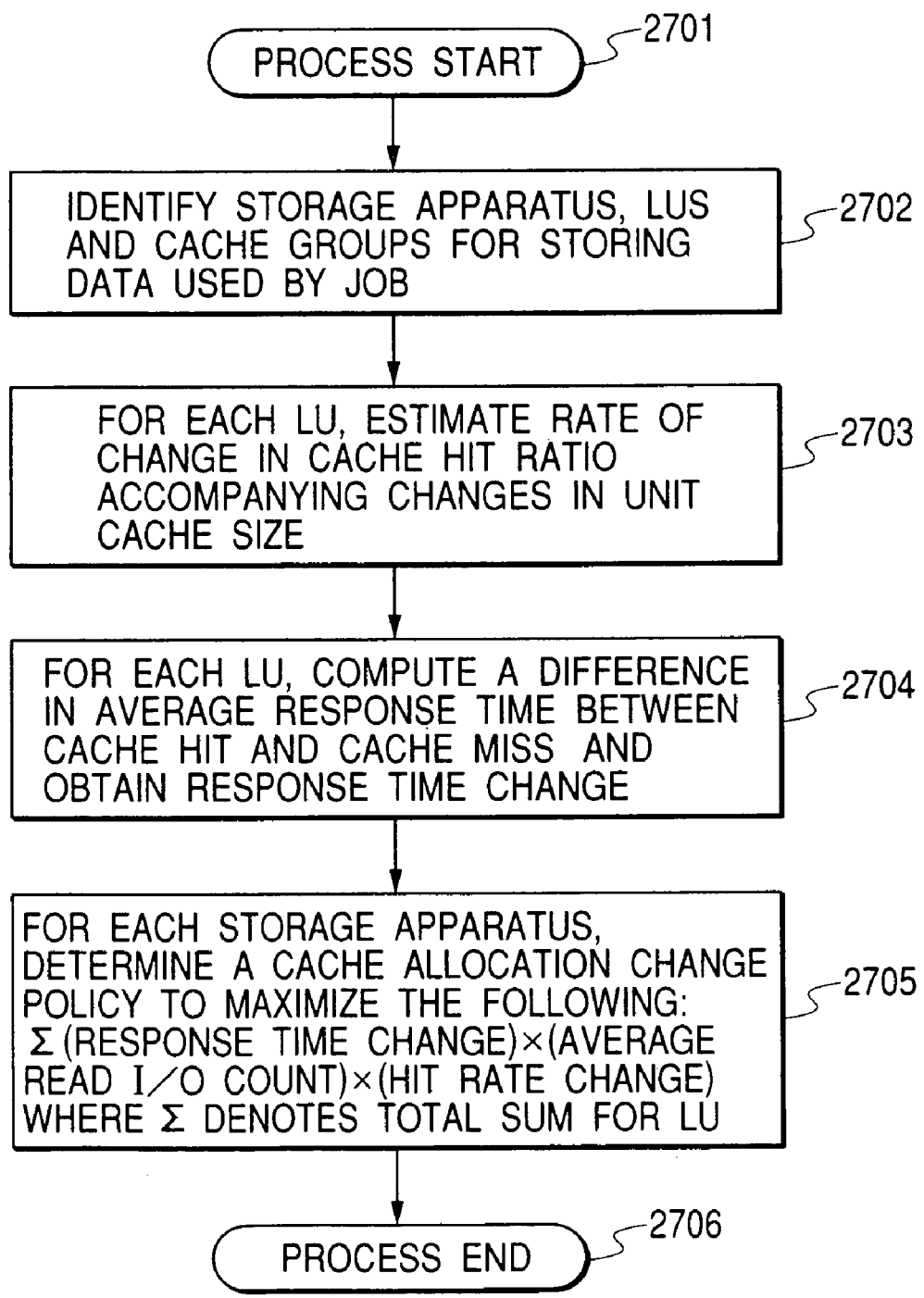
FIG. 25 shows a flowchart representing a process to tune the size of a cache area allocated to an on-line job on the basis of monitored information.

By referring to a flowchart shown in FIG. 25, the following description explains a process of tuning the size of a cache area for an on-line job on the basis of monitored information. FIG. 25 shows the flowchart representing the process to tune the size of a cache area allocated to an on-line job on the basis of monitored information.

This process is called from the steps 1507 and 1519 of the flowchart representing the job-tuning process as shown in FIGS. 20 and 21. The flowchart representing the process to tune the size of a cache area begins with a step 2701. At this step, the job ID 622 of a job to be tuned and the identifiers of the cache groups whose allocated cache area should not be reduced are received from an upper-level routine before the process is started.

First of all, at the next step 2702, a storage apparatus 40 and Lus 208 for storing data used by the specified job and relevant cache groups are acquired from the job-resource-mapping information. Then, at the next step 2703, a cache-hit-rate change accompanying a change in cache area size is computed.

In this embodiment, the values of the real part group count 502 and the virtual part group area count 504 in a storage apparatus 40 are represented by R and V respectively. Assume that the current cache size of the cache group to which an LU 208 pertains is C. In this case, the number of hits for an i-th group area in the cache-hit cumulative count 370, where $0<i<=R$, is considered to be the number of accesses which would hit the cache when the size of the cache group was $iC/R$ but would become to miss the cache if the size of the cache group was reduced to $(i-1)/CR$. On the other hand, the number of hits for an i-th group area in the cache-hit cumulative count 370, where $R<i<=(R+V)$, is considered to be the number of accesses which would miss the cache if the size of the cache group was $(i-1)/CR$ but would become to hit the cache if the size of the cache group was enlarged to $iC/R$.

Here, an average number of hits for read accesses to the i-th group area for each LU 208 where $0<i<=(R+V)$ is held in the monitored record information 510 shown in FIG. 12 whereas the real port group count 502 and the virtual part group count 504 in the storage apparatus 40 are held in the system management information 142 separately. For example, an average-real-hit-rate decrease accompanying a decrease in cache size from C to (R−1)C/R is equal to an average hit rate in the R-th group. Thus a decrease in average hit rate per unit cache size in the range (i−1)C/R to iC/R of the cache size in the LU 208 where 0<i<=R can be approximated to (the average hit rate in the i-th group)×R/C. By the same token, an increase in average hit rate per unit cache size in the range (i−1)C/R to iC/R of the cache size in the LU 208 where R<i<=(R+V) can be approximated to (the average hit rate in the i-th group)×R/C.

These values are computed for all LUs 208 for holding data used by the job and used as a rate of changes in hit rate. It is to be noted that, at steps including the following ones, the value based on most immediate records 524 or an average value taken over a recent period determined in advance is acquired from the monitored record information 510.

Then, at the next step 2704, by using job-resource-mapping information included in the system management information 412, the HDDs 16 associated with the LUs 208 for holding data used by the job are identified.

Subsequently, the access-performance information 614 included in the HDD performance information 612 for the HDD 16 is referred to in order to find an average response time of the HDD 16 for a read hit and that for a read miss. Then, the value of {(the average response time for a read miss)−(the average response time for a read hit)} is computed and used as a change in response time of the LU 208. It is to be noted that, the data used by the job in the LU 208 may be split into pieces of data, which may be scattered on HDDs 16 having performances different from each other. In such case, the change in response time is computed for each HDD 16. Then the change in response time for the LU 208 is calculated as the weighted average of changes in response time of the HDDs 16, which are weighted with the amount of the data which is used by the job and stored in the HDD 16.

Then, at the next step 2705, a method of changing the cache allocation so as to maximize I is determined for each storage apparatus 40 where:

$I = \Sigma$(Average of LU processing time changes), and

Average of LU processing time changes=(Change in response time)×(Average read I/O count of LU)×(Change in hit ratio)

Here, symbol Σ (expression) means the sum of values of the expression, which are each calculated for each LU 208 used for holding data of the specified job in a specified storage apparatus 40. The change in response time is the value calculated at the step 2704 whereas the average read I/O count of the LU 208 is acquired from the monitored-record information 510. The change in hit ratio can be computed from the rate of changes in hit ratio calculated at the step 2703 and a change in cache size. At that time, be careful of the fact that the change in hit ratio may vary depending on the cache size of the cache group.

In order to maximize I, the following typical algorithm is adopted:

First of all, for each cache group in the storage apparatus 40, the values of I are computed for an increase in unit cache size and a decrease in unit cache size. Then, the value of I is recalculated for the case in which a unit of an allocated cache area is moved from the cache group resulting in the largest value of I (meaning 'less affected') due to a decrease in cache size to the cache group resulting in the largest value of I (meaning 'much affected') due to an increase in cache size. If the recalculated value of I is not less than a predetermined threshold value, this cache reallocation is judged to be effective and determined to be performed. This verification of effectiveness of the cache reallocation is repeated until the cache reallocation is not judged to be effective or the changes in the cache allocation reaches to a predetermined quantity, e.g., a predetermined proportion of the size of the cache area used by the job in the storage apparatus 40. In the repeated execution of the verification, the results of the former should be reflected in the cache allocation used for the latter. It is to be noted that there may be the constraint specified at the beginning of the process that the cache area corresponding to the specified cache groups must not be reduced. The verification process has to follow this constraint.

Finally, at the next step 2706, the process to tune the size of a cache area is ended. At that time, the allocation information 652 included in the job cache size information 650 in the job-resource management information 620 shown in FIG. 16 should be updated.

By referring to a flowchart shown in FIG. 26, the following description explains a process to determine a method of changing an I/O processing performance allocation. FIG. 26 shows the flowchart representing the process to determine a method of changing an I/O processing performance allocation.

This process allocation is the one to adjust and/or change the allocation of the I/O processing performance at the ports 26 to jobs. And allocation is called at the step 1303 of the flowchart representing a job execution process as shown in FIG. 22 as well as the steps 1515 and 1517 of the flowchart representing the job-tuning process as shown in FIGS. 20 and 21.

The process to determine a method of changing an I/O processing performance allocation receives the following information from an upper-level routine at the step 1601. When the process is called due to a allocation for a new job or a release of the I/O processing performance at the completion of a job, the process receives the identifier of the job as well as the information on the reason why this process is called, that is, the reason of an allocation for a new job or a release at a completion of a job. When the process is called to reallocate the I/O processing performance among the existing jobs, the process receives the identifier of the job whose I/O processing performance should be tuned, the identifier of the port 26 where the I/O process performance of the job should be tuned, and the performance ratio 632 to be reallocated at the port 26 to the job. Unless otherwise specified, an I/O processing amount required by another job is obtained from the job-port-setting information 630 and the job management information of the job identified from the job-port-setting information 630.

First of all, at the next step 1602, each of the port 26 of the I/O path I/F 32 in the storage apparatus 40 where the allocation of I/O processing performance among the jobs should be altered is identified.

When this process is called by the reason of an allocation for a new job or release at a completion of a job, the identifier of the job is used to search the job-resource-mapping information for all ports 26 used by the job. These ports 26 are each set to a target of a process to change the allocated processing amount. When the amount of I/O processing for a port 26 is directly specified, only the port 26 is set to a target of the process to change the allocated processing amount. Then, all jobs currently being executed by using the identified ports 26 are identified by using the job-resource-mapping information of the system management information 412.

Then, the flow of the process to determine a method of changing an I/O processing performance allocation goes on to the next step 1603 to determine an allocation plan to allocate an amount of I/O processing to each of the ports 26 identified at the step 1602 in accordance with values required by jobs. If the performance ratio 632 is specified when the process is called, the required value is the corresponding to the specified value. Otherwise, the required value can be obtained as described below.

First of all, pieces of data accessed by the job by way of the ports 26 identified from the job-resource-mapping information are grouped in accordance with the value of an access order 742 for the data by referring to the I/O processing detailed information 740 included in the Job management information for the job. Then, the performance value at the port 26 is converted into the performance ratio 632 of the data. The performance value of the data is included in the I/O base performance 748 of the data. For each group obtained as a result of the grouping, the sum of the converted performance ratio 632 of the data pertaining to the group is calculated. The sum for each group and the current performance ratio 632 included in the job-port-setting information 630 are compared with each other in order to find the largest value among them as the required value of the job at the port 26.

Then, the flow of the process goes on to a step 1604 to judge whether or not the allocation policy determined at the step 1603 is realizable, that is, whether or not the sum of the required values at the port 26 is not greater than 100%.

If there is a port 26 for which the allocation policy determined at the step 1603 is not realizable, the flow of the process goes on to a step 1605. If the allocation policy is realizable for all ports 26, on the other hand, the flow of the process goes on to a step 1610 at which the allocation policy is adopted as the method of allocating I/O processing amounts and the execution of the process is ended.

If it was judged at the step 1604 that the allocation policy is not realizable for some of the ports 26, a recalculation for determining the allocation policy is applied only to the ports judged not to be realizable in the later steps.

First of all, at the step 1605, a reference period of monitored information used in the verification of a load by on-line jobs is determined.

To put it concretely, a predetermined period of time starting from the present is taken as the reference period basically. A typical period of time determined in advance is one hour. With regard to the job identified at the step 1602, however, the job may be one managed by using the batch-job management information 700. In this case, an execution end time is estimated by assuming that the execution of the process lasts from its start for a period of time equal to the value of the maximum execution time 710. If the execution end time is earlier than the end time of the reference period cited above, the estimated execution end time of the job can be used as the end time of the reference period of the monitored information.

Then, the flow of the process goes on to the next step 1606 to determine an allocation policy of reducing the amount of I/O processing in a range for which there is no estimated effect on the required performance.

If the performance ratio 632 is specified when the process is called, the allocation quantity is the required value, which corresponds to the specified value. For a job managed by using the batch-job management information 700, the allocation quantity is computed as follows: First of all, the processing performance at the port 26 with an undetermined allocation quantity is determined by multiplying the required value by a correction coefficient, which varies from job to job. In this case, the correction coefficient is such a computed value that the estimated value of the processing execution time becomes equal to a period of time given by the maximum execution time 710. By following the explanation of the aforementioned method to estimate the processing execution time of the job. A simple equation for finding the correction coefficient is then obtained. By solving the equation, the value of the correction coefficient can be determined. Then, the priority-level control information 880 is searched for a margin coefficient 882 corresponding to the job priority level 704 included in the batch-job management information 700 for the job. A value obtained as a product of the margin coefficient 882, the computed correction coefficient, and the required value is then compared with the required value. The smaller one is finally used as the allocation quantity.

For the job managed by using the on-line-job management information 770, on the other hand, the allocation quantity is computed as follows: First of all, the LU 208 for storing data accessed through the port 26 with an undetermined allocation quantity is obtained from the job-resource-mapping information. Then, the amount of I/O processing carried out in the past on the LU 208 through the port 26 is obtained from the monitored record information 510. The data referenced now is the values monitored during the monitored information's reference period determined at the step 1605 within a predetermined period of time before now and the value monitored immediately before. An example of the predetermined period of time is one week. Then, the required value is compared with a product of the maximum of the performance ratio 632 independently computed from each of the monitored values stored in the records 524 the monitored values and a margin coefficient 882 corresponding to the job priority level 704 included in the on-line job management information 770. The smaller one is finally used as the allocation quantity.

The flow of the process then goes on to a step 1607 to judge whether or not the sum of allocation quantities from the jobs is greater than 100% for each identified port 26. It is to be noted that, in the case of a recalculated port 26 at which the sum is smaller than 100%, the allocation quantities are modified so that the sum becomes equal to 100%. An allocation quantity is modified by adding a difference between the allocation quantity and the required value to the allocation quantity sequentially one job after another according to the job priority level 704 on the job starting with the job having a highest job priority level 704.

If it is impossible to solve the problem that one or more ports 26 each have the sum greater than 100%, the flow of the process goes on to a step 1608. If the problems of all such ports 26 can be solved by the recalculation, on the other hand, the flow of the process goes on to a step 1610 at which the current allocation policy is adopted as one to allocate amounts of I/O processing and, finally, the execution of the process is ended.

At the step 1608, for each port 26 with the problem unresolved until the step 1607, a process to allocate an amount of I/O processing is carried out by taking the job priority level into consideration.

For example, for each port 26 with the problem unresolved, the process is carried out as follows: The allocation quantity of each job for the port 26 is obtained as a product of the allocation quantity computed at the step 1606 and a new correction coefficient determined specifically for the port 26. Typically, the new correction coefficient is computed from the value of the job priority level 704 assigned to the job. For instance, the correction coefficient of the job is computed as the i-th power of x where x is a parameter to calculate the correction coefficient and i is determined proportional to the value of the job priority level 704 of the job. The new correction coefficient is so determined that the sum of the products becomes equal to 100%. The allocation quantities are then assigned to their respective jobs.

Consider the job making an access to data by way of the port 26 for which a policy to allocate amounts of I/O processing has been set at the step 1608. In the job managed by using the batch-job management information 700, the processing time's value estimated in accordance with the allocation quantity may not satisfy the maximum execution time 710. In the job managed by using the on-line-job management information 770, on the other hand, there may be a port 26 for which the I/O processing amount's allocation quantity calculated at the step 1606 cannot be secured. In such cases, information is issued at a step 1609 to indicate that there is a high possibility that the required performance cannot be met. The information may be displayed on a screen 114 of the management terminal 110. As another alternative, the information is added to the log used by the system management program 140 to store records of a variety of events.

Finally, at the step 1610, the execution of the process is ended.

Figure 27:
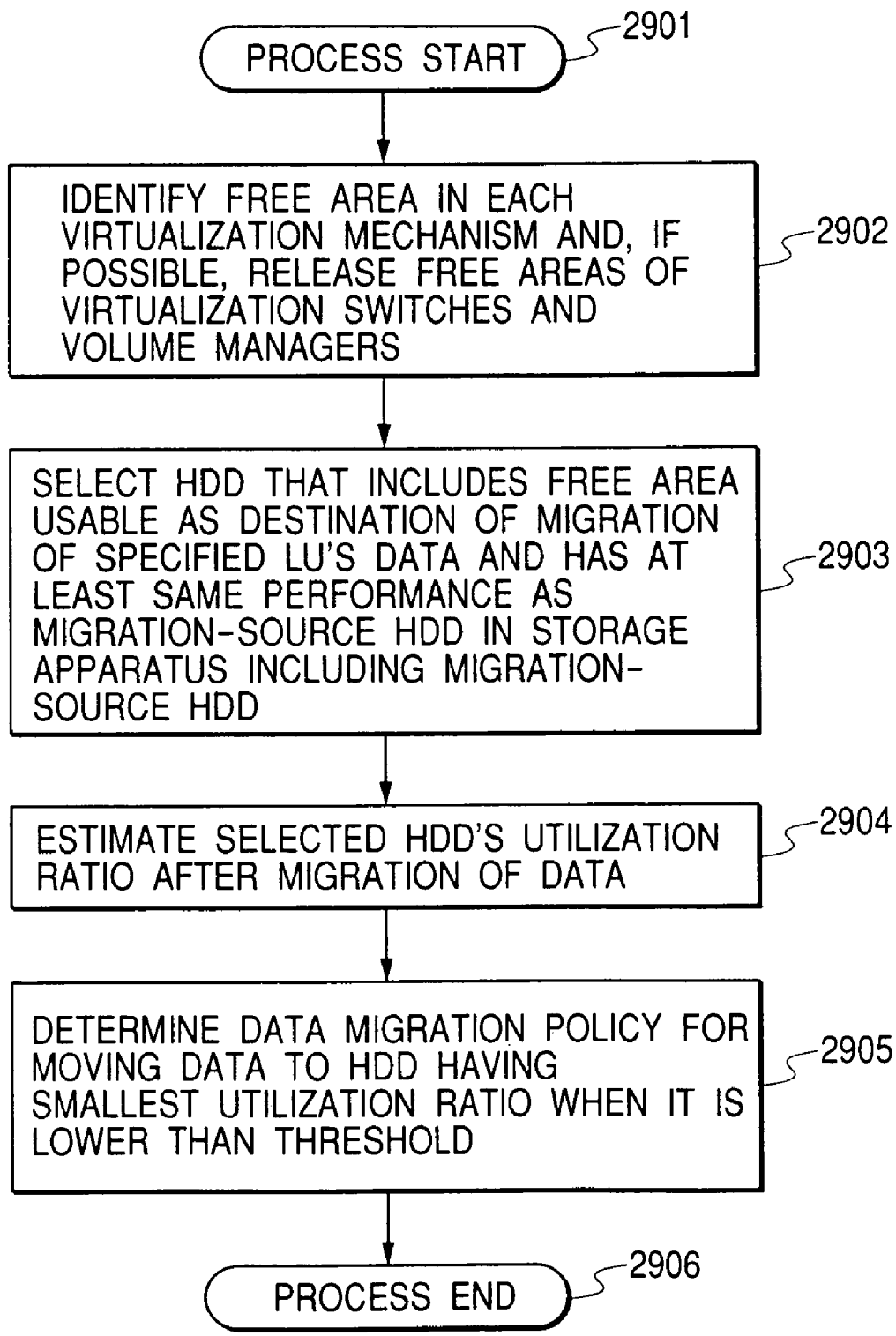
FIG. 27 shows a flowchart representing a process to determine a method of getting rid of an overloaded state of an HDD by moving data on the basis of monitored information.

By referring to a flowchart shown in FIG. 27, the following description explains the process of determining a method to get rid of an overloaded state of an HDD by a migration of data on the basis of monitored information. FIG. 27 shows the flowchart representing the process to determine a method of getting rid of an overloaded state of an HDD by moving data on the basis of monitored information. This process is one called at the step 1508 of the flowchart representing the job-tuning process as shown in FIG. 20.

The flowchart representing this process begins with a step 2901 at which identifiers are received from an upper-level routine. The identifiers received from the upper-level routine are the one of the storage apparatus 40 including a migration-source HDD 16 serving as a source of a migration of data, the one of the migration-source HDD 16 and the one of the LU 208 for carrying out the migration of data.

First of all, at the next step 2902, most recent states of the area-mapping information 300 are obtained from virtualization mechanisms in order to update the mapping summarized information. From the entries of the lower-level management structure area information 304 corresponding to the free entry 314 of the area-mapping information 300 for each virtualization mechanism, the free areas are recognized. If possible, free areas in virtualization switches 60 and volume managers 78 are released.

In this embodiment, a free area is defined as the storage area managed by the entries of the lower-level management structure area information 304 corresponding to the free entry 314 and not used as a destination of a migration of data in the data migration request already existing in the system management information 142. A data migration request is information on a method to change a relation associating the LU 208 with HDDs 16 by means of a migration of data in a storage apparatus 40. The data migration request is created in process that starts with the step 2901. The data migration request includes the apparatus ID 572 of a storage apparatus 40 for the migration of data, the HDD ID 394 of a migration-source HDD 16 serving as a source of the migration of data, the LU ID 364 of an LU 208 supposed to move the data and the HDD ID 394 of a migration-destination HDD 16 serving as a destination of the migration of the data as well as information on areas involved in the migration of the data. The request for a migration of data is kept in the system management information 142.

The identified free areas may include ones of virtualization switches 60 and volume managers 78. In such case, by issuing a command to the virtualization switches 60 and the volume managers 78, the free areas can be released. A released free area may be composed of a virtual structure at the lower-level hierarchical layer, all storage areas of which are no longer used at the upper-level hierarchical layer. In this case, when the free area is released, a command is issued to a virtualization mechanism presenting such virtual structure in order to instruct the mechanism that the structure be removed. In this way, the storage area of a management structure composing the virtual structure which is removed as a result of releasing a free area at the upper-level hierarchical layer becomes a free area. Thereafter, this process to release a storage area is carried out recursively and information on the free areas resulting from the recursive process should be obtained.

Then, at the next step 2903, HDDs 16 included in the storage apparatus 40 having the migration-source HDD 16 are searched for the HDDs 16 each having a contiguous storage area that can be used for storing all data of the specified LU 208 currently stored in the migration-source HDD 16 and to be moved by the migration process. The average response time in the read-miss cache of each of the detected HDDs 16 is obtained from the access performance information 614 of the HDD performance information 612. A HDD 16 having an average response time in the read-miss case not longer than that of the migration-source HDD 16 is selected among the detected HDDs 16. Thus, the selected HDD 16 has a read-miss performance at least equivalent to that of the migration-source HDD 16. Note that there is some possibility that no HDD 16 can be selected.

Then, at the next step 2904, records 524 of the utilization ratio of each selected HDD 16, which have been obtained during a recent period of time determined in advance, are acquired from the monitored-record information 510 for the HDD 16. For example, the length of the predetermined of time is one week. From each of the acquired records 524 obtained during the period of time, a post-migration utilization ratio of the selected HDD 16 is estimated. A post-migration utilization ratio of an HDD 16 is the estimated one when the HDD 16 were operating as the destination of the data migration. A post-migration utilization ratio of the HDD 16 is obtained as the sum of ones of the port of the HDD 16 associated with the LU 208 storing data in the HDD 16.

The post migration utilization ratio of the part of the HDD 16 corresponding to the migrated data of the LU 208 is estimated by correction of the utilization ratio of the part of the migration-source HDD 16 corresponding to the LU 208, on the assumption that both the utilization ratio of the part of the migration-source HDD 16 corresponding to the LU 208 and that of the migration-destination HDD 16 are proportional to the read-miss performance of themselves.

Then, at the next step 2905, the largest value among the estimated values each computed for a records 524 is used as the post-migration utilization ratio of the HDD 16 with respect to the migrated data. An HDD 16 having a smallest post-migration utilization ratio is finally selected. The post-migration utilization ratio of the selected HDD 16 is compared with a threshold value determined in advance to determine whether or not it is smaller than the threshold value. An example of the predetermined threshold value is 50%. If the post-migration utilization ratio is smaller than the threshold value, a request for a migration of data is generated to move data of the LU 208 from the migration-source HDD 16 to the migration-destination HDD 16. If the post-migration utilization ratio is not smaller than the threshold value or no HDD 16 could be selected at the step 2903, on the other hand, the process of determining a method to get rid of an overloaded state of an HDD is considered to end in failure. In this case, no request for a migration of data is generated. Finally, at the next step 2906, the execution of the process for determining a method to get rid of an overloaded state of an HDD is finished.

Second Embodiment

Figure 28:
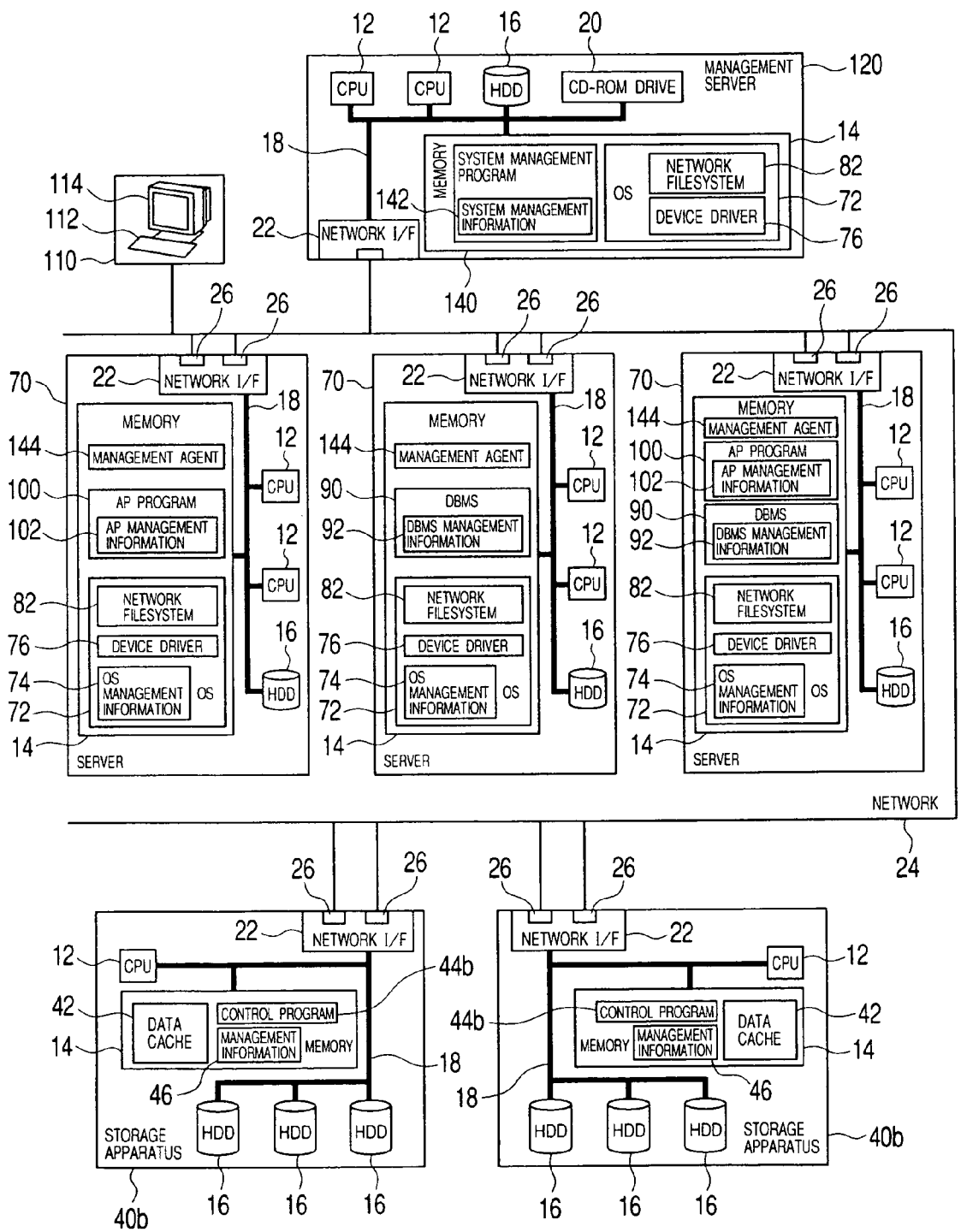
FIG. 28 shows the configuration of a computer system for managing performances of storage apparatus in accordance with a second embodiment of the present invention.

A second embodiment of the present invention will below be described by referring to FIG. 28. FIG. 28 shows the configuration of a computer system for managing performances of storage apparatus in accordance with the second embodiment of the present invention.

In the first embodiment, the virtualization switches 60 are placed between the servers 70 and the storage apparatus 40. The virtualization switches 60, the servers 70 and the storage apparatus 40 are connected to each other by the I/O paths 34 and the network 24. Data is subjected to a virtualization process by using the management structure shown in FIG. 2.

In the second embodiment, a storage apparatus 40b presents a file to an external apparatus. The file is accessed through a network by adoption of a network filesystem protocol.

Differences between the first and second embodiments are explained below.

In the second embodiment, the I/O paths 34 and the virtualization switches 60 do not exist. A port ID 384 determined uniquely in the system is added to each port 26 of any network I/F 22.

A server 70 does not have any I/O path I/F 32 but has only network I/Fs 22. An OS 72 includes a network filesystem 82 for accessing file 202, which is presented by an external apparatus, by way of the network 24 by adoption of a network file system protocol.

The network filesystem 82 has area-mapping information 300 included in OS management information 74. If the file 202 recognized by a DBMS 90 or an AP program 100 is associated with the file 202 presented by a storage apparatus 40b in accordance with a predetermined rule, only information determining a relation associating the files 202 with each other can be included in the OS management information 74. In this case, the system management program 140 acquires the information determining the relation associating the files 202 with each other and uses the information to create area-mapping information 300, which is then included in mapping summarized information.

A storage apparatus 40b also does not have any I/O path I/F 32. A storage apparatus 40b allows an external apparatus to access the data stored therein by adoption of a concept called a 'file'. A storage apparatus 40b has a modified control program 44b with the following functions. The control program 44b has the functions of the filesystem 80 employed in the first embodiment. The control program 44b carries out a virtualization process on the storage area of an LU 208 existing in the storage apparatus 40b and allows an access to be made to data by adoption of a concept called a file 202. In addition, the control program 44b is capable of interpreting one or more network filesystem protocols and processing a file access requested by an external apparatus by way of the network 24 and the network I/F 22 by adoption of any of the protocols.

With regard to mapping of data, in a mapping hierarchical-layer configuration of the data, what is in a file 202 and what is under the file 202 are all provided and managed by a storage apparatus 40b. A server 70 accesses an access to a file on a storage apparatus 40b by using the network filesystem 82 included in the OS 72.

A logical layer in a storage apparatus may comprise logical volumes 204 and virtual volumes 206 placed between files 202 and LUs 208 as shown in FIG. 2. As an alternative, the logical layer can also have a simple configuration comprising only files 202, LUs 208 and HDDs 16.

Other differences between the first and second embodiments are explained below. A port 26 of a network I/F 22 also serves as a port 26 of an eliminated I/O path I/F 32. The priority-access control function of a storage apparatus 40 is modified to keep up with the dual function of a port 26 of a network I/F 22.

An element associated with an LU 208 of a storage apparatus 40 is associated with a file 202 of a storage apparatus 40b. As the management unit of members pertaining to a cache group, a file 202 is used.

Basically, A process to acquire monitored information and various kinds of other processing can be carried out in the same way as the first embodiment except that the changes described above are implemented.

The Invention's Characteristics Identified from the Embodiments

In accordance with the present invention, in a computer system with a DBMS operating therein, management of performances of storage apparatus can be executed by using performances indicators used in user jobs so that the performance management can be made simple.

In addition, in accordance with the present invention, in a computer system with a DBMS operating therein, a process to tune performances of storage apparatus is automated so as to reduce the cost of the performance management.

What is claimed is:

1. A computer system for managing performance of a storage apparatus, comprising:
 a first computer for operating a database management system;
 a second computer for executing a program issuing a request for a process to said database management system; and
 said storage apparatus for storing data handled by said database management system;
 said computer system further comprising:
 an interconnection apparatus connecting among said first computer, said second computer, and said storage apparatus, and
 a management apparatus connected to said first and second computer, said storage apparatus, and said interconnection apparatus,
 wherein said interconnection apparatus virtualizes storage areas had by said storage apparatus, provides said storage areas to said first computer as virtual storage areas, and measures the number of accesses to said virtual storage areas from said first computer and the amount of data received and sent between said first computer and said storage apparatus, and
 wherein said management apparatus acquires:
 information on performance required for executing said program;
 information on data in a database used in a process specified in said request issued by said program to said database management system;
 mapping information of said data used in execution of said program, and acquired from said first computer and said storage apparatus;
 measured information including the number of accesses to said virtual storage areas acquired by said interconnection apparatus, and the amount of data transferred via said virtual storage areas; and utilization statistic information acquired by said storage apparatus; and wherein said management apparatus further:

creates a plan to change settings of said storage apparatus to satisfy required performance for executing said program by using said information on performance, said information on data, and said measured information, and issues a request for a setting change according to said plan to change settings to said storage apparatus.

2. A computer system for managing performance of a storage apparatus in accordance with claim 1, wherein said interconnection apparatus comprises a first interface section connected to said storage apparatus and a second interface section connected to said first computer, and measures said measured information at each port of said first and second interface section.

3. A computer system for managing performance of a storage apparatus in accordance with claim 2, wherein when creating said plan to change settings of said storage apparatus, wherein said management apparatus judges whether or not a port of said interconnection apparatus is in an overloaded state, issues a request for reducing load of said port to said interconnection apparatus if said management apparatus judges said port of said interconnection apparatus is in said overloaded state, and wherein said interconnection apparatus reduces said load of said port in accordance with said request from said management apparatus.

4. A computer system for managing performance of a storage apparatus in accordance with claim 1, wherein when creating said plan to change settings of said storage apparatus such as migrating data from one of plural storage areas had by said storage apparatus to another storage area, by using acquired said information on performance, said information on data, said mapping information, and said measured information, wherein said management apparatus acquires information as to a correspondence relation between said plural storage areas had by said storage apparatus and said virtual storage areas, from said interconnection apparatus, specifies one of said virtual storage areas corresponding one of said storage areas unused as a destination of a data migration, as a free area and issues a request for setting said specified free area into a destination of a data migration, and wherein said interconnection apparatus sets said one of virtual storage areas specified as said free area into a destination of a data migration in accordance with said request from said management apparatus.

5. A computer system for managing performance of a storage apparatus in accordance with claim 1, wherein said first and second computer are one and the same computer.

6. A computer system for managing performance of a storage apparatus in accordance with claim 1, wherein said first or second computer implements functions of collecting said information of said management apparatus, creating said plan to change settings of said storage apparatus, and issuing a request for changing settings in accordance with said plan to change settings of said storage apparatus to said storage apparatus.

7. A computer system for managing performance of a storage apparatus in accordance with claim 1, wherein said storage apparatus implements functions of collecting said information of said management apparatus, creating said plan to change settings of said storage apparatus, and issuing a request for changing settings in accordance with said plan to change settings of said storage apparatus to said storage apparatus.

8. A computer system for managing performance of a storage apparatus in accordance with claim 1, wherein said interconnection apparatus implements functions of collecting said information of said management apparatus, creating said plan to change settings of said storage apparatus, and issuing a request for changing settings in accordance with said plan to change settings of said storage apparatus to said storage apparatus.

9. A computer system for managing performance of a storage apparatus, comprising:

a first computer for operating a database management system;

a second computer for executing a program issuing a request for a process to said database management system; and said storage apparatus for storing data handled by said database management system;

said computer system further comprising:

an interconnection apparatus connecting among said first computer, said second computer, and said storage apparatus, and a management apparatus connected to said first and second computer, said storage apparatus, and said interconnection apparatus, wherein said interconnection apparatus virtualizes storage areas had by said storage apparatus, provides said storage areas to said first computer as virtual storage areas and measures the number of accesses to said virtual storage areas from said first computer and the amount of data received and sent between said first computer and said storage apparatus, wherein said management apparatus acquires:

information on performance required for executing said program, information on data in a database used in a process specified in said request issued by said program to said database management system, mapping information of said data used in execution of said program, and acquired from said first computer and said storage apparatus, measured information including the number of accesses to said virtual storage areas acquired by said interconnection apparatus, and the amount of data transferred via said virtual storage areas, and utilization statistic information acquired by said storage apparatus, and wherein said management apparatus further:

judges whether or not there is a overloaded component among components of said storage apparatus by using said information on performance, said information on data, and said measured information, specifies said overloaded component, judges whether or not an overloaded state can be eliminated by using an alternative component for said overloaded component, and creates a plan to change settings of said storage apparatus to satisfy required performance for executing said program, which uses said alternative component, and issues a request for a setting change according to said plan to change settings to said storage apparatus.

10. A computer system for managing performance of a storage apparatus in accordance with claim 9, wherein when specifying said overloaded component among components of said storage apparatus, said management apparatus specifies a port in a interface section connected to said first computer among components of said storage apparatus as said overloaded component, wherein when judging whether or not overloaded state can be eliminated by using an alternative component for said overloaded component, said management apparatus judges whether or not said overloaded state can be eliminated by changing using one of access paths connecting between the storage area connected to said port specified as said overloaded component and said first computer, into using other access path connecting between said storage area and said first computer, and creates a plan to change settings for eliminating said overloaded state by changing using said one of access paths into using said other path, if judging said overloaded state can be eliminated.

11. A computer system for managing performance of a storage apparatus in accordance with claim 9, wherein said management apparatus acquires information on a priority level of said program, judges whether or not said overloaded state can be eliminated by using an alternative component for said overloaded component, and creates a plan to change settings for eliminating said overloaded state by executing programs on basis of the highest priority level sequentially among said programs using said overloaded component, if judging said overloaded state can not be eliminated.

12. A computer system for managing performance of a storage apparatus in accordance with claim 9, wherein when acquiring said information on performance required for said program, wherein said management apparatus acquires a processing execution time required for said program, a method for estimating a processing execution time, and the amount of data to said program as an input, wherein said management apparatus creates a plan to change settings of said storage apparatus, which uses said alternative component, by using said processing execution time required for said program, said method for estimating said processing execution time, and the amount of data to said program as an input.

13. A computer system for managing performance of a storage apparatus in accordance with claim 9, wherein said storage apparatus has a port for connecting said storage apparatus to an external apparatus and has a priority access control function for limiting an amount of processing making accesses through said port, and wherein said management apparatus judges whether or not said overloaded state can be eliminated by using said alternative component for said overloaded component, and creates a plan to change a set value of said amount of processing in said priority-access control function, if judging said overloaded state can not be eliminated.

14. A computer system for managing performance of a storage apparatus in accordance with claim 9, wherein said storage apparatus has a data cache area, manages said data cache area as several segmented areas, and has functions of dynamically allocating said segmented areas of said data cache area, removing said segmented areas of said data cache area, and changing the size of segmented areas of said data cache area, and wherein when specifying said overloaded component, said management apparatus specifies a storage area of said storage apparatus among components of said storage apparatus as said overloaded component, and creates a plan to change settings of said storage apparatus such as allocating said segmented areas of said data cache area, removing said segmented areas of said data cache area, and changing the size of segmented areas of said data cache area.

15. A computer system for managing performance of a storage apparatus in accordance with claim 9, wherein said storage apparatus has at least two physical storage means, a function of presenting a logical storage area using storage areas of said physical storage means, and a physical storage location modification function of dynamically changing a relation associating said logical storage area with said storage areas of said physical storage means, and wherein said management apparatus creates a plan to change settings of said storage apparatus such as changing said relation associating said logical storage area with said storage areas of said physical storage means.

16. A computer system for managing performance of a storage apparatus in accordance with claim 9, wherein when acquiring said information on performance required for executing said program, said management apparatus acquires information on a processing response time required for said program and information on an actually measured value of said processing response time on said program, and creates a plan to change settings of said storage apparatus such as using information on a processing response time required for said program and information on an actually measured value of said processing response time on said program.

17. A performance management method provided for a computer system having a first computer for operating a database management system, a second computer for executing a program issuing a request for a process to said database management system, and a storage apparatus for storing data handled by said database management system, said performance management method comprising:

virtualizing storage areas of said storage apparatus by an interconnection apparatus connecting said first computer, said second computer, and said storage apparatus, and providing said storage areas to said first computer as virtual storage areas;

measuring the number of accesses to said virtual storage areas from said first computer and the amount of data transferred between said first computer and said storage apparatus via said virtual storage areas;

acquiring information on performance required for executing said program by a management apparatus connected to said first and second computer, said storage apparatus and said interconnection apparatus, information on data in a database used in a process specified in said request issued by said program to said database management system, mapping information of said data used in execution of said program, and acquired from said first computer and said storage apparatus, measured information including the number of accesses to said virtual storage areas acquired by said interconnection apparatus, and the amount of data transferred via said virtual storage areas, and utilization statistic information acquired by said storage apparatus; and creating a plan to change settings of said storage apparatus to satisfy required performance for executing said program by using said information on performance, said information on data, and said measured information, and issuing a request for a setting change according to said plan to change settings to said storage apparatus.

18. A performance management method according to claim 17, wherein said interconnection apparatus comprises a first interface section connected to said storage apparatus and a second interface section connected to said first computer, and implements a function for measuring said measured information at each port of said first and second interface section.

19. A performance management method according to claim 18,
wherein when creating said plan to change settings of said storage apparatus, said management apparatus performs steps of:
judging whether or not a port of said interconnection apparatus is in an overloaded state; and
issuing a request for reducing load of said port to said interconnection apparatus if said management apparatus judges said port of said interconnection apparatus is in said overloaded state, and
wherein said interconnection apparatus implements a function for reducing said load of said port in accordance with said request from said management apparatus.

20. A performance management method according to claim 17,
wherein when creating said plan to change settings of said storage apparatus such as migrating data from one of plural storage areas had by said storage apparatus to another storage area, by using acquired said information on performance, said information on data, said mapping information, and said measured information, said management apparatus performs steps of:
acquiring information as to a correspondence relation between said plural storage areas had by said storage apparatus and said virtual storage areas from said interconnection apparatus;
specifying one of said virtual storage areas corresponding one of said storage areas unused as a destination of a data migration, as a free area; and
issuing a request for setting said specified free area into a destination of a data migration, and
wherein said interconnection apparatus implements a function for setting said one of virtual storage areas specified as said free area into a destination of a data migration in accordance with said request from said management apparatus.

21. A performance management method according to claim 17, wherein said first and second computer are one and the same computer.

22. A performance management method according to claim 17, wherein said first or second computer performs steps of collecting said information of said management apparatus, creating said plan to change settings of said storage apparatus, and issuing a request for changing settings in accordance with said plan to change settings of said storage apparatus to said storage apparatus.

23. A performance management method according to claim 17, wherein said storage apparatus performs steps of collecting said information of said management apparatus, creating said plan to change settings of said storage apparatus, and issuing a request for changing settings in accordance with said plan to change settings of said storage apparatus to said storage apparatus.

24. A performance management method according to claim 17, wherein said interconnection apparatus performs steps of collecting said information of said management apparatus, creating said plan to change settings of said storage apparatus, and issuing a request for changing settings in accordance with said plan to change settings of said storage apparatus to said storage apparatus.

25. A performance management method provided for a computer system having a first computer for operating a database management system, a second computer for executing a program issuing a request for a process to said database management system and a storage apparatus for storing data handled by said database management system, said performance management method comprising:
a procedure for acquiring information on performance required for executing said program;
a procedure for acquiring information on data in a database used in a process specified in said request issued by said program to said database management system;
a procedure for acquiring mapping information of data used for executing said program from said first computer and said storage apparatus;
a procedure for acquiring utilization statistic information from said storage apparatus;
a procedure for creating a plan to change settings of said storage apparatus to satisfy required performance for executing said program by using said information acquired by said procedures; and
a procedure for issuing a request for changing settings in accordance with said plan to change settings of said storage apparatus to said storage apparatus,
wherein said procedure includes a process for acquiring information on a processing response time required for said program and information on an actually measured value of said processing response time on said program, and
wherein said procedure uses said information on a processing response time required for said program and said information on an actually measured value of said processing response time on said program in creating said plan to change settings of said storage apparatus.

26. A computer system for managing performance of a storage apparatus, said computer system comprising:
a first computer for operating a database management system;
a second computer for executing a program issuing a request for a process to said database management system;
said storage apparatus for storing data handled by said database management system; and
a management apparatus,
wherein said management apparatus acquires:
information on performance required for executing said program,
information on data in a database data used in a process specified in said request issued by said program to said database management system,
mapping information of said data used in execution of said program from said first computer and said storage apparatus, and
utilization statistic information from said storage apparatus; and
wherein said management information further:
creates a plan to change settings of said storage apparatus to satisfy required performance for executing said program by using said acquired information; and
issues a request for changing settings in accordance with said plan to change settings of said storage apparatus to said storage apparatus,
wherein said acquiring information on performance includes a process for acquiring information on a processing response time required for said program and information on an actually measured value of said processing response time on said program.

27. A management apparatus for managing performance of a computer system having a first computer for operating a database management system, a second computer for executing a program issuing a request for a process to said database management system and a storage apparatus for storing data handled by said database management system, wherein said management apparatus acquires:

information on performance required for executing said program, information on data in a database used in a process specified in said request issued by said program to said database management system, mapping information of said data used in execution of said program from said first computer and said storage apparatus, and utilization statistic information from said storage apparatus; and wherein said management apparatus further:

creates a plan to change settings of said storage apparatus to satisfy required performance for executing said program by using said acquired information; and issues a request for changing settings in accordance with said plan to change settings of said storage apparatus to said storage apparatus, wherein said acquiring of information on performance includes a process for acquiring information on a processing response time required for said program, and information on an actually measured value of said processing response time on said program.

28. A performance management method provided for a computer system having a first computer for operating a database management system, a second computer for executing a software program issuing a request for a process to said database management system, a storage apparatus for storing data handled by said database management system, and a storage control apparatus connected between said first computer and said storage apparatus and used for controlling data transfers between said first computer and said storage apparatus, said performance management method comprising:

collecting information from said computer system;

using said collected information to create a plan to change settings of said storage apparatus to satisfy required performance for executing said software program; and issuing a request for changing the settings in accordance with said plan to change the settings of said storage apparatus to said storage apparatus by executing steps comprising:

acquiring information on performance required for executing said software program;

acquiring information on data of a database used in a process specified in said request issued by said software program to said database management system;

acquiring mapping information of said data used in execution of said software program from said first computer and said storage apparatus; and acquiring utilization statistic information from said storage apparatus, wherein said step of acquiring information includes acquiring information on a processing response time required for said software program and information on an actually measured value of said processing response time on said software program.

* * * * *